(12) United States Patent
Woo et al.

(10) Patent No.: US 11,990,686 B2
(45) Date of Patent: May 21, 2024

(54) ELECTRONIC DEVICE HAVING ANTENNA

(71) Applicant: LG ELECTRONICS INC., Seoul (KR)

(72) Inventors: Seungmin Woo, Seoul (KR); Dongik Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/996,552

(22) PCT Filed: May 22, 2020

(86) PCT No.: PCT/KR2020/006691
§ 371 (c)(1),
(2) Date: Oct. 19, 2022

(87) PCT Pub. No.: WO2021/235578
PCT Pub. Date: Nov. 25, 2021

(65) Prior Publication Data
US 2023/0216189 A1  Jul. 6, 2023

(51) Int. Cl.
*H01Q 1/24* (2006.01)
*H01Q 1/48* (2006.01)
(Continued)

(52) U.S. Cl.
CPC ............... *H01Q 3/34* (2013.01); *H01Q 1/243* (2013.01); *H01Q 1/48* (2013.01); *H01Q 9/26* (2013.01); *H01Q 21/062* (2013.01)

(58) Field of Classification Search
CPC .......... H01P 5/10; H01Q 9/26; H01Q 21/062
See application file for complete search history.

(56) References Cited

U.S. PATENT DOCUMENTS 5,892,486 A * 4/1999 Cook .................... H01Q 9/285
343/795
10,854,965 B1 * 12/2020 Livadaru ............ H01Q 21/0075
(Continued)

FOREIGN PATENT DOCUMENTS

CN  10-7204516       9/2017
CN  108493598 A  *  9/2018  ............... H01Q 1/38
(Continued)

OTHER PUBLICATIONS

PCT International Application No. PCT/KR2020/006691, International Search Report dated Feb. 18, 2021, 4 page.

*Primary Examiner* — Ricardo I Magallanes
(74) *Attorney, Agent, or Firm* — LEE, HONG, DEGERMAN, KANG & WAIMEY

(57) ABSTRACT

Provided is an electronic device having an antenna according to an embodiment. The electronic device may comprise a first and a second ground plane arranged on different layers of a multi-layer substrate and configured to be connected to each other through vias spaced a predetermined distance apart from each other. The electronic device may comprise a signal line arranged on the same plane as the first ground plane which is disposed at the upper side among the first and the second ground plane. The electronic device may comprise a radiator configured to be electrically connected to the signal line and emit a signal. The first ground plane may be disposed at only one region of one side region and the other side region of the signal line in a predetermined section.

6 Claims, 33 Drawing Sheets

(51) Int. Cl.
  *H01Q 3/34* (2006.01)
  *H01Q 9/26* (2006.01)
  *H01Q 21/06* (2006.01)

(56) References Cited

U.S. PATENT DOCUMENTS

| | | | | |
|---|---|---|---|---|
| 2002/0024466 A1* | 2/2002 | Masuda | ............... | H01Q 9/42 |
| | | | | 343/702 |
| 2012/0293385 A1* | 11/2012 | Liu | ............... | H01Q 9/045 |
| | | | | 343/835 |
| 2013/0088396 A1* | 4/2013 | Han | ............... | H01Q 9/04 |
| | | | | 343/700 MS |
| 2017/0214119 A1* | 7/2017 | Aoki | ............... | H04B 1/3838 |
| 2018/0337440 A1* | 11/2018 | Aoki | ............... | H01Q 1/526 |
| 2019/0319369 A1* | 10/2019 | Chiang | ............... | H01Q 7/00 |
| 2020/0303839 A1* | 9/2020 | Kim | ............... | H01Q 1/2283 |
| 2020/0381835 A1* | 12/2020 | Chou | ............... | H01Q 9/285 |
| 2021/0184326 A1* | 6/2021 | Ong | ............... | H01L 25/18 |
| 2022/0263236 A1* | 8/2022 | Aoki | ............... | H01Q 9/26 |

FOREIGN PATENT DOCUMENTS

| | | |
|---|---|---|
| JP | 2016-152529 | 8/2016 |
| KR | 2015-0033187 | 4/2015 |
| KR | 2019-0089692 | 7/2019 |

* cited by examiner (a)

GND   via   1011   Feeding line (b)

ELECTRONIC DEVICE HAVING ANTENNA

CROSS-REFERENCE TO RELATED APPLICATION(S)

This application is the National Stage filing under 35 U.S.C. 371 of International Application No. PCT/KR2020/006691, filed on May 22, 2020, the contents of which is hereby incorporated by reference herein in its entirety.

TECHNICAL FIELD

The present disclosure relates to an electronic device having an antenna. A particular implementation relates to a transmission line within an antenna module operating in a millimeter-wave band.

BACKGROUND ART

Electronic devices may be classified into mobile/portable terminals and stationary terminals according to mobility. Also, the electronic devices may be classified into handheld types and vehicle mount types according to whether or not a user can directly carry.

Functions of electronic devices are diversifying. Examples of such functions include data and voice communications, capturing images and video via a camera, recording audio, playing music files via a speaker system, and displaying images and video on a display. Some electronic devices include additional functionality which supports electronic game playing, while other terminals are configured as multimedia players. Specifically, in recent time, mobile terminals can receive broadcast and multicast signals to allow viewing of video or television programs As it becomes multifunctional, an electronic device can be allowed to capture still images or moving images, play music or video files, play games, receive broadcast and the like, so as to be implemented as an integrated multimedia player.

Efforts are ongoing to support and increase the functionality of electronic devices. Such efforts include software and hardware improvements, as well as changes and improvements in the structural components.

In addition to those attempts, the electronic devices provide various services in recent years by virtue of commercialization of wireless communication systems using an LTE communication technology. In the future, it is expected that a wireless communication system using a 5G communication technology will be commercialized to provide various services. Meanwhile, some of LTE frequency bands may be allocated to provide 5G communication services.

In this regard, the mobile terminal may be configured to provide 5G communication services in various frequency bands. Recently, attempts have been made to provide 5G communication services using a Sub-6 band under a 6 GHz band. In the future, it is also expected to provide 5G communication services by using a millimeter-wave (mmWave) band in addition to the Sub-6 band for a faster data rate.

Meanwhile, a 28 GHz band, a 38.5 GHz band, and a 64 GHz band are being considered as frequency bands to be allocated for 5G communication services in such mmWave bands. In this regard, a plurality of array antennas may be disposed in an electronic device in the mmWave bands.

In relation to this, an array antenna that can operate in a millimeter-wave (mmWave) band may be mounted within an antenna module. A problem is that an electrical loss may occur between a feed line for feeding an antenna element within the antenna module and the antenna element, depending on the polarization of the antenna element.

In particular, a higher electrical loss may occur between the feed line and the antenna element, because of the short wavelength in high-frequency bands such as mmWave bands.

DISCLOSURE OF INVENTION

Technical Problem

The present disclosure has been made in an effort to solve the aforementioned problems and other problems. Another aspect of the present disclosure is to provide an electronic device including an antenna module with an array antenna disposed therein that operates in a millimeter-wave band, and a configuration for controlling the same.

Another aspect of the present disclosure is to provide a low-loss feeding structure in an antenna module operating in a millimeter-wave band.

Another aspect of the present disclosure is to provide an antenna module whose antenna peak gain is improved according to a low-loss feeding structure.

Another aspect of the present disclosure is to provide a transition structure in which an electrical loss caused by polarization mismatch can be reduced if a feed line and an antenna have different polarization directions.

Another aspect of the present disclosure is to provide an asymmetrical transition feeding structure in an antenna module operating in a millimeter-wave band, in consideration of polarization characteristics of an antenna.

Another aspect of the present disclosure is to provide an antenna structure having a low-loss feeding structure while reducing height.

Another aspect of the present disclosure is to provide an electronic device with an array antenna having a low-loss feeding structure.

Solution to Problem

In order to accomplish the foregoing or other aspects, an electronic device having an antenna according an embodiment of the present disclosure is provided. The electronic device may include first and second ground planes arranged on different layers of a multi-layer substrate and configured to be connected to each other through vias spaced a predetermined distance apart from each other. The electronic device may include a signal line arranged on the same plane as the first ground plane which is the upper one between the first and second ground planes. The electronic device may include radiators configured to be electrically connected to the signal line and to radiate a signal. The first ground plane may be disposed only in either one side portion or the other side portion of the signal line in a predetermined section.

According to an embodiment, the first ground plane may be disposed in one side portion and the other side portion of the signal line in a first section forming a transmission line, and may be disposed only in one side portion of the signal line in a second section which is a transition section between the transmission line and the radiators, thereby forming an asymmetrical transmission line.

According to an embodiment, the second ground plane may be disposed in one side portion and the other side portion of the signal line in the first section, and may be disposed only in one side portion of the signal line in the second section.

According to an embodiment, the second ground plane may be disposed in one side portion and the other side portion of the signal line in the first section, and may be disposed in the entire one side portion of the second section and part of the other side portion thereof, and vias connecting the first ground plane and the second ground plane may be disposed in the one side portion in the second section, and no vias connecting the first ground plane and the second ground plane may be disposed in the other side portion in the second section.

According to an embodiment, an electric field in the first section may be formed in such a way that a vertical electric field component between the signal line and the second ground plane is larger than a horizontal electric field component, an electric field in the second section may be formed in such a way that a horizontal component between the signal line and the first ground plane is larger than a vertical electric field component, or in such a way that a horizontal electric field component in the second section is larger than a horizontal electric field component in the first section.

According to an embodiment, the radiators may be disposed on the same plane as the signal line, and configured as a dipole antenna including a first metal pattern and a second metal pattern, wherein the first metal pattern is connected to the signal line, and the second metal pattern is connected to the first ground plane constituting the asymmetrical transmission line.

According to an embodiment, the radiators may be disposed on the same plane as the signal line, and configured as a folded dipole antenna including metal patterns in which a first metal pattern and a second metal pattern are implemented in loop form, wherein the first metal pattern is connected to the signal line, and the second metal pattern is connected to the first ground plane constituting the asymmetrical transmission line.

According to an embodiment, the radiators may include: first radiators formed as the dipole antenna or the folded dipole antenna, and configured to be connected to the signal line; and second radiators disposed on a layer overlying the layer where the dipole antenna or the folded dipole antenna is disposed.

According to an embodiment, the radiators may further include third radiators disposed on a layer underlying the first radiator, and configured to be connected to an end of the first radiators through vertical vias.

According to an embodiment, the multi-layer circuit substrate may correspond to an antenna module including an asymmetrical transmission line including the radiators and the signal line, wherein the antenna module is configured as an array antenna including a plurality of antenna elements spaced at predetermined intervals so as to perform beamforming.

According to an embodiment, the antenna module may further include a phase controller configured to control the phase of a signal applied to each of the plurality of antenna elements, and the electronic device may further comprise a transceiver circuit operably coupled to the phase controller, and configured to control a signal applied to the array antenna through the phase controller.

According to an embodiment, the antenna module may include a plurality of antenna modules disposed in different regions of the electronic device, and the electronic device may further comprise a processor operably coupled to the transceiver circuit, and configured to control the transceiver circuit, wherein the processor controls the transceiver circuit to perform MIMO while performing beamforming in different directions through the plurality of antenna modules.

According to an embodiment, the antenna module corresponding to the multi-layer substrate may include: a first array antenna configured to operate as a horizontal polarization antenna, with the radiators being spaced at predetermined intervals; and a second array antenna configured to operate as a vertical polarization antenna, with second radiators being spaced at predetermined intervals and including metal pads disposed on different layers of the multi-layer substrate and vias connecting the metal pads.

According to an embodiment, the first array antenna corresponding to the horizontal polarization antenna may be connected to an asymmetrical transmission line, and the second array antenna corresponding to the vertical polarization antenna may be connected to a symmetrical transmission line where the first ground plane is disposed in both of the one side portion and the other side portion.

According to an embodiment, the processor may be configured to control the transceiver circuit to perform MIMO through the first array antenna and the second array antenna.

According to an embodiment, the antenna module may include a first antenna module and a second antenna module which are disposed in different portions of the electronic device, the first antenna module including a first array antenna and a second array antenna, and the second antenna module including a third array antenna operating as a horizontal polarization antenna and a fourth array antenna operating as a vertical polarization antenna.

According to an embodiment, the processor may control the transceiver circuit such that dual connections with the first entity and the second entity are maintained through the first array antenna operating as the horizontal polarization antenna and the fourth array antenna operating as the vertical polarization antenna, respectively. The processor may control the transceiver circuit such that dual connections with the first entity and the second entity are maintained through the second array antenna operating as the vertical polarization antenna and the third array antenna operating as the horizontal polarization antenna, respectively.

Another embodiment of the present disclosure provides an antenna module including: a transmission line including a ground plane and a signal line; and radiators configured to be electrically connected to the signal line and to radiate a signal, wherein the ground plane is disposed asymmetrically in one side portion and the other side portion with respect to the center line of the signal line in a predetermined section adjacent to the radiators.

According to an embodiment, the transmission line may include first and second ground planes arranged on different layers of a multi-layer substrate and configured to be connected to each other through vias spaced a predetermined distance apart from each other, wherein the signal line is disposed on the same plane as the first ground plane which is the upper one between the first and the second ground plane, and the first ground plane is disposed in one side portion and the other side portion of the signal line in a first section forming a transmission line, and is disposed only in one side portion of the signal line in a second section which is a transition section between the transmission line and the radiators, thereby forming an asymmetrical transmission line.

According to an embodiment, the second ground plane may be disposed in one side portion and the other side portion of the signal line in the first section, and disposed only in one side portion of the signal line in the second section.

According to an embodiment, the second ground plane may be disposed in one side portion and the other side portion of the signal line in the first section, and may be disposed in the entire one side portion of the second section and part of the other side portion thereof, and vias connecting the first ground plane and the second ground plane may be disposed in the one side portion in the second section, and no vias connecting the first ground plane and the second ground plane may be disposed in the other side portion in the second section.

Advantageous Effects of Invention

An antenna module having a low-loss asymmetrical feeding structure operating in a millimeter-wave band and an electronic device for controlling the same have the following technical advantages.

According to an embodiment, it is possible to provide a low-loss asymmetrical feeding structure including an antenna module with an array antenna operating in a millimeter-wave band, a transceiver circuit for controlling the same, and a modem.

According to an embodiment, it is possible to provide a low-loss asymmetrical feeding structure in an antenna having horizontal polarization, in consideration of polarization characteristics of the antenna.

According to an embodiment, it is possible to provide a feeding structure that allows for a reduction in transmission loss caused by the transition of an electric field between horizontal and vertical, in an mmWave transmission line structure.

According to an embodiment, it is possible to provide a feeding structure in which a reflection coefficient of an antenna can be maintained without distortion by an asymmetrical ground transition structure.

According to an embodiment, it is possible to improve antenna gain since electrical loss is reduced by an asymmetrical ground transition structure.

According to an embodiment, it is possible to implement an end-fire antenna as a dual-polarization array antenna and therefore increase communication capacity and improve communication reliability by increasing the number of MIMO streams.

According to an embodiment, it is possible to perform multi-input and multi-output (MIMO) by using a single antenna module through antennas having orthogonal polarization.

Further scope of applicability of the present disclosure will become apparent from the following detailed description. It should be understood, however, that the detailed description and specific examples, such as the preferred embodiment of the invention, are given by way of illustration only, since various changes and modifications within the spirit and scope of the invention will be apparent to those skilled in the art.

MODE FOR THE INVENTION

Figure 1:
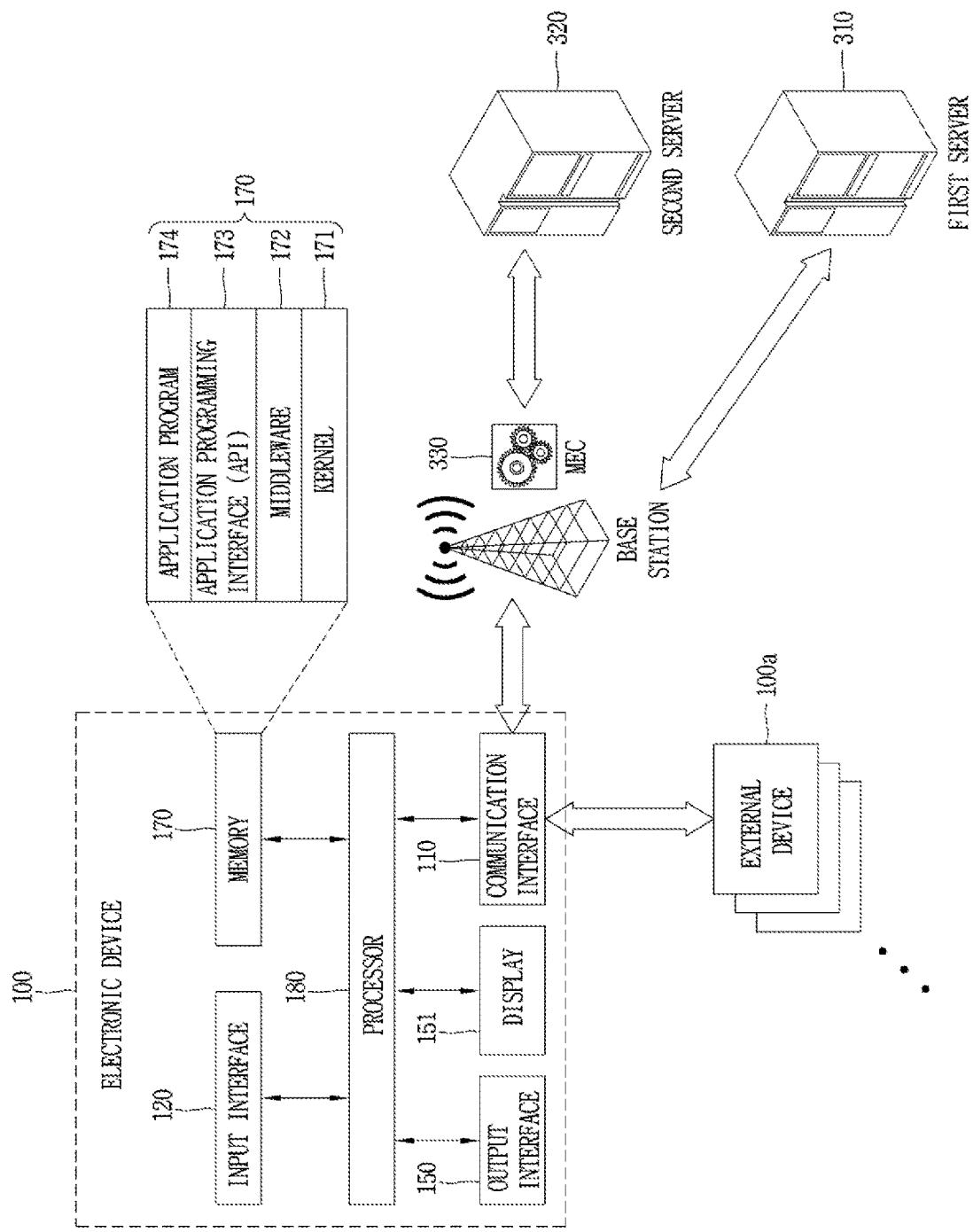
FIG. 1 is a view illustrating a configuration for describing an electronic device in accordance with one embodiment, and an interface between the electronic device and an external device or a server.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Electronic devices presented herein may be implemented using a variety of different types of terminals. Examples of such devices include cellular phones, smart phones, laptop computers, digital broadcasting terminals, personal digital assistants (PDAs), portable multimedia players (PMPs), navigators, slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, digital signages, and the like.

Figure 2A:
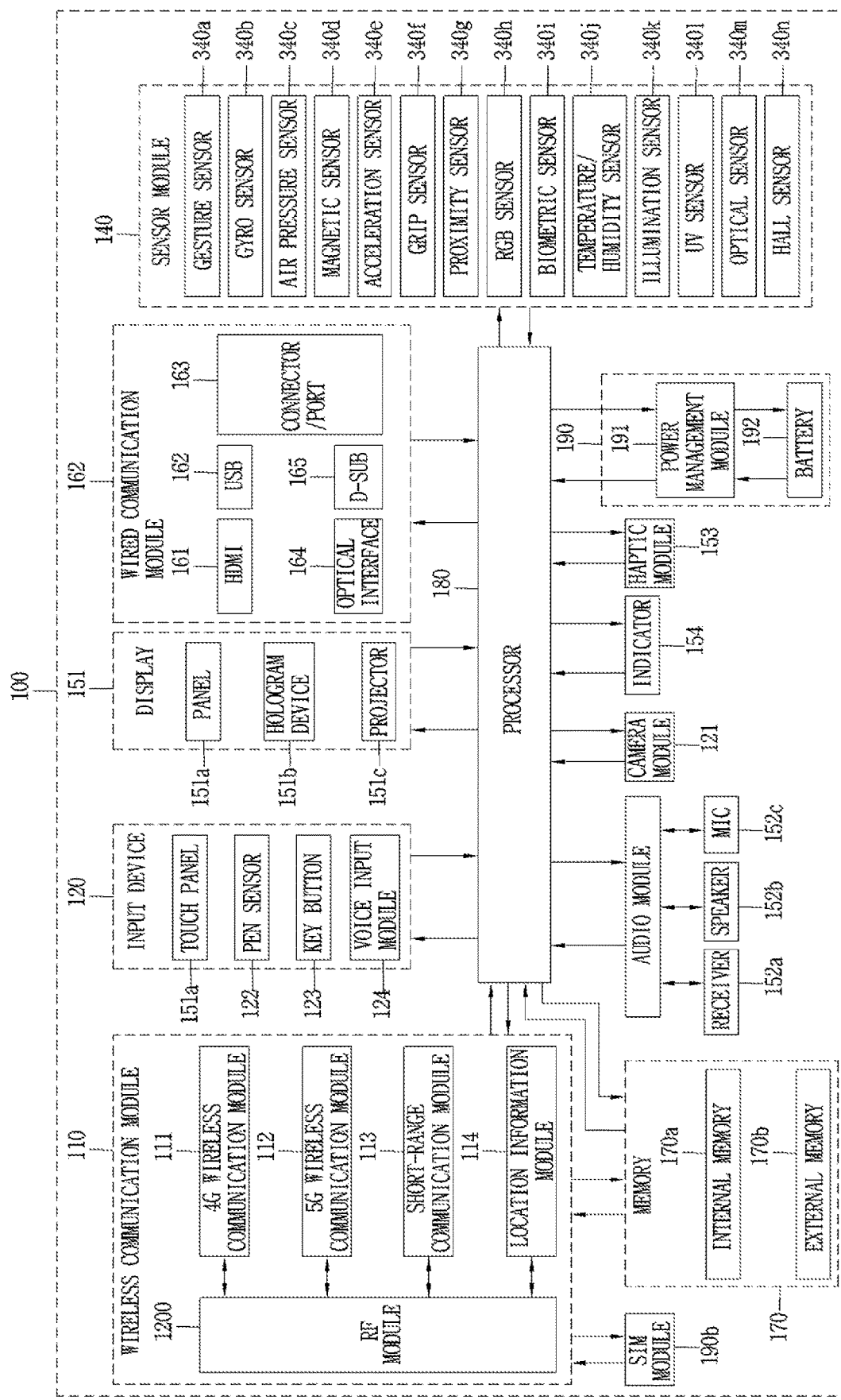
FIG. 2A is a view illustrating a detailed configuration of the electronic device of FIG. 1.
Figure 2B:
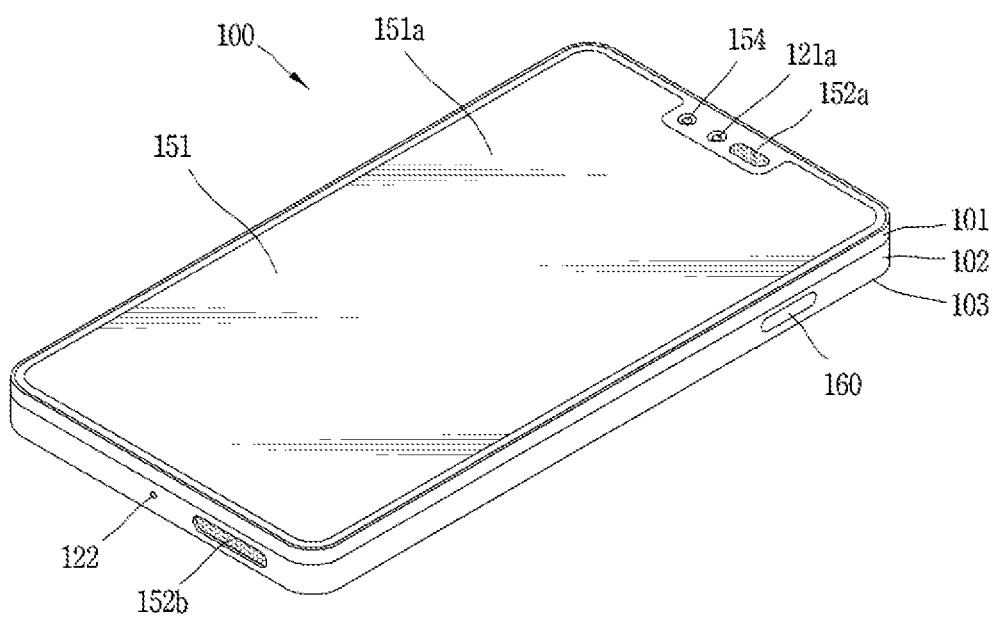
FIGS. 2B and 2C are conceptual views illustrating one example of an electronic device according to the present disclosure, viewed from different directions.
Figure 2C:
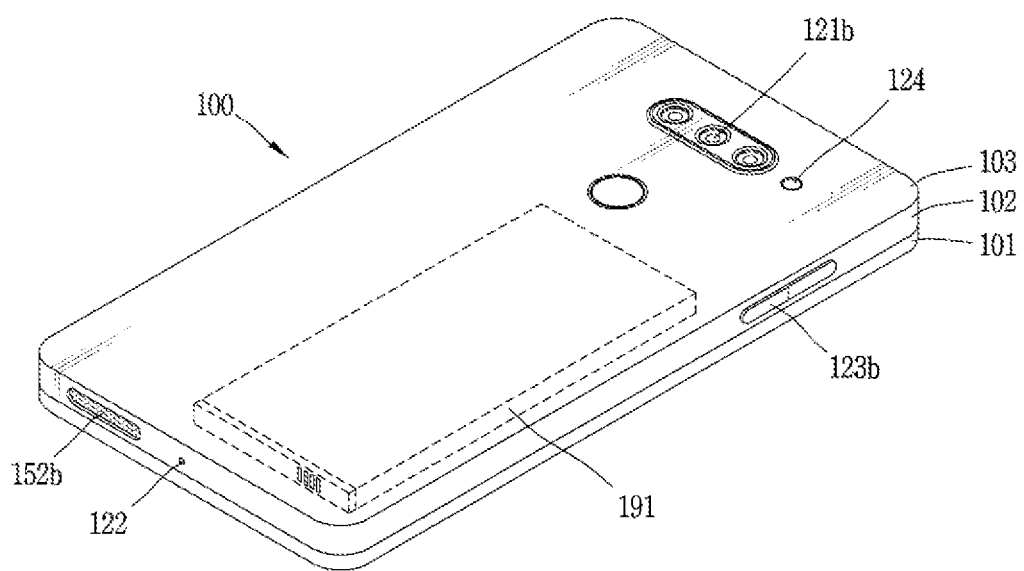

FIG. 1 is a view illustrating a configuration for describing an electronic device in accordance with one embodiment, and an interface between the electronic device and an external device or a server. Meanwhile, referring to FIGS. 2A to 2B, FIG. 2A is a view illustrating a detailed configuration of the electronic device of FIG. 1. FIGS. 2B and 2C are conceptual views illustrating one example of an electronic device according to the present disclosure, viewed from different directions.

Referring to FIG. 1, the electronic device 100 may include a communication interface 110, an input interface (or an input device) 120, an output interface (or an output device) 150, and a processor 180. Here, the communication interface 110 may refer to the wireless communication module 110. The electronic device 100 may further include a display 151 and a memory 170. It is understood that implementing all of the illustrated components illustrated in FIG. 1 is not a requirement, and that greater or fewer components may alternatively be implemented.

In more detail, among others, the wireless communication module 110 may typically include one or more modules which permit communications such as wireless communications between the electronic device 100 and a wireless communication system, communications between the electronic device 100 and another electronic device, or communications between the electronic device 100 and an external server. Further, the wireless communication module 110 may typically include one or more modules which connect the electronic device 100 to one or more networks. Here, the one or more networks may be, for example, a 4G communication network and a 5G communication network.

Referring to FIGS. 1 and 2A, the wireless communication module 110 may include at least one of a 4G wireless communication module 111, a 5G wireless communication module 112, a short-range communication module 113, and a location information module 114. The 4G wireless communication module 111, the 5G wireless communication module 112, the short-range communication module 113, and the location information module 114 may be implemented as a baseband processor such as a modem. In one example, the 4G wireless communication module 111, the 5G wireless communication module 112, the short-range communication module 113, and the location information module 114 may be implemented as a transceiver circuit operating in an IF band and a baseband processor. The RF module 1200 may be implemented as an RF transceiver circuit operating in an RF frequency band of each communication system. However, the present disclosure may not be limited thereto. Each of the 4G wireless communication module 111, the 5G wireless communication module 112, the short-range communication module 113, and the location information module 114 may include an RF module.

The 4G wireless communication module 111 may perform transmission and reception of 4G signals with a 4G base station through a 4G mobile communication network. In this case, the 4G wireless communication module 111 may transmit at least one 4G transmission signal to the 4G base station. In addition, the 4G wireless communication module 111 may receive at least one 4G reception signal from the 4G base station. In this regard, Uplink (UL) Multi-input and Multi-output (MIMO) may be performed by a plurality of 4G transmission signals transmitted to the 4G base station. In addition, Downlink (DL) MIMO may be performed by a plurality of 4G reception signals received from the 4G base station.

The 5G wireless communication module 112 may perform transmission and reception of 5G signals with a 5G base station through a 5G mobile communication network. Here, the 4G base station and the 5G base station may have a Non-Stand-Alone (NSA) structure. For example, the 4G base station and the 5G base station may be a co-located structure in which the stations are disposed at the same location in a cell. Alternatively, the 5G base station may be disposed in a Stand-Alone (SA) structure at a separate location from the 4G base station.

The 5G wireless communication module 112 may perform transmission and reception of 5G signals with a 5G base station through a 5G mobile communication network. In this case, the 5G wireless communication module 112 may transmit at least one 5G transmission signal to the 5G base station. In addition, the 5G wireless communication module 112 may receive at least one 5G reception signal from the 5G base station.

In this instance, 5G and 4G networks may use the same frequency band, and this may be referred to as LTE re-farming. In some examples, a Sub 6 frequency band, which is a range of 6 GHz or less, may be used as the 5G frequency band.

On the other hand, a millimeter-wave (mmWave) range may be used as the 5G frequency band to perform wideband high-speed communication. When the mmWave band is used, the electronic device 100 may perform beamforming for communication coverage expansion with a base station.

On the other hand, regardless of the 5G frequency band, 5G communication systems can support a larger number of multi-input multi-output (MIMO) to improve a transmission rate. In this instance, UL MIMO may be performed by a plurality of 5G transmission signals transmitted to a 5G base station. In addition, DL MIMO may be performed by a plurality of 5G reception signals received from the 5G base station.

On the other hand, the wireless communication module 110 may be in a Dual Connectivity (DC) state with the 4G base station and the 5G base station through the 4G wireless communication module 111 and the 5G wireless communication module 112. As such, the dual connectivity with the 4G base station and the 5G base station may be referred to as EUTRAN NR DC (EN-DC). Here, EUTRAN is an abbreviated form of "Evolved Universal Telecommunication Radio Access Network", and refers to a 4G wireless communication system. Also, NR is an abbreviated form of "New Radio" and refers to a 5G wireless communication system.

On the other hand, if the 4G base station and 5G base station are disposed in a co-located structure, throughput improvement can be achieved by inter-Carrier Aggregation (inter-CA). Accordingly, when the 4G base station and the 5G base station are disposed in the EN-DC state, the 4G reception signal and the 5G reception signal may be simultaneously received through the 4G wireless communication module 111 and the 5G wireless communication module 112.

The short-range communication module 113 is configured to facilitate short-range communications. Suitable technologies for implementing such short-range communications include Bluetooth, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the electronic device 100 and a wireless communication system, communications between the electronic device 100 and another electronic device, or communications between the electronic device and a network where another electronic device (or an external server) is located, via wireless area network. One example of the wireless area networks is a wireless personal area network.

Short-range communication between electronic devices may be performed using the 4G wireless communication module 111 and the 5G wireless communication module 112. In one implementation, short-range communication may be performed between electronic devices in a device-to-device (D2D) manner without passing through base stations.

Meanwhile, for transmission rate improvement and communication system convergence, Carrier Aggregation (CA) may be carried out using at least one of the 4G wireless communication module 111 and the 5G wireless communication module 112 and a WiFi communication module. In this regard, 4G+WiFi CA may be performed using the 4G wireless communication module 111 and the Wi-Fi communication module 113. Or, 5G+WiFi CA may be performed using the 5G wireless communication module 112 and the Wi-Fi communication module 113.

The location information module 114 may be generally configured to detect, calculate, derive or otherwise identify a position (or current position) of the electronic device. As an example, the location information module 115 includes a Global Position System (GPS) module, a Wi-Fi module, or both. For example, when the electronic device uses a GPS module, a position of the electronic device may be acquired using a signal sent from a GPS satellite. As another example, when the electronic device uses the Wi-Fi module, a position of the electronic device can be acquired based on information related to a wireless Access Point (AP) which transmits or receives a wireless signal to or from the Wi-Fi module. If desired, the location information module 114 may alternatively or additionally function with any of the other modules of the wireless communication module 110 to obtain data related to the position of the electronic device. The location information module 114 is a module used for acquiring the position (or the current position) and may not be limited to a module for directly calculating or acquiring the position of the electronic device.

Specifically, when the electronic device utilizes the 5G wireless communication module, the position of the electronic device may be acquired based on information related to the 5G base station which performs radio signal transmission or reception with the 5G wireless communication module. In particular, since the 5G base station of the mmWave band is deployed in a small cell having a narrow coverage, it is advantageous to acquire the position of the electronic device.

The input device 120 may include a pen sensor 1200, a key button 123, a voice input module 124, a touch panel 151a, and the like. The input device 120 may include a camera module 121 or an image input unit for obtaining images or video, a microphone 152c or an audio input unit for inputting an audio signal, and a user input unit 123 (for example, a touch key, a mechanical key, and the like) for allowing a user to input information. Data (for example, audio, video, image, and the like) may be obtained by the input device 120 and may be analyzed and processed according to user commands.

The camera module 121 is a device capable of capturing still images and moving images. According to one embodiment, the camera module 121 may include one or more image sensors (e.g., a front sensor or a rear sensor), a lens, an image signal processor (ISP), or a flash (e.g., LED or lamp).

The sensor module 140 may typically be implemented using one or more sensors configured to sense internal information of the electronic device, the surrounding environment of the electronic device, user information, and the like. For example, the sensor module 140 includes at least one of a gesture sensor 340a, a gyro sensor 340b, an air pressure sensor 340c, a magnetic sensor 340d, an acceleration sensor 340e, a grip sensor 340f, and a proximity sensor 340g, a color sensor 340h (e.g. RGB (red, green, blue) sensor), a bio-sensor 340i, a temperature/humidity sensor 340j, an illuminance sensor 340k, an ultra violet (UV) sensor 340l, a light sensor 340m, and a hall sensor 340n. The sensor module 140 may also include at least one of a finger scan sensor, an ultrasonic sensor, an optical sensor (for example, camera 121), a microphone (see 152c), a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The electronic device disclosed herein may be configured to utilize information obtained from one or more sensors, and combinations thereof.

The output interface 150 may typically be configured to output various types of information, such as audio, video, tactile output, and the like. The output interface 150 may be shown having at least one of a display 151, an audio module 152, a haptic module 153, and an indicator 154.

The display 151 may have an inter-layered structure or an integrated structure with a touch sensor in order to implement a touch screen. The touch screen may function as the user input unit 123 which provides an input interface between the electronic device 100 and the user and simultaneously provide an output interface between the electronic device 100 and a user. For example, the display 151 may include a liquid crystal display (LCD), a light emitting diode (LED) display, an organic light emitting diode (OLED) display, a micro electromechanical systems (MEMS) display, or an electronic paper. For example, the display 151 may display various contents (e.g., text, images, videos, icons, and/or symbols, etc.). The display 151 may include a touch screen, and may receive, for example, a touch, gesture, proximity, or hovering input using an electronic pen or a part of the user's body.

Meanwhile, the display 151 may include a touch panel 151a, a hologram device 151b, a projector 151c, and/or a control circuit for controlling them. In this regard, the panel may be implemented to be flexible, transparent, or wearable. The panel may include the touch panel 151a and one or more modules. The hologram device 151b may display a stereoscopic image in the air by using light interference. The projector 151c may display an image by projecting light onto a screen. The screen may be located inside or outside the electronic device 100, for example.

The audio module 152 may interwork with the receiver 152a, the speaker 152b, and the microphone 152c. Meanwhile, the haptic module 153 may convert an electrical signal into a mechanical vibration, and generate a vibration or a haptic effect (e.g., pressure, texture). The electronic device may include a mobile TV supporting device (e.g., a GPU) that may process media data as per, e.g., digital multimedia broadcasting (DMB), digital video broadcasting (DVB), or mediaFlo™ standards. The indicator 154 may indicate a particular state of the electronic device 100 or a part (e.g., the processor 310) of the electronic device, including, e.g., a booting state, a message state, or a recharging state.

The wired communication module 160 which may be implemented as an interface unit may serve as a passage with various types of external devices connected to the electronic device 100. The wired communication module 160 may include an HDMI 162, a USB 162, a connector/port 163, an optical interface 164, or a D-subminiature (D-sub) 165. can do. The wired communication module 160, for example, may include any of wired or wireless ports, external power supply ports, wired or wireless data ports, memory card ports, ports for connecting a device having an identification module, audio input/output (I/O) ports, video I/O ports, earphone ports, and the like. The electronic device 100 may perform assorted control functions associated with a connected external device, in response to the external device being connected to the wired communication module 160.

The memory 170 is typically implemented to store data to support various functions or features of the electronic device 100. For instance, the memory 170 may be configured to store application programs executed in the electronic device 100, data or instructions for operations of the electronic device 100, and the like. At least some of these application programs may be downloaded from an external server (e.g., a first server 310 or a second server 320) through wireless communication. Other application programs may be installed within the electronic device 100 at the time of manufacturing or shipping, which is typically the case for basic functions of the electronic device 100 (for example, receiving a call, placing a call, receiving a message, sending a message, and the like). Application programs may be stored in the memory 170, installed in the electronic device 100, and executed by the processor 180 to perform an operation (or function) for the electronic device 100.

In this regard, the first server 310 may be referred to as an authentication server, and the second server 320 may be referred to as a content server. The first server 310 and/or the second server 320 may be interfaced with the electronic device through a base station. Meanwhile, a part of the second server 320 corresponding to the content server may be implemented as a mobile edge cloud (MEC) 330 in units of base stations. This can implement a distributed network through the second server 320 implemented as the mobile edge cloud (MEC) 330, and shorten content transmission delay.

The memory Memory 170 may include a volatile memory and/or a non-volatile memory. The memory 170 may also include an internal memory 170a and an external memory 170b. The memory 170 may store, for example, commands or data related to at least one of other components of the electronic device 100. According to an implementation, the memory 170 may store software and/or a program 240. For example, the program 240 may include a kernel 171, middleware 172, an application programming interface (API) 173, or an application program (or "application") 174, and the like. At least some of the kernel 171, the middleware 172, and the API 174 may be referred to as an operating system (OS).

The kernel 171 may control or manage system resources (e.g., the bus, the memory 170, or the processor 180) that are used for executing operations or functions implemented in other programs (e.g., the middleware 172, the API 173, or the application program 174). In addition, the kernel 171 may provide an interface to control or manage system resources by accessing individual components of the electronic device 100 in the middleware 172, the API 173, or the application program 174.

The middleware 172 may play an intermediary so that the API 173 or the application program 174 communicates with the kernel 171 to exchange data. Also, the middleware 172 may process one or more task requests received from the application program 247 according to priorities. In one embodiment, the middleware 172 may give at least one of the application programs 174 a priority to use the system resources (e.g., the bus, the memory 170, or the processor 180) of the electronic device 100, and process one or more task requests. The API 173 is an interface for the application program 174 to control functions provided by the kernel 171 or the middleware 1723, for example, at least one for file control, window control, image processing, or text control. Interface or function, for example Command).

The processor 180 may typically function to control an overall operation of the electronic device 100, in addition to the operations associated with the application programs. The processor 180 may provide or process information or functions appropriate for a user by processing signals, data, information and the like, which are input or output by the aforementioned various components, or activating application programs stored in the memory 170. Furthermore, the processor 180 may control at least part of the components illustrated in FIGS. 1 and 2A, in order to execute the application programs stored in the memory 170. In addition, the processor 180 may control a combination of at least two of those components included in the electronic device 100 to activate the application program.

The processor 180 may include one or more of a central processing unit (CPU), an application processor (AP), an image signal processor (ISP), a communication processor (CP), and a low power processor (e.g., sensor hub). For example, the processor 180 may execute a control of at least one of other components of the electronic device 100 and/or an operation or data processing related to communication.

The power supply unit 190 may be configured to receive external power or provide internal power in order to supply appropriate power required for operating elements and components included in the electronic device 100. The power supply unit 190 may include a power management module 191 and a battery 192, and the battery 192 may be a built-in battery or a replaceable battery. The power management module 191 may include a power management integrated circuit (PMIC), a charger IC, or a battery or fuel gauge. The PMIC may employ a wired and/or wireless charging method. The wireless charging method may include, for example, a magnetic resonance method, a magnetic induction method or an electromagnetic wave method, and may further include an additional circuit for wireless charging, for example, a coil loop, a resonance circuit, or a rectifier. The battery gauge may measure, for example, a remaining battery level, and voltage, current, or temperature during charging. For example, the battery 192 may include a rechargeable cell and/or a solar cell.

Each of the external device 100a, the first server 310, and the second server 320 may be the same or different type of device (e.g., external device or server) as or from the electronic device 100. According to an embodiment, all or some of operations executed on the electronic device 100 may be executed on another or multiple other electronic devices (e.g., the external device 100a, the first server 310 and the second server 320. According to an implementation, when the electronic device 100 should perform a specific function or service automatically or at a request, the electronic device 100 may request another device (e.g., the external device 100a, the first server 310, and the second server 320) to perform at least some functions associated therewith, instead of executing the function or service on its own or additionally. The another electronic device (e.g., the external device 100a, the first server 310, and the second server 320) may execute the requested function or additional function and transfer a result of the execution to the electronic device 100. The electronic device 100 may provide the requested function or service by processing the received result as it is or additionally. For this purpose, for example, cloud computing, distributed computing, client-server computing, or mobile edge cloud (MEC) technology may be used.

At least part of the components may cooperably operate to implement an operation, a control or a control method of an electronic device according to various implementations disclosed herein. Also, the operation, the control or the control method of the electronic device may be implemented on the electronic device by an activation of at least one application program stored in the memory 170.

Referring to FIG. 1, a wireless communication system may include an electronic device 100, at least one external device 100a, a first server 310, and a second server 320. The electronic device 100 may be functionally connected to at least one external device 100a, and may control contents or functions of the electronic device 100 based on information received from the at least one external device 100a. According to an implementation, the electronic device 100 may use the servers 310 and 320 to perform authentication for determining whether the at least one external device 100 includes or generates information conforming to a predetermined rule. Also, the electronic device 100 may display contents or control functions differently by controlling the electronic device 100 based on the authentication result. According to an implementation, the electronic device 100 may be connected to at least one external device 100a through a wired or wireless communication interface to receive or transmit information. For example, the electronic device 100 and the at least one external device 100a include a near field communication (NFC), a charger (e.g., Information can be received or transmitted in a universal serial bus (USB)-C), ear jack, Bluetooth (BT), wireless fidelity (WiFi), or the like.

The electronic device 100 may include at least one of an external device authentication module 100-1, a content/function/policy information DB 100-2, an external device information DB 100-3, or a content DB 104. The at least one external device 100a which is an assistant device linked with the electronic device 100, may be a device designed for various purposes, such as convenience of use, more attractive appearance, enhancement of usability, etc. of the electronic device 100. At least one external device 100a may or may not be in physical contact with the electronic device 100. According to one implementation, the at least one external device 100a may be functionally connected to the electronic device 100 using a wired/wireless communication module to control information for controlling content or a function in the electronic device 100.

Meanwhile, the first server 310 may include a server or a cloud device for services related to the at least one external device 100a or a hub device for controlling services in a smart home environment. The first server 310 may include at least one of an external device authentication module 311, a content/function/policy information DB 312, an external device information DB 313, and an electronic device/user DB 314. The first server 310 may be referred to as an authentication management server, an authentication server, or an authentication-related server. The second server 320 may include a server or a cloud device for providing a service or content, or a hub device for providing a service in a smart home environment. The second server 320 may include at least one of a content DB 321, an external device specification information DB 322, a content/function/policy information management module 323, or a device/user authentication/management module 324. The second server 130 may be referred to as a content management server, a content server, or a content-related server.

Referring to FIGS. 2B and 2C, the disclosed electronic device 100 includes a bar-like terminal body. However, the electronic device 100 may alternatively be implemented in any of a variety of different configurations. Examples of such configurations include watch type, clip-type, glasses-type, or folder-type, flip-type, slide-type, swing-type, and swivel-type in which two and more bodies are combined with each other in a relatively movable manner, and combinations thereof. Discussion herein will often relate to a particular type of electronic device. However, such teachings with regard to a particular type of electronic device will generally be applied to other types of electronic devices as well.

Here, considering the electronic device 100 as at least one assembly, the terminal body may be understood as a conception referring to the assembly.

The electronic device 100 will generally include a case (for example, frame, housing, cover, and the like) forming the appearance of the terminal. In this embodiment, the electronic device 100 may include a front case 101 and a rear case 102. Various electronic components may be incorporated into a space formed between the front case 101 and the rear case 102. At least one middle case may be additionally positioned between the front case 101 and the rear case 102.

The display unit 151 is shown located on the front side of the terminal body to output information. As illustrated, a window 151*a* of the display unit 151 may be mounted to the front case 101 to form the front surface of the terminal body together with the front case 101.

In some implementations, electronic components may also be mounted to the rear case 102. Examples of those electronic components mounted to the rear case 102 may include a detachable battery, an identification module, a memory card and the like. Here, a rear cover 103 for covering the electronic components mounted may be detachably coupled to the rear case 102. Therefore, when the rear cover 103 is detached from the rear case 102, the electronic components mounted on the rear case 102 are exposed to the outside. Meanwhile, part of a side surface of the rear case 102 may be implemented to operate as a radiator.

As illustrated, when the rear cover 103 is coupled to the rear case 102, a side surface of the rear case 102 may partially be exposed. In some cases, upon the coupling, the rear case 102 may also be completely shielded by the rear cover 103. Meanwhile, the rear cover 103 may include an opening for externally exposing a camera 121*b* or an audio output module 152*b*.

The electronic device 100, referring to FIGS. 2A to 2C, may include a display 151, first and second audio output modules 152*a*, 152*b*, a proximity sensor 141, an illumination sensor 152, an optical output module 154, first and second cameras 121*a*, 121*b*, first and second manipulation units 123*a*, 123*b*, a microphone 152*c*, a wired communication module 160, and the like.

The display 151 is generally configured to output information processed in the electronic device 100. For example, the display 151 may display execution screen information of an application program executing at the electronic device 100 or user interface (UI) and graphic user interface (GUI) information in response to the execution screen information.

The display 151 may be implemented using two display devices, according to the configuration type thereof. For instance, a plurality of the display units 151 may be arranged on one side, either spaced apart from each other, or these devices may be integrated, or these devices may be arranged on different surfaces.

The display 151 may include a touch sensor that senses a touch with respect to the display 151 so as to receive a control command in a touch manner. Accordingly, when a touch is applied to the display 151, the touch sensor may sense the touch, and a processor 180 may generate a control command corresponding to the touch. Contents input in the touch manner may be characters, numbers, instructions in various modes, or a menu item that can be specified.

In this way, the display 151 may form a touch screen together with the touch sensor, and in this case, the touch screen may function as the user input unit (123, see FIG. 2A). In some cases, the touch screen may replace at least some of functions of a first manipulation unit 123*a*.

The first audio output module 152*a* may be implemented as a receiver for transmitting a call sound to a user's ear and the second audio output module 152*b* may be implemented as a loud speaker for outputting various alarm sounds or multimedia playback sounds.

The optical output module 154 may be configured to output light for indicating an event generation. Examples of such events may include a message reception, a call signal reception, a missed call, an alarm, a schedule alarm, an email reception, information reception through an application, and the like. When a user has checked a generated event, the processor 180 may control the optical output module 154 to stop the light output.

The first camera 121*a* may process image frames such as still or moving images obtained by the image sensor in a capture mode or a video call mode. The processed image frames can then be displayed on the display 151 or stored in the memory 170.

The first and second manipulation units 123*a* and 123*b* are examples of the user input unit 123, which may be manipulated by a user to provide input to the electronic device 100. The first and second manipulation units 123*a* and 123*b* may also be commonly referred to as a manipulating portion. The first and second manipulation units 123*a* and 123*b* may employ any method if it is a tactile manner allowing the user to perform manipulation with a tactile feeling such as touch, push, scroll or the like. The first and second manipulation units 123*a* and 123*b* may also be manipulated through a proximity touch, a hovering touch, and the like, without a user's tactile feeling.

On the other hand, the electronic device 100 may include a finger scan sensor which scans a user's fingerprint. The processor 180 may use fingerprint information sensed by the finger scan sensor as an authentication means. The finger scan sensor may be installed in the display 151 or the user input unit 123.

The wired communication module 160 may serve as a path allowing the electronic device 100 to interface with external devices. For example, the wired communication module 160 may be at least one of a connection terminal for connecting to another device (for example, an earphone, an external speaker, or the like), a port for near field communication (for example, an Infrared DaAssociation (IrDA) port, a Bluetooth port, a wireless LAN port, and the like), or a power supply terminal for supplying power to the electronic device 100. The wired communication module 160 may be implemented in the form of a socket for accommodating an external card, such as Subscriber Identification Module (SIM), User Identity Module (UIM), or a memory card for information storage.

The second camera 121*b* may be further mounted to the rear surface of the terminal body. The second camera 121*b* may have an image capturing direction, which is substantially opposite to the direction of the first camera unit 121*a*. The second camera 121*b* may include a plurality of lenses arranged along at least one line. The plurality of lenses may be arranged in a matrix form. The cameras may be referred to as an 'array camera.' When the second camera 121*b* is implemented as the array camera, images may be captured in various manners using the plurality of lenses and images with better qualities may be obtained. The flash 125 may be disposed adjacent to the second camera 121b. When an image of a subject is captured with the camera 121b, the flash 125 may illuminate the subject.

The second audio output module 152b may further be disposed on the terminal body. The second audio output module 152b may implement stereophonic sound functions in conjunction with the first audio output module 152a, and may be also used for implementing a speaker phone mode for call communication. The microphone 152c may be configured to receive the user's voice, other sounds, and the like. The microphone 152c may be provided at a plurality of places, and configured to receive stereo sounds.

At least one antenna for wireless communication may be disposed on the terminal body. The antenna may be embedded in the terminal body or formed in the case. Meanwhile, a plurality of antennas connected to the 4G wireless communication module 111 and the 5G wireless communication module 112 may be arranged on a side surface of the terminal. Alternatively, an antenna may be formed in a form of film to be attached onto an inner surface of the rear cover 103 or a case including a conductive material may serve as an antenna.

Meanwhile, the plurality of antennas arranged on a side surface of the terminal may be implemented with four or more antennas to support MIMO. In addition, when the 5G wireless communication module 112 operates in a millimeter-wave (mmWave) band, as each of the plurality of antennas is implemented as an array antenna, a plurality of array antennas may be arranged in the electronic device.

The terminal body is provided with a power supply unit 190 (see FIG. 2A) for supplying power to the electronic device 100. The power supply unit 190 may include a batter 191 which is mounted in the terminal body or detachably coupled to an outside of the terminal body.

Hereinafter, description will be given of embodiments of a multi-communication system and an electronic device having the same, specifically, an antenna in a heterogeneous radio system and an electronic device having the same according to the present disclosure, with reference to the accompanying drawings. It will be apparent to those skilled in the art that the present disclosure may be embodied in other specific forms without departing from the spirit or essential characteristics thereof.

Hereinafter, detailed operations and functions of an electronic device having a plurality of antennas according to one implementation that includes the 4G/5G communication modules as illustrated in FIG. 2A will be discussed.

In a 5G communication system according to an embodiment, a 5G frequency band may be a higher frequency band than a sub-6 band. For example, the 5G frequency band may be an mmWave band but is not limited thereto, and may be changed depending on applications.

Figure 3A:
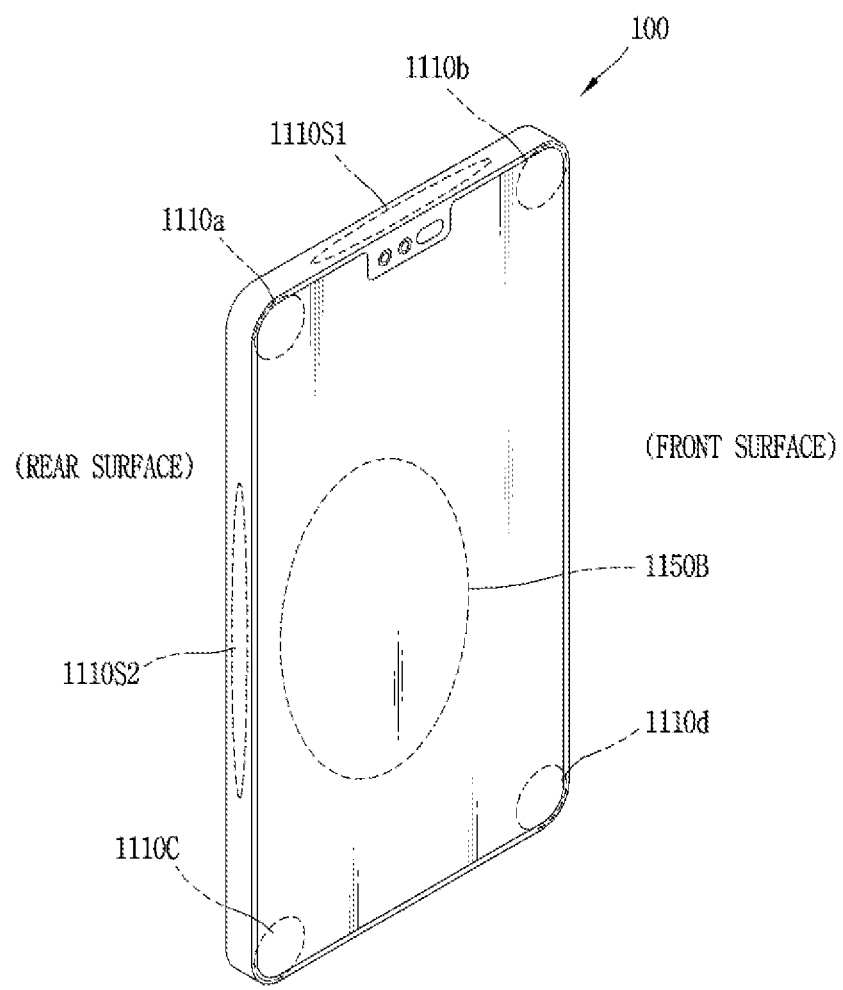
FIG. 3A illustrates an exemplary configuration in which a plurality of antennas of the electronic device can be arranged.

FIG. 3A illustrates an exemplary configuration in which a plurality of antennas of the electronic device can be arranged. Referring to FIG. 3, a plurality of antennas 1110a to 1110d may be arranged in the electronic device 100 or on a front surface of the electronic device 100. In this regard, the plurality of antennas 1110a to 1110d may be implemented in a form printed on a carrier inside the electronic device or may be implemented in a form of system-on-chip (Soc) together with an RFIC. The plurality of antennas 1110a to 1110d may be disposed on the front surface of the electronic device 100 in addition to the inside of the electronic device. Here, the plurality of antennas 1110a to 1110d disposed on the front surface of the electronic device 100 may be implemented as transparent antennas embedded in the display.

A plurality of antennas 1110S1 and 1110S2 may also be disposed on side surfaces of the electronic device 100. In this regard, 4G antennas in the form of conductive members may be disposed on the side surfaces of the electronic device 100, slots may be formed in conductive member regions such that the plurality of antennas 1110a to 1110d can radiate 5G signals through the slots. Antennas 1150B may additionally be disposed on the rear surface of the electronic device 100 to radiate 5G signals rearward.

In some examples, at least one signal may be transmitted or received through the plurality of antennas 111051 and 111052 on the side surfaces of the electronic device 100. In some examples, at least one signal may be transmitted or received through the plurality of antennas 1110a to 1110d, 1150B, 111051, and 111052 on the front surface and/or the side surfaces of the electronic device 100. The electronic device may perform communication with a base station through any one of the plurality of antennas 1110a to 1110d, 1150B, 111051, and 111052. Alternatively, the electronic device may perform MIMO communication with a base station through two or more antennas among the plurality of antennas 1110a to 1110d, 1150B, 111051, 1110S2.

Figure 3B:
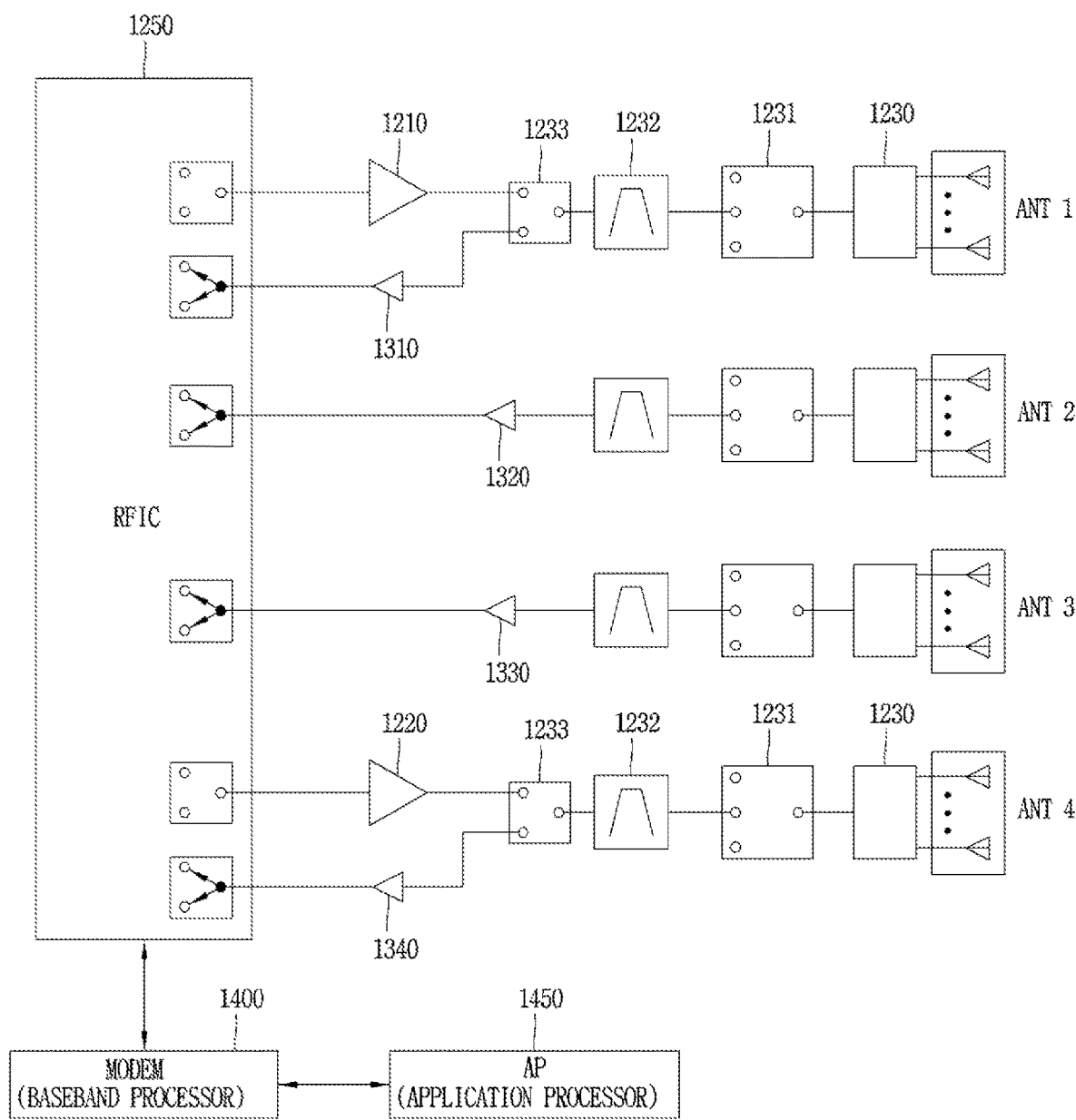
FIG. 3B is a diagram illustrating a configuration of a wireless communication module of an electronic device operable in a plurality of wireless communication systems according to an implementation.

FIG. 3B is a diagram illustrating a configuration of a wireless communication module of an electronic device operable in a plurality of wireless communication systems according to an implementation. Referring to FIG. 3B, the electronic device may include a first power amplifier 1210, a second power amplifier 1220, and an RFIC 1250. In addition, the electronic device may further include a modem 400 and an application processor (AP) 500. Here, the modem 400 and the application processor (AP) 500 may be physically implemented on a single chip, and may be implemented in a logically and functionally separated form. However, the present disclosure may not be limited thereto and may be implemented in the form of a chip that is physically separated according to an application.

Meanwhile, the electronic device may include a plurality of low noise amplifiers (LNAs) 410 to 440 in the receiver. Here, the first power amplifier 1210, the second power amplifier 1220, the RFIC 1250, and the plurality of low noise amplifiers 310 to 340 are all operable in a first communication system and a second communication system. In this case, the first communication system and the second communication system may be a 4G communication system and a 5G communication system, respectively.

As illustrated in FIG. 3B, the RFIC 1250 may be configured as a 4G/5G integrated type, but the present disclosure may not be limited thereto. The RFIC 250 may be configured as a 4G/5G separate type according to an application. When the RFIC 1250 is configured as the 4G/5G integrated type, it may be advantageous in terms of synchronization between 4G and 5G circuits, and simplification of control signaling by the modem 1400.

On the other hand, when the RFIC 1250 is configured as the 4G/5G separate type, it may be referred to as a 4G RFIC and a 5G RFIC, respectively. In particular, when there is a great band difference between the 5G band and the 4G band, such as when the 5G band is configured as a millimeter wave band, the RFIC 1250 may be configured as a 4G/5G separated type. As such, when the RFIC 1250 is configured as the 4G/5G separate type, there may be an advantage that the RF characteristics can be optimized for each of the 4G band and the 5G band.

Meanwhile, even when the RFIC 1250 is configured as the 4G/5G separate type, the 4G RFIC and the 5G RFIC may be logically and functionally separated but physically implemented in one chip.

On the other hand, the application processor (AP) 1450 may be configured to control the operation of each component of the electronic device. Specifically, the application processor (AP) 1450 may control the operation of each component of the electronic device through the modem 1400.

For example, the modem 1400 may be controlled through a power management IC (PMIC) for low power operation of the electronic device. Accordingly, the modem 1400 may operate power circuits of a transmitter and a receiver through the RFIC 1250 in a low power mode.

In this regard, when it is determined that the electronic device is in an idle mode, the application processor (AP) 500 may control the RFIC 1250 through the modem 300 as follows. For example, when the electronic device is in an idle mode, the application processor 280 may control the RFIC 1250 through the modem 400, such that at least one of the first and second power amplifiers 110 and 120 operates in the low power mode or is turned off.

According to another embodiment, the application processor (AP) 500 may control the modem 400 to provide wireless communication capable of performing low power communication when the electronic device is in a low battery mode. For example, when the electronic device is connected to a plurality of entities among a 4G base station, a 5G base station, and an access point, the application processor (AP) 1450 may control the modem 1400 to enable wireless communication at the lowest power. Accordingly, even though a throughput is slightly sacrificed, the application processor (AP) 500 may control the modem 1400 and the RFIC 1250 to perform short-range communication using only the short-range communication module 113.

According to another implementation, when a remaining battery capacity of the electronic device is equal to or greater than a threshold value, the application processor 1450 may control the modem 300 to select an optimal wireless interface. For example, the application processor (AP) 1450 may control the modem 1400 to receive data through both the 4G base station and the 5G base station according to the remaining battery capacity and the available radio resource information. In this case, the application processor (AP) 1450 may receive the remaining battery capacity information from the PMIC and the available radio resource information from the modem 1400. Accordingly, when the remaining battery capacity and the available radio resources are sufficient, the application processor (AP) 500 may control the modem 1400 and the RFIC 1250 to receive data through both the 4G base station and 5G base station.

Meanwhile, in a multi-transceiving system of FIG. 3B, a transmitter and a receiver of each radio system may be integrated into a single transceiver. Accordingly, a circuit portion for integrating two types of system signals may be removed from an RF front-end.

In addition, since the front-end component can be controlled by the integrated transceiver, the front-end component can be more efficiently integrated than a case where the transceiving system is separated for each communication system.

In addition, when separated for each communication system, different communication systems cannot be controlled as needed, or because this may lead to a system delay, resources cannot be efficiently allocated. On the other hand, in the multi-transceiving system as illustrated in FIG. 2, different communication systems can be controlled as needed, system delay can be minimized, and resources can be efficiently allocated.

Meanwhile, the first power amplifier 1210 and the second power amplifier 1220 may operate in at least one of the first and second communication systems. In this regard, when the 5G communication system operates in a 4G band or a Sub 6 band, the first and second power amplifiers 1210 and 1220 can operate in both the first and second communication systems.

On the other hand, when the 5G communication system operates in a millimeter wave (mmWave) band, one of the first and second power amplifiers 1210 and 1220 may operate in the 4G band and the other in the millimeter-wave band.

On the other hand, two different wireless communication systems may be implemented in one antenna by integrating a transceiver and a receiver to implement a two-way antenna. In this case, 4×4 MIMO may be implemented using four antennas as illustrated in FIG. 2. At this time, 4×4 DL MIMO may be performed through downlink (DL).

Meanwhile, when the 5G band is a Sub 6 band, first to fourth antennas ANT1 to ANT4 may be configured to operate in both the 4G band and the 5G band. On the contrary, when the 5G band is the millimeter wave (mmWave) band, first to fourth antennas ANT1 to ANT4 may be configured to operate in either one of the 4G band and the 5G band. In this case, when the 5G band is the millimeter wave (mmWave) band, each of the plurality of antennas may be configured as an array antenna in the millimeter wave band.

Meanwhile, 2×2 MIMO may be implemented using two antennas connected to the first power amplifier 1210 and the second power amplifier 1220 among the four antennas. At this time, 2×2 UL MIMO (2 Tx) may be performed through uplink (UL). Alternatively, the present disclosure is not limited to 2×2 UL MIMO, and may also be implemented as 1 Tx or 4 Tx. In this case, when the 5G communication system is implemented by 1 Tx, only one of the first and second power amplifiers 1210 and 1220 need to operate in the 5G band. Meanwhile, when the 5G communication system is implemented by 4 Tx, an additional power amplifier operating in the 5G band may be further provided. Alternatively, a transmission signal may be branched in each of one or two transmission paths, and the branched transmission signal may be connected to a plurality of antennas.

On the other hand, a switch-type splitter or power divider is embedded in RFIC corresponding to the RFIC 1250. Accordingly, a separate component does not need to be placed outside, thereby improving component mounting performance. In detail, a transmitter (TX) of two different communication systems can be selected by using a single pole double throw (SPDT) type switch provided in the RFIC corresponding to the controller 1250.

In addition, the electronic device capable of operating in a plurality of wireless communication systems according to an implementation may further include a phase controller 1230, a duplexer 1231, a filter 1232, and a switch 1233.

In a frequency band such as a mmWave band, the electronic device needs to use a directional beam to secure coverage for communication with a base station. To this end, each of the antennas ANT1 to ANT4 needs to be implemented as an array antenna ANT1 to ANT4 including a plurality of antenna elements. Specifically, the phase controller 1230 may control a phase of a signal applied to each antenna element of each of the array antennas ANT1 to ANT4. Specifically, the phase controller 1230 may control both magnitude and phase of a signal applied to each antenna element of each of the array antennas ANT1 to ANT4. Since the phase controller 1230 controls both the magnitude and the phase of the signal, it may be referred to as a power and phase controller 1230.

Therefore, by controlling the phase of the signal applied to each antenna element of each of the array antennas ANT1 to ANT4, beam-forming can be independently performed through each of the array antennas ANT1 to ANT4. In this regard, multi-input/multi-output (MIMO) may be performed through each of the array antennas ANT1 to ANT4. In this case, the phase controller 1230 may control the phase of the signal applied to each antenna element so that each of the array antennas ANT1 to ANT4 can form beams in different directions.

The duplexer 1231 may be configured to separate a signal in a transmission band and a signal in a reception band from each other. In this case, the signal in the transmission band transmitted through the first and second power amplifiers 1210 and 1220 may be applied to the antennas ANT1 and ANT4 through a first output port of the duplexer 1231. On the contrary, signals in a reception band received through the antennas ANT1 and ANT4 are received by the low noise amplifiers 310 and 340 through a second output port of the duplexer 1231.

The filter 1232 may be configured to pass a signal in a transmission band or a reception band and to block a signal in a remaining band. In this case, the filter 1232 may include a transmission filter connected to the first output port of the duplexer 1231 and a reception filter connected to the second output port of the duplexer 1231. Alternatively, the filter 1232 may be configured to pass only the signal in the transmission band or only the signal in the reception band according to a control signal.

The switch 1233 may be configured to transmit only one of a transmission signal and a reception signal. In an implementation of the present disclosure, the switch 1233 may be configured in a single-pole double-throw (SPDT) form to separate the transmission signal and the reception signal in a time division duplex (TDD) scheme. Here, the transmission signal and the reception signal are signals of the same frequency band, and thus the duplexer 1231 may be implemented in the form of a circulator.

Meanwhile, in another implementation of the present disclosure, the switch 1233 may also be applied to a frequency division multiplex (FDD) scheme. In this case, the switch 1233 may be configured in a form of a double-pole double-throw (DPDT) to connect or block the transmission signal and the reception signal, respectively. On the other hand, since the transmission signal and the reception signal can be separated by the duplexer 1231, the switch 1233 may not be necessarily required.

Meanwhile, the electronic device according to the implementation may further include a modem 1400 corresponding to the controller. In this case, the RFIC 1250 and the modem 1400 may be referred to as a first controller (or a first processor) and a second controller (a second processor), respectively. On the other hand, the RFIC 1250 and the modem 1400 may be implemented as physically separated circuits. Alternatively, the RFIC 1250 and the modem 1400 may be logically or functionally distinguished from each other on one physical circuit.

The modem 1400 may perform controlling of signal transmission and reception and processing of signals through different communication systems using the RFID 1250. The modem 1400 may acquire control information from a 4G base station and/or a 5G base station. Here, the control information may be received through a physical downlink control channel (PDCCH), but may not be limited thereto.

The modem 1400 may control the RFIC 1250 to transmit and/or receive signals through the first communication system and/or the second communication system for a specific time interval and from frequency resources. Accordingly, the RFIC 1250 may control transmission circuits including the first and second power amplifiers 1210 and 1220 to transmit a 4G signal or a 5G signal in the specific time interval. In addition, the RFIC 1250 may control reception circuits including the first to fourth low noise amplifiers 1310 to 1340 to receive a 4G signal or a 5G signal at a specific time interval.

On the other hand, in the electronic device illustrated in FIGS. 1 to 2B, the specific configuration and function of the electronic device including the antennas disposed inside the electronic device as illustrated in FIG. 3A and the multi-transceiving system as illustrated in FIG. 3B will be described below.

In this regard, electronic devices may be configured to provide 5G communication services in various frequency bands. Recently, attempts have been made to provide 5G communication services using a Sub-6 band under a 6 GHz band. In the future, it is also expected to provide 5G communication services by using a millimeter-wave (mmWave) band in addition to the Sub-6 band for a faster data rate.

Meanwhile, a 28 GHz band, a 38.5 GHz band, and a 64 GHz band are being considered as frequency bands to be allocated for 5G communication services in such mmWave bands. In this regard, a plurality of array antennas may be disposed in an electronic device in the mmWave bands.

In relation to this, an array antenna that can operate in a millimeter-wave (mmWave) band may be mounted within an antenna module. A problem is that an electrical loss may occur between a feed line for feeding an antenna element within the antenna module and the antenna element, depending on the polarization of the antenna element.

In particular, a higher electrical loss may occur between the feed line and the antenna element, because of the short wavelength in high-frequency bands such as mmWave bands.

The present disclosure has been made in an effort to solve the aforementioned problems and other problems. Another aspect of the present disclosure is to provide an electronic device including an antenna module with an array antenna disposed therein that operates in a millimeter-wave band, and a configuration for controlling the same.

Another aspect of the present disclosure is to provide a low-loss feeding structure in an antenna module operating in a millimeter-wave band.

Another aspect of the present disclosure is to provide an antenna module whose antenna peak gain is improved according to a low-loss feeding structure.

Another aspect of the present disclosure is to provide a transition structure in which an electrical loss caused by polarization mismatch can be reduced if a feed line and an antenna have different polarization directions.

Another aspect of the present disclosure is to provide an asymmetrical transition feeding structure in an antenna module operating in a millimeter-wave band, in consideration of polarization characteristics of an antenna.

Another aspect of the present disclosure is to provide an antenna structure having a low-loss feeding structure while reducing height.

Another aspect of the present disclosure is to provide an electronic device with an array antenna having a low-loss feeding structure.

Figure 4A:
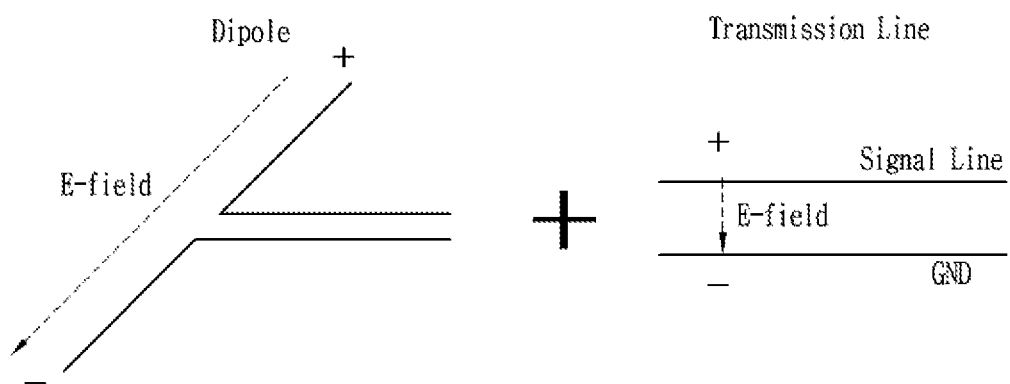
FIGS. 4A and 4B are views comparing electric fields formed in a transmission line and an antenna region according to the present disclosure.
Figure 4B:
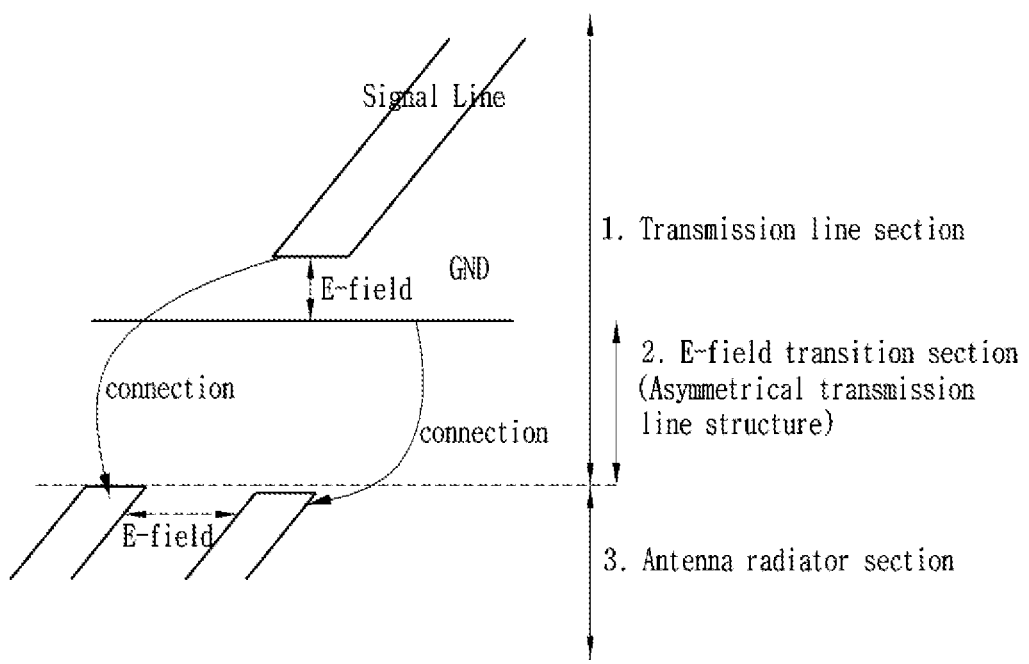

In relation to this, FIGS. 4A and 4B are views comparing electric fields formed in a transmission line and an antenna region according to the present disclosure.

Referring to FIG. 4A, an electric field (E-field) is formed horizontally on an antenna element such as a dipole antenna. On the contrary, an electric field (E-field) is formed vertically between a signal line constituting a transmission line and a ground GND. Accordingly, a transition between a vertical electric field component and a horizontal electric field component is required in a transition region between the transmission line and the antenna. Thus, a signal loss may occur between the transmission line and the antenna element unless such a transition between electric field components is done efficiently. In particular, a high signal loss may occur between the transmission line and the antenna element in high frequency bands such as millimeter wave bands.

In relation to this, in the case of a micro-strip line, a strip line, or CPWG, an electric field is formed vertically. On the contrary, in the case of an end-fire antenna (e.g., dipole antenna) having a horizontal polarization, an electric field is formed horizontally. Accordingly, if an electric field formed on a feed line and an electric field formed on an antenna are different from each other, an electrical loss may occur. This may cause a loss in a transition structure between the feed line and the antenna or degrade the reflection coefficient performance of the antenna, thereby reducing antenna peak gain.

In relation to this, the feeding structure may be formed as a Balun structure. However, a Balun feeding structure is hard to form a ground region. Thus, the characteristic impedance of the transmission line cannot be kept at 50 ohm. This still poses problems such as degradation of the reflection coefficient performance of the antenna and reduction in antenna peak gain.

Referring to FIG. 4B, an electric field (E-field) is formed horizontally on an antenna element such as a dipole antenna, a folded dipole antenna, a loop antenna, or a patch antenna. On the contrary, an electric field (E-field) is formed vertically between a signal line constituting a transmission line and a ground GND. Accordingly, a transition between a vertical electric field component and a horizontal electric field component is required in a transition region between the transmission line and the antenna. To this end, in the present disclosure, an E-field transition section may be formed. Thus, in the E-field transition section, some of the components of the transmission line in the transition section may be changed so that a transition occurs between a vertical electric field of the transmission line and a horizontal electric field component of the antenna.

In relation to this, on a transmission line in a transmission line section, a signal line and a ground region may have a symmetrical shape. On the contrary, on a transmission line in an E-field transition section, a signal line and a ground region may have an asymmetrical shape. In relation to this, an asymmetrical transition structure proposed in the present disclosure has the following technical characteristics:

1) A transmission line in an asymmetrical transition structure proposed in the present disclosure is not connected to an antenna, but the transmission line may be connected to the antenna only through a transition structure.

2) The transition structure may be an asymmetrical transition structure so that an electric field transferred to the antenna from the transmission line is formed as a horizontal electric field like an electric field in a radiator.

3) The reflection coefficient and insertion loss characteristics of a transmission line having a transition structure may be improved by an electric field transition structure, and therefore the antenna bandwidth characteristics also may be improved.

4) The antenna peak gain performance of a transmission line having a transition structure may be maintained without distortion by means of an electric field transition structure.

Figure 5A:
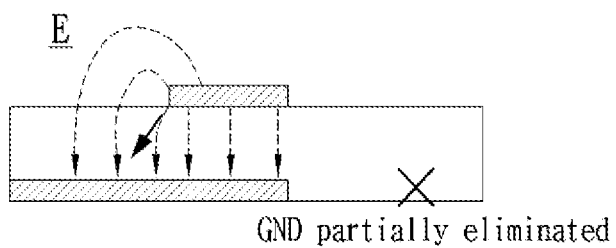
FIGS. 5A and 5B show an asymmetrical transition structure which may be formed between a transmission line and an antenna according to one embodiment.
Figure 5A:
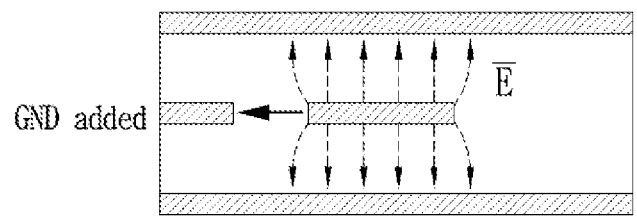
Figure 5A:
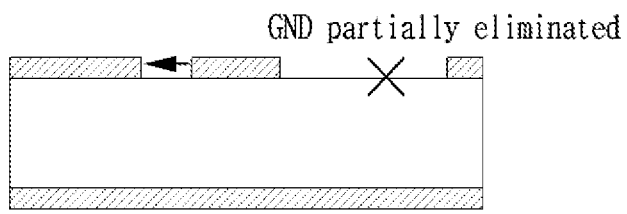
Figure 5B:
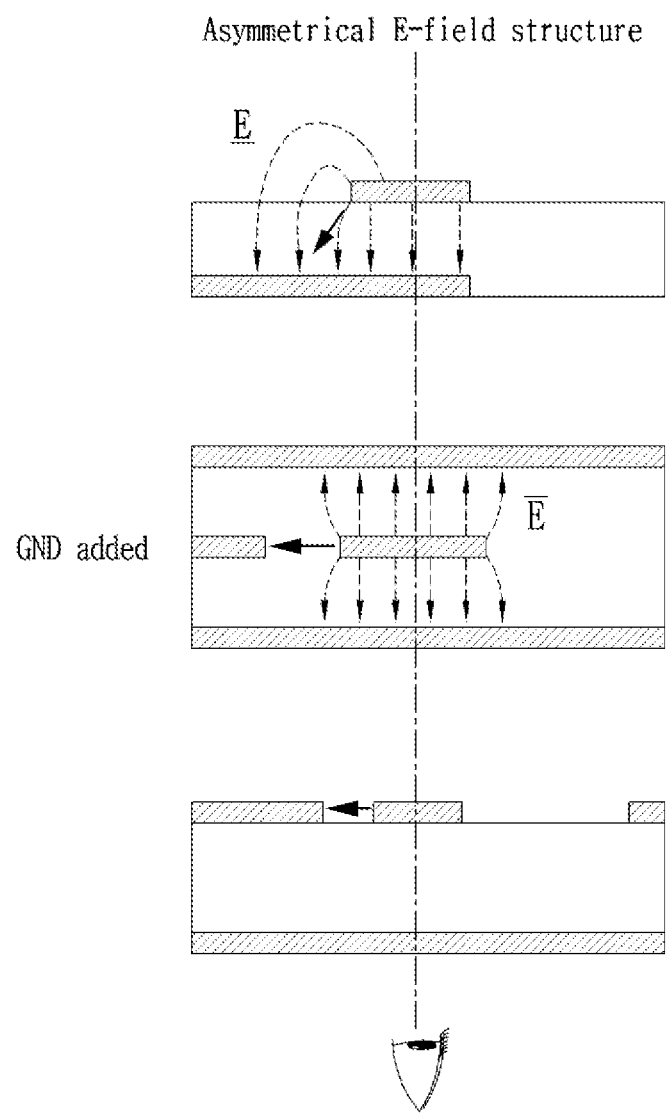

In relation to this, FIGS. 5A and 5B show an asymmetrical transition structure which may be formed between a transmission line and an antenna according to one embodiment.

Referring to FIG. 5A, the asymmetrical transition structure may be formed as an asymmetrical micro-strip line structure, an asymmetrical strip line structure, or an asymmetrical co-planar structure.

In the asymmetrical micro-strip line structure, the lower ground GND may be partially eliminated. Thus, the lower ground GND may be disposed only in one side portion. Accordingly, a partial horizontal electric field component between a signal line and the ground GND disposed in the one side portion may be formed, as well as a vertical electric field component between the signal line and the ground GND. This partial horizontal electric field component allows for a transition between a vertical electric field component of the transmission line and a horizontal electric field component of the antenna.

In the asymmetrical strip-line structure, a ground plane may be disposed in one side portion on the same plane as a signal line on the inside. Thus, an asymmetrical ground plane may be formed inside the strip line. Accordingly, a partial horizontal electric field component between the signal line and the ground GND disposed in the one side portion may be formed, as well as a vertical electric field component between the signal line and the upper/lower ground. This partial horizontal electric field component allows for a transition between a vertical electric field component of the transmission line and a horizontal electric field component of the antenna.

In the asymmetrical co-planar structure, a ground plane may be formed adjacent only to one side portion on the same plane as a signal line. That is, a ground plane in the other side on the same plane as the signal line may be partially eliminated. Accordingly, a partial horizontal electric field component between the signal line and the ground GND disposed in the one side portion may be formed, as well as a vertical electric field component between the signal line and the lower ground. This partial horizontal electric field component allows for a transition between a vertical electric field component of the transmission line and a horizontal electric field component of the antenna.

Therefore, the intensity of an E-field is strengthened in a certain direction through an asymmetrical transition structure in FIG. 5A, such as an asymmetrical micro-strip line structure, an asymmetrical strip line structure, or an asymmetrical co-planar structure. That is, through the asymmetrical transition structure, a horizontal component of the E-field may be more dominant than a vertical component thereof.

Referring to FIG. 5B, in the asymmetrical micro-strip line structure, the micro-strip line formed on the left side and the micro-strip line formed on the right side have an asymmetrical structure. That is, the left and right portions in the lower ground region have an asymmetrical structure.

In the asymmetrical strip line structure, the ground plane formed inside the strip line structure is an asymmetrical structure. For example, the ground plane formed inside the strip line structure may be formed only in the left portion, but not limited thereto and formed differently depending on the application. For another example, the ground plane formed inside the strip line structure may have an asymmetrical structure in which a left portion and a right portion are arranged with different proportions.

In the asymmetrical co-planar structure, the ground region formed on the left side and the ground region formed on the right side have an asymmetrical structure. That is, the distance from the signal line to the ground region formed on the left side and the distance from the signal line to the ground region formed on the right side may be different. However, the ground regions are not limited to such a structure, but may be configured in such a way the ground region on the right side is eliminated in some transition section. Alternatively, in some transition section, no vias may be disposed between the upper and lower grounds on the right side, or the distance between vias may be widened. Accordingly, the asymmetrical structure of FIG. 5B may include an arbitrary asymmetrical transition structure in which a left portion and a right portion are configured differently with respect to a center line to form a vertical electric field component.

Meanwhile, in relation to such an asymmetrical transition structure, an asymmetrical strip-line structure or an asymmetrical co-planar structure will be described. In relation to this, an asymmetrical transition structure disclosed in this disclosure may include an asymmetrical micro-strip line structure, apart from the asymmetrical strip-line structure or the asymmetrical co-planar structure.

Figure 6A:
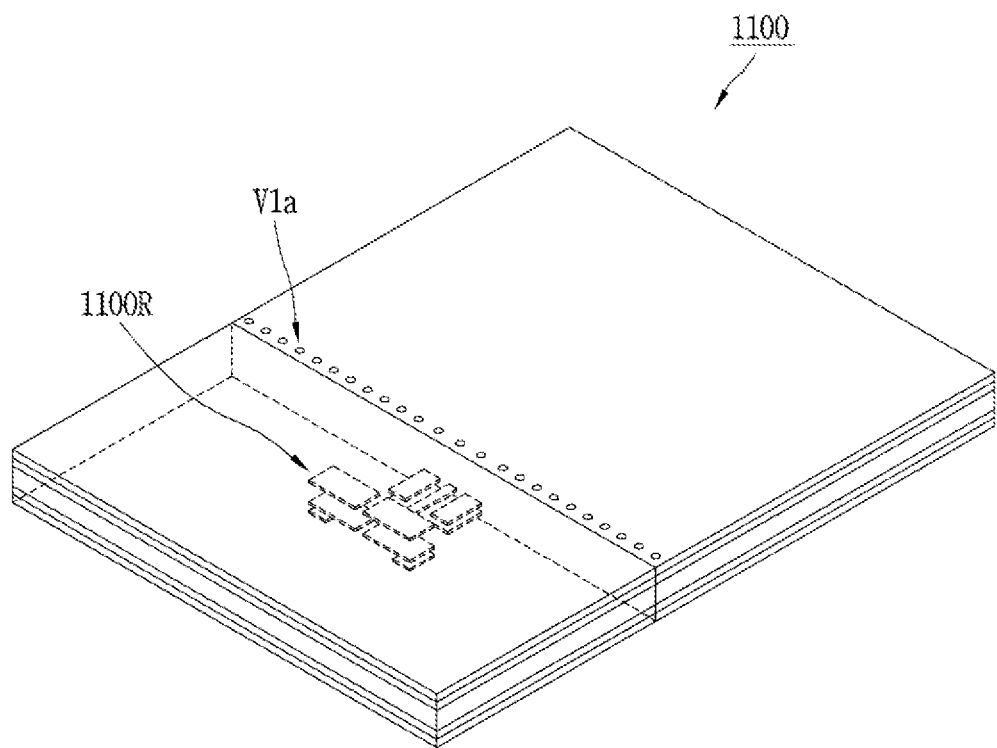
FIGS. 6A to 6C include a front perspective view, an internal perspective view, and a side view of an antenna module implemented on a multi-layer substrate according to an embodiment.
Figure 6B:
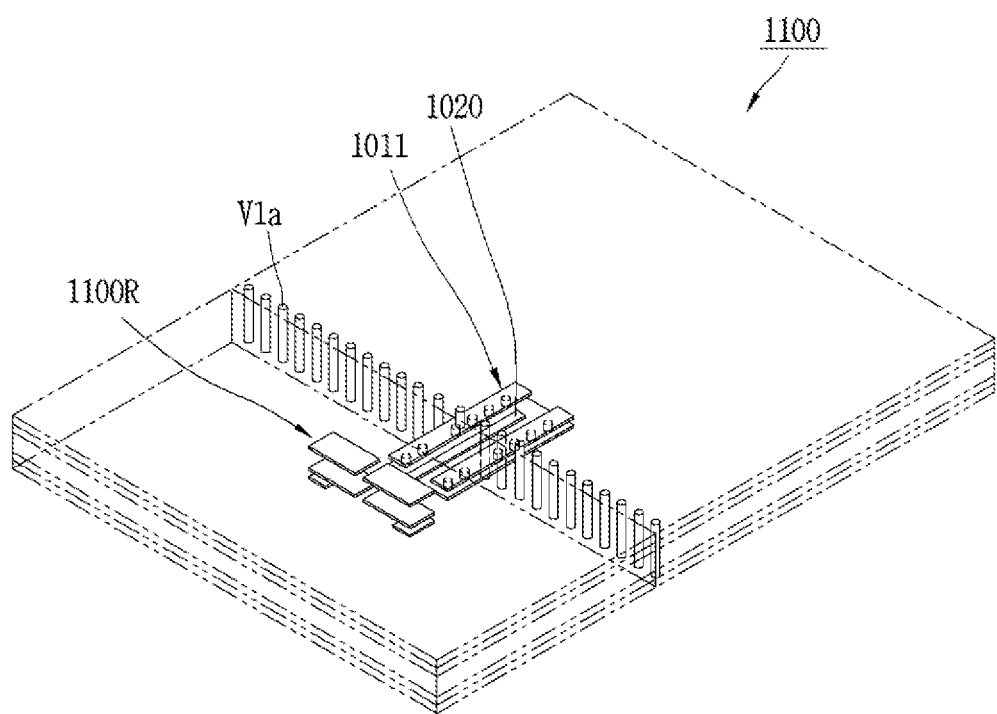
Figure 6C:
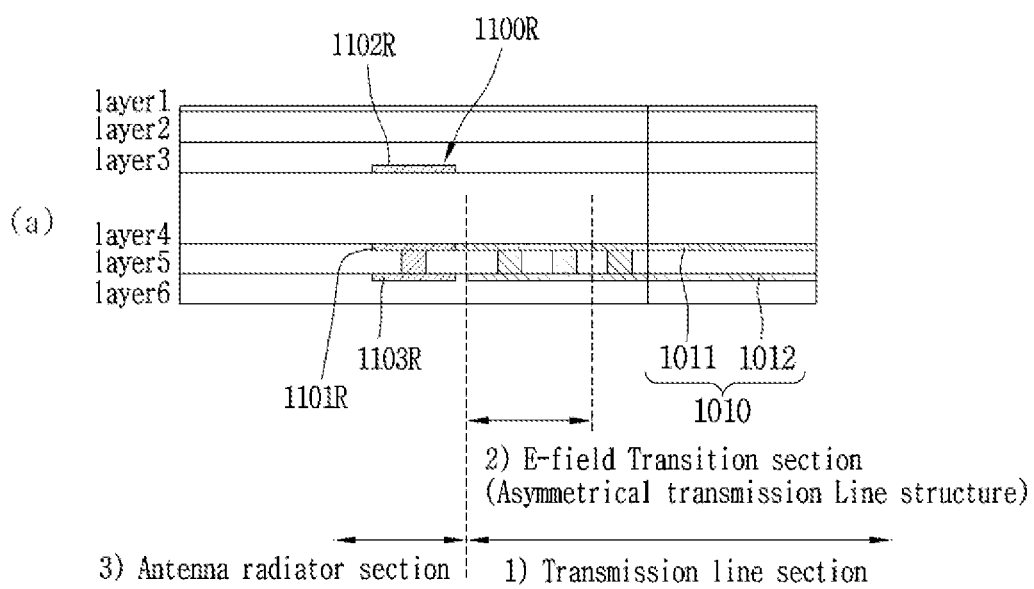
Figure 6C:
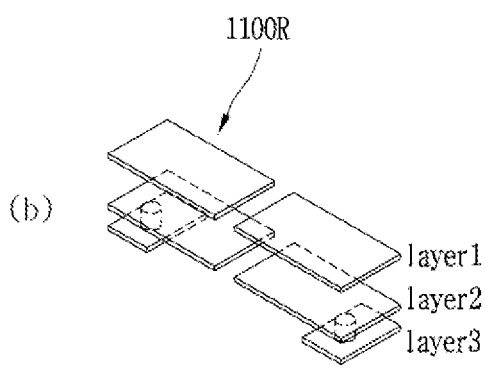

FIGS. 6A to 6C include a front perspective view, an internal perspective view, and a side view of an antenna module implemented on a multi-layer substrate according to an embodiment. FIG. 6C shows a side view of an antenna module implemented on a multi-layer substrate and radiators implemented on a plurality of layers.

Referring to FIGS. 6A to 6C, an antenna module implemented on a multi-layer substrate, that is disclosed in the present disclosure has the following technical characteristics. However, the technical characteristics to be claimed in the present disclosure are not limited to the following technical characteristics:

1) FIG. 6A is a perspective view of the antenna module, which corresponds to an overall shape of the antenna module, and the antenna module may include a dielectric body, radiators, a feeding portion, and a ground.

2) FIG. 6B is a transparent perspective view of an inside of the antenna module. An antenna according to an embodiment may be a dipole antenna which operates so as to resonate in a 60 GHz band. In the antenna region, an E-field (electric field) is formed dominantly in a horizontal direction parallel to the substrate, in which the intensity of the electric field is the highest. Accordingly, radiators 1100R disclosed in the present disclosure may be formed to have horizontal polarization characteristics.

3) FIG. 6C is a cross-sectional view of the antenna module as viewed from a side. For example, a multi-layer substrate consisting of six layers may be used, but not limited thereto. The antenna module corresponding to the multi-layer substrate may be divided into a radiator section and a transmission line section. For example, a predetermined portion of the transmission line section may be an E-field transition section which is a transition section between the transmission line and the radiators.

4) For example, the transmission line may be disposed on a fourth layer and a fifth layer, but not limited thereto. A feed line connected to the antenna may be configured as a CPWG (coplanar waveguide with ground), but not limited thereto, and also may be configured as a stripe line or micro-strip line structure. The ground GND on the feed line may be electrically connected to an entire ground region on the top of the antenna module. In the case of signal delivery through a signal line, the signal line corresponds to a strip line structure since the entire ground region on the top and the ground on the inside are disposed longitudinally.

5) An E-field on the transmission line is formed dominantly in a vertical direction, in which the intensity of the electric field is the highest.

6) In relation to the entire ground region, the ground may be disposed on a first layer which is the uppermost layer and a sixth layer which is the lowermost layer. In relation to this, a ground exposed to an outer region of the antenna module and a ground disposed in an inner area thereof may be interconnected through vias and serve as a reflector for the dipole radiator.

7) A conductor of the radiator, i.e., a metal pattern, may be disposed on different layers inside the multi-layer substrate. For example, a conductor of the radiator, i.e., a metal pattern, may be disposed on a fourth layer and a fifth layer. For another example, a conductor of the radiator, i.e., a metal pattern, may be disposed on a third layer, the fourth layer, and the fifth layer. For another example, a conductor of the radiator, i.e., a metal pattern, may be disposed on the third layer and the fourth layer.

8) A conductor disposed on the fourth layer and a conductor disposed on the fifth layer may be interconnected through vias and designed so as to determine the resonant frequency band of the antenna.

9) A conductor disposed on the third layer may be formed to adjust the impedance of the antenna. Meanwhile, the conductor disposed on the third layer may be configured to be coupled to the radiators disposed on the fourth layer and the fifth layer and have broadband characteristics at 60 GHz. In relation to this, the radiators disposed on the third layer, the fourth layer, and the fifth layer may be designed to have an impedance close to 50 ohm, in order to have broadband characteristics.

Figure 7A:
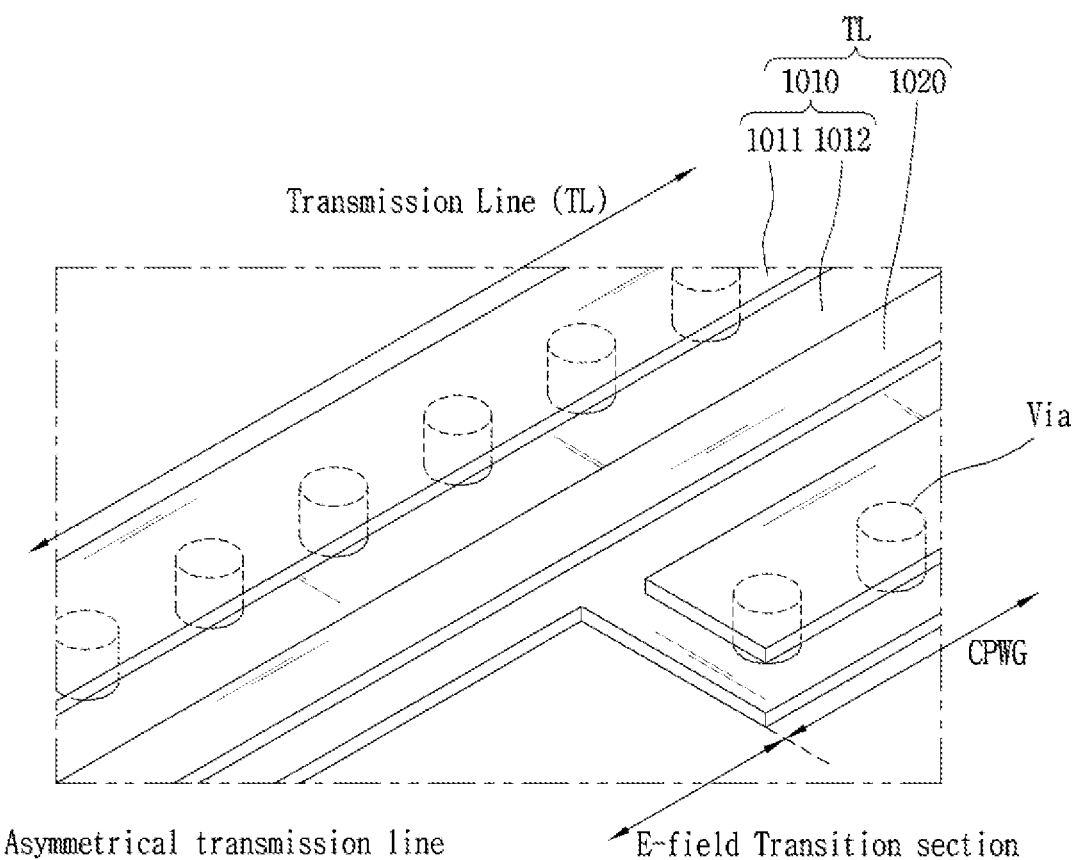
FIGS. 7A to 7C show an asymmetrical transition structure and a field distribution according to various embodiments.
Figure 7B:
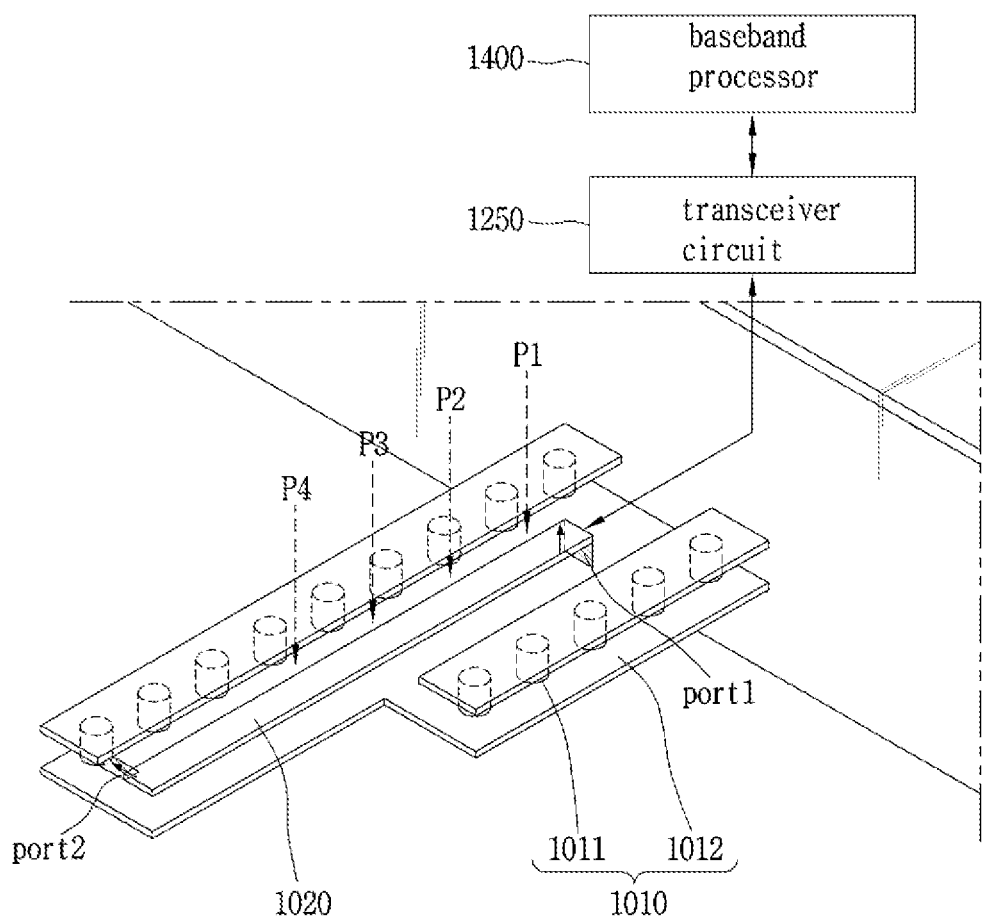
Figure 7C:
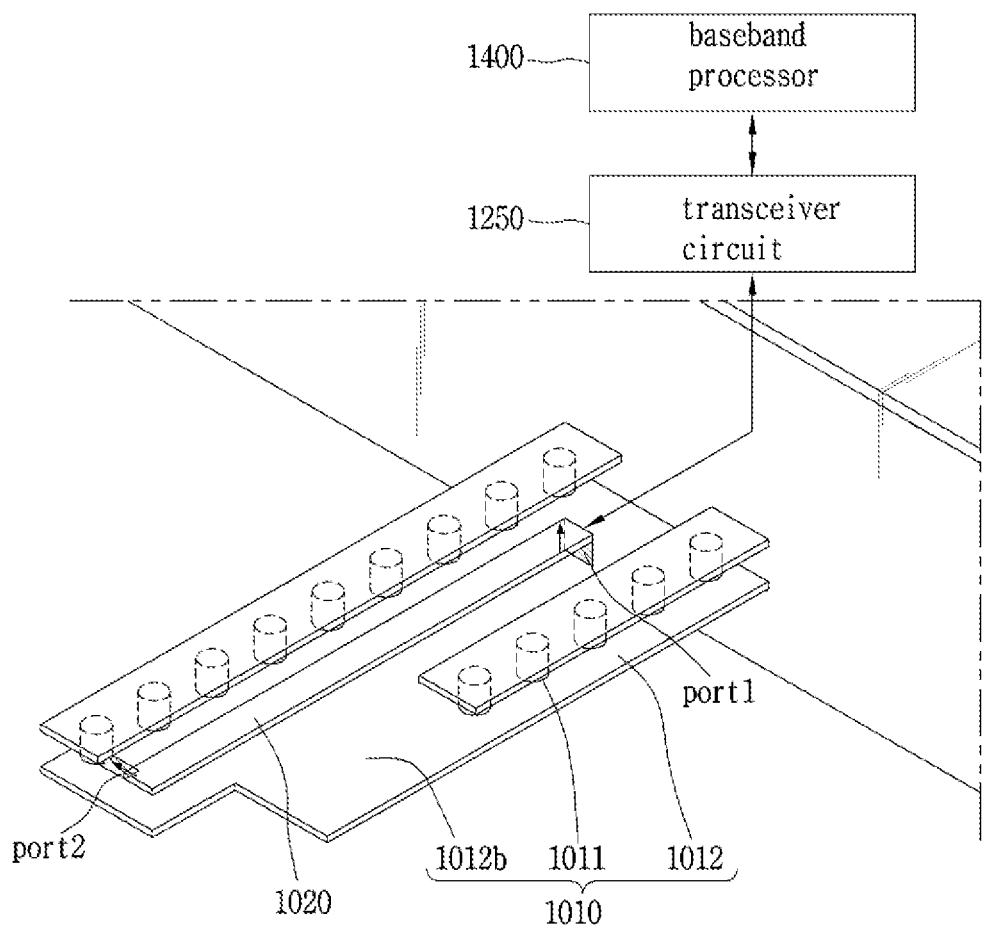

Referring to FIG. 7A and FIG. 7C, an asymmetrical transition structure implemented on a multi-layer substrate, that is disclosed in the present disclosure, has the following technical characteristics. However, the technical characteristics to be claimed in the present disclosure are not limited to the following technical characteristics:

1) FIG. 7A shows a structure of a transmission line TL, which may include a CPWG feed line and a transition structure.

2) CPWG has a signal line and a ground disposed on both sides and the bottom of the signal line. A first ground plane on an upper side and a second ground plane on a lower side are electrically connected through vias.

3) The transition structure includes an asymmetrical transmission line having a left-right asymmetrical structure with respect to the center of the signal line.

4) In one embodiment, in the transition structure, a metal pattern and vias corresponding to one of the grounds on both sides of the signal line may be removed from CPWG in order to form the transition structure as a left-right asymmetrical structure.

5) The second ground layer positioned under a layer where the removed metal pattern is disposed may be at least partially removed.

6) Referring to FIG. 7B, the direction of a dominantly produced E-field is indicated on one ground adjacent to a signal line corresponding to the feed line.

7) In CPWG, an E-field is formed dominantly in a vertical direction, in which the intensity of the E-field is the highest. On the other hand, the E-field in the horizontal direction is relatively weaker than the E-field in the vertical direction.

8) The intensity of a horizontal E-field in the transition structure which is an asymmetrical feed line is higher than the intensity of a horizontal E-field in CPWG having a symmetrical structure.

Meanwhile, FIGS. 7A to 7C show an asymmetrical transition structure and a field distribution according to various embodiments. FIG. 7A is an enlarged view of an asymmetrical transmission line. FIG. 7B shows a conceptual diagram of a horizontal electric field component formed on an asymmetrical transmission line from which a lower ground in a predetermined section is removed. FIG. 7C shows a conceptual diagram of a horizontal electric field component formed on an asymmetrical transmission line on which a lower ground in a predetermined section is partially formed.

Referring to FIGS. 6A to 7C, an electronic device 1000 according to an embodiment may include first and second ground planes 1011 and 1012, a signal line 1020, and radiators 1100R. In relation to this, the first and second ground planes 1011 and 1012 may be called a ground plane 1010. Also, the ground plane 1010 and the signal line 1020 may be called a transmission line TL.

Meanwhile, the electronic device may further include a transceiver circuit 1250 and a processor 1400. In relation to this, a multi-layer substrate may correspond to an antenna module (ANT) 1100. For example, the transceiver circuit 1250 and the processor 1400 may be disposed on a circuit substrate which is different from the antenna module (ANT) 1100. For another example, part of the transceiver circuit 1250 may be disposed on a multi-layer substrate corresponding to the antenna module (ANT) 1100.

The first and second ground planes 1011 and 1012 may be arranged on different layers of the multi-layer substrate, and configured to be connected to each other through vias spaced a predetermined distance apart from each other. The signal line 1020 may be configured to be disposed on the same plane as the first ground plane 1011 which is the upper one between the first and second ground planes. The first ground plane may be disposed only in either one region or the other region of the signal line 1020 in a predetermined section.

The radiators 1100R may be electrically connected, and configured to radiate a signal. The radiators 1100R may be disposed on the same plane as the signal line 1020, and may be configured as a dipole antenna including a first metal pattern MP1 and a second metal pattern MP2. In relation to this, the first metal pattern MP1 may be connected to the signal line 1020, and the second metal pattern MP2 may be connected to the first ground plane 1011 constituting the asymmetrical transmission line.

The radiators 1100R may be formed as a dipole antenna, but not limited thereto. The radiators 1100R may be implemented as a folded antenna, a loop antenna, a patch antenna, or an antenna having a certain metal pattern. The radiators 1100R may include first radiators 1101R which are lower radiators and second radiators 1102R which are upper radiators. Also, the radiators 1100R may further include third radiators 1103R disposed under the first radiators 1101R which are the lower radiators.

The first radiators 1101R may be formed as a dipole antenna, and configured to be connected to the signal line. The second radiators 1102R may be configured to be disposed on a layer overlying the layer where the dipole antenna is disposed. The third radiators 1103R may be disposed on a layer underlying the first radiators 1101R. The third radiators 1103R may be configured to be connected to an end of the first radiators 1101R through vertical vias.

The first ground plane 1011 which is an upper ground may be disposed in one side portion and the other side portion of the signal line 1020 in a first section forming a transmission line TL. On the other hand, the first ground plane 1011 may be disposed only in one side portion of the signal line 1020 in a second section which is a transition section between the transmission line TL and the radiators 1100R, thereby forming an asymmetrical transmission line.

Referring to FIGS. 7A and 7B, the second ground plane 1012 which is a lower ground may be disposed in one side portion and the other side portion of a signal line in the first section. On the other hand, the second ground plane 1012 may be disposed only in one side portion of the signal line 1020 in the second section. Accordingly, the second ground plane 1012 which is the lower ground may be formed to correspond to the first ground plane 1011 which is the upper ground.

Referring to FIG. 7C, in the second ground plane 1012b which is the lower ground, a partial ground region may be formed without via connections in the second section according to the transition structure. In relation to this, a partial ground region may be formed without via connections in the second section so that a vertical electric field component at an end of the first section is gradually changed into a horizontal electric field component through the second section.

Accordingly, the second ground plane 1012b may be disposed in one side portion and the other portion of the signal line 1020 in the first section. Meanwhile, the second ground plane 1012b may be disposed in the entire one side portion of the second section and part of the other side portion thereof. In relation to this, vias connecting the first ground plane 1011 and the second ground plane 1012b may be disposed in one side portion in the second section. On the other hand, no vias connecting the first ground plane 1011 and the second ground plane 1012b may be configured not to be disposed in the other side portion in the second section.

Referring to FIGS. 7A to 7C, an electric field in the first section may be formed in such a way that a vertical electric field component between the signal line 1020 and the second ground plane 1012 and 1012b is larger than a horizontal electric field component. On the other hand, an electric field in the second section may be formed in such a way that a horizontal component between the signal line 1020 and the first ground plane 1011 is larger than a vertical electric field component. Alternatively, a horizontal electric field component in the second section may be larger than a horizontal electric field component in the first section, regardless of the magnitude of the vertical electric field component.

According to another embodiment, in the second ground plane 1012b which is the lower ground, a partial ground region may be formed without via connections in the second section according to the transition structure. In relation to this, a partial ground region may be formed without via connections in the second section so that a vertical electric field at an end of the first section is gradually changed into a horizontal electric field component through the second section.

Accordingly, the second ground plane 1012b may be disposed in one side portion and the other portion of the signal line 1020 in the first section. Meanwhile, the second ground plane 1012b may be disposed in the entire one side portion of the second section and part of the other side portion thereof. In relation to this, vias connecting the first ground plane 1011 and the second ground plane 1012*b* may be disposed in one side portion in the second section. On the other hand, no vias connecting the first ground plane 1011 and the second ground plane 1012*b* may be disposed in the other side portion in the second section.

An antenna module (ANT) 1100 according to another embodiment disclosed in the present disclosure is provided. The antenna module (ANT) 1100 may be disposed on a side or inside of a variety of electronic devices. In relation to this, the electronic device may include a display device such as a television or a multivision, as well as a mobile terminal.

The antenna module (ANT) 1100 may include a transmission line TL and radiators 1100R. The transmission line TL may include a ground plane 1010 and a signal line 1020. The radiators 1100R may be electrically connected to the signal line 1020, and configured to radiate a signal.

The ground plane 1010 may be disposed asymmetrically in one side portion and the other side portion with respect to the center line of the signal line 1020 in a predetermined section adjacent to the radiators 1100R.

The transmission line TL may include first and second ground planes 1011 and 1012 which are arranged on different layers of a multi-layer substrate and configured to be connected to each other through vias spaced a predetermined distance apart from each other. The signal line 1020 may be disposed on the same plane as the first ground plane 1011 which is the upper one between the first and second ground planes 1011 and 1012.

The first ground plane 1011 which is an upper ground may be disposed in one side portion and the other side portion of the signal line 1020 in a first section forming the transmission line TL. On the other hand, the first ground plane 1011 may be disposed only in one side portion of the signal line 1020 in a second section which is a transition section between the transmission line TL and the radiators 1100R, thereby forming an asymmetrical transmission line.

The second ground plane 1012 which is a lower ground may be disposed in one side portion and the other side portion of a signal line in the first section. On the other hand, the second ground plane 1012 may be disposed only in one side portion of the signal line 1020 in the second section. Accordingly, the second ground plane 1012 which is the lower ground may be formed to correspond to the first ground plane 1011 which is the upper ground.

In another example, the second ground plane 1012 which is a lower ground may be disposed in one side portion and the other side portion of a signal line in the first section. In relation to this, a partial ground region may be formed without via connections in the second section so that a vertical electric field component at an end of the first section is gradually changed into a horizontal electric field component through the second section.

Accordingly, the second ground plane 1012*b* may be disposed in one side portion and the other portion of the signal line 1020 in the first section. Meanwhile, the second ground plane 1012*b* may be disposed in the entire one side portion of the second section and part of the other side portion thereof. In relation to this, vias connecting the first ground plane 1011 and the second ground plane 1012*b* may be disposed in the one side portion in the second section. On the other hand, no vias connecting the first ground plane 1011 and the second ground plane 1012*b* may be disposed in the other side portion in the second section.

Figure 8A:
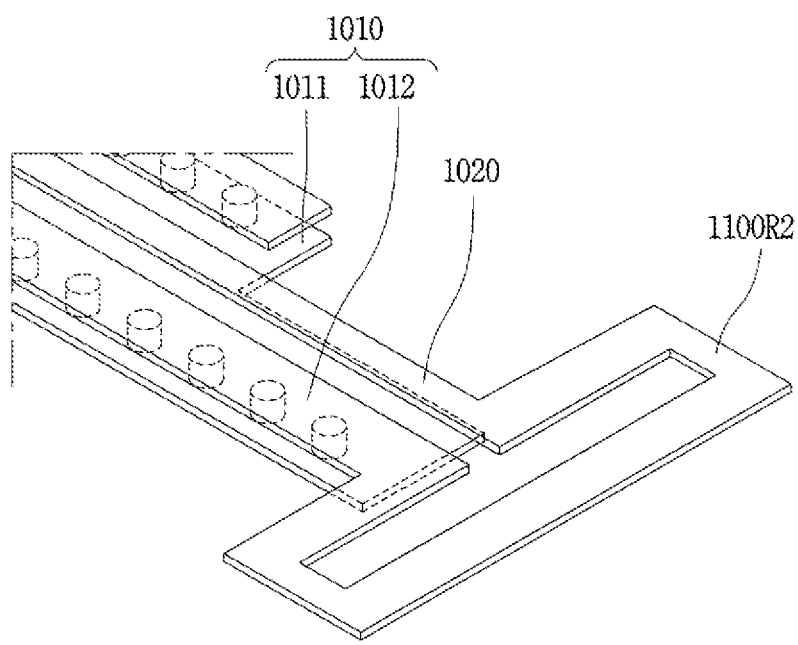
FIGS. 8A to 8C show a configuration of a folded dipole antenna and an asymmetrical transmission line structure according to an embodiment.
Figure 8B:
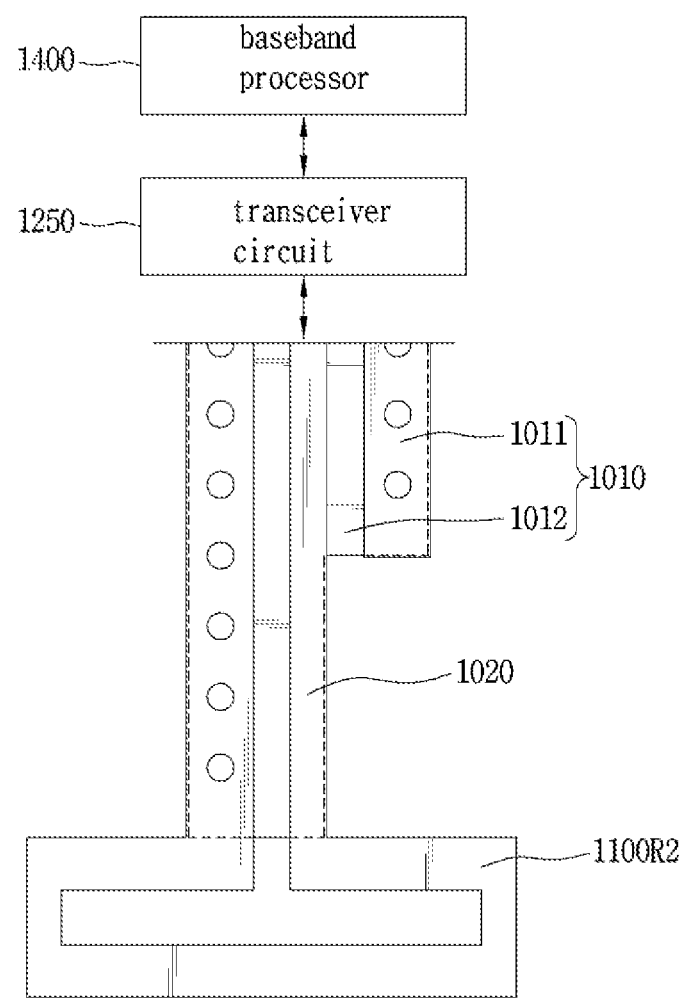
Figure 8C:
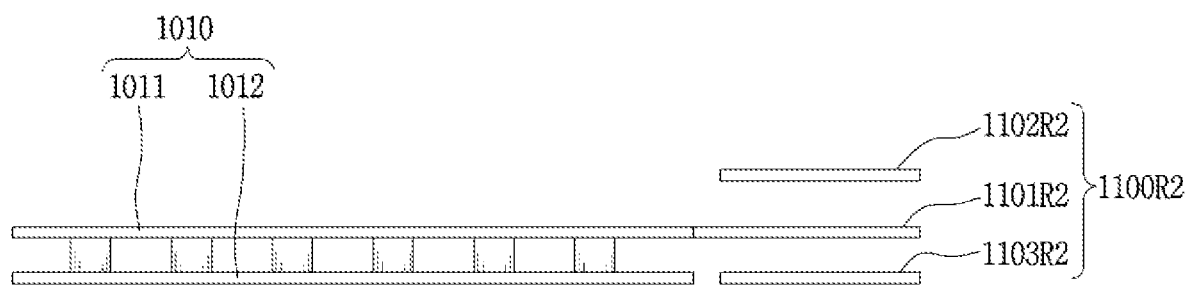

The radiators 1100R disclosed in the present disclosure may be implemented as a folded dipole antenna, apart from a dipole antenna. In relation to this, FIGS. 8A to 8C show a configuration of a folded dipole antenna and an asymmetrical transmission line structure according to an embodiment. FIG. 8A is a perspective view of a folded dipole antenna and an asymmetrical transmission line structure. FIG. 8B is a front view of the folded dipole antenna and the asymmetrical transmission line structure. FIG. 8C is a side view of the folded dipole antenna and the asymmetrical transmission line structure.

Referring to FIGS. 8A to 8C, the radiators 1100R2 may be formed as a folded dipole antenna, but not limited thereto. The radiators 1100R2 may be implemented as a dipole antenna, a loop antenna, a patch antenna, or an antenna having a certain metal pattern. A ground region 1010 may include a first ground region 1011 on the same plane as a signal line 1020 corresponding to a feed line and an underlying second ground region 1012. The signal line 1020 corresponding to the feed line and the first ground region 1011 corresponding to an upper ground may be disposed on the same plane, thereby stably producing a horizontal polarization signal in a horizontal direction in an asymmetrical transition section and an antenna region.

On the other hand, when the signal line and the first ground region corresponding to the upper ground are disposed on different planes, a vertical electric field component, as well as a horizontal electric field component, is generated. The signal line and the first ground region corresponding to the upper ground may be disposed on different planes, so that a vertical electric field component, apart from a horizontal electric field component, may be intentionally generated. However, once such a vertical electric field is generated in an antenna region, a signal radiated from the radiators has a vertical polarization component, as well as a vertical polarization component. Accordingly, when different radiators perform multiple input multiple output (MIMO), an interference occurs between MIMO streams, thereby deteriorating MIMO performance.

Thus, in an asymmetrical feeding structure disclosed in the present disclosure, the signal line 1020 corresponding to the feed line and the first ground region 1011 corresponding to the upper ground may be disposed on the same plane. Accordingly, a horizontal polarization signal in a horizontal direction may be stably produced in an asymmetrical transition section and an antenna region.

The radiators 1100R2 may include first radiators 1101 R2 which are lower radiators and second radiators 1102R2 which are upper radiators. Also, the radiators 1100R2 may further include third radiators 1103R2 disposed under the first radiators 1101 R2 which are the lower radiators.

The first radiators 1101R2 may be formed as a folded dipole antenna, and configured to be connected to a signal line. The second radiators 1102R2 may be configured to be disposed on a layer overlying the layer where the folded dipole antenna is disposed. The third radiators 1103R2 may be disposed on a layer underlying the first radiators 1101 R2. The third radiators 1103R2 may be configured to be connected to an end of the first radiators 1101 R2 through vertical vias.

A signal line of an asymmetrical transmission line structure disclosed in the present disclosure may be implemented on different layers through vertical via connections. In relation to this, FIG. 9 shows an asymmetrical transmission line structure with a signal line implemented on different layers through vertical via connections according to an embodiment.

Figure 9:
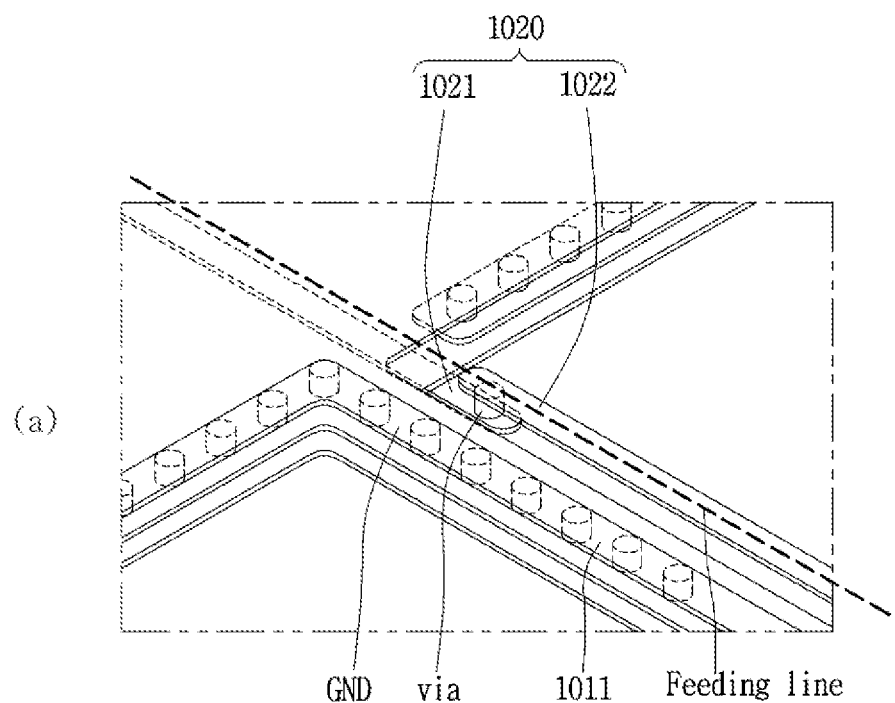
FIG. 9 shows an asymmetrical transmission line structure with a signal line implemented on different layers through vertical via connections according to an embodiment.
Figure 9:
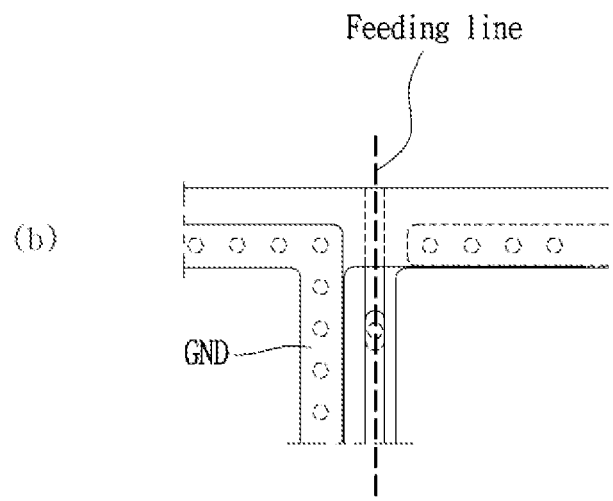

Referring to FIG. 9, a first signal line 1021 may be disposed under an upper ground in a first section corresponding to a transmission line TL. For example, the first signal line 1021 may have a micro-strip line structure disposed under the upper ground. For another example, the first signal line may have a co-planar structure disposed under the upper ground, with a ground region being disposed on the same plane. For another example, the first signal line may have a strip line structure disposed between the upper ground and a lower ground. The signal line 1021 in the first section may be implemented as a symmetrical transmission line in which a vertical electric field component is dominant for low-loss transmission.

In the second section corresponding to a transition structure, the second signal line 1022 may be vertically connected to the first signal line 1021 through a via. In the second section, the first ground plane 1011 on the same plane may be disposed in one side portion of the second signal line 1022. On the other hand, no ground planes on the same plane are disposed in the other side portion of the second signal line 1022. Thus, the signal line 1022 in the second section may be implemented as an asymmetrical transmission line as long as a horizontal electric field component is dominant or increased so that the horizontal electric field component is formed stably in an antenna region. Accordingly, in the second section corresponding to an asymmetrical transition structure, a ground region has an asymmetrical structure with respect to the center line of the second signal line 1022, in order to increase the horizontal intensity of an E-field. Also, in the second section corresponding to an asymmetrical transition structure, the ground plane 1011 is disposed in one side portion on the same plane as the second signal line 1022 corresponding to a feed line, in order to increase the horizontal intensity of an E-field.

In an asymmetrical transmission line structure disclosed in the present disclosure, electric field intensity at points on the transmission line will be described below.

Figure 10A:
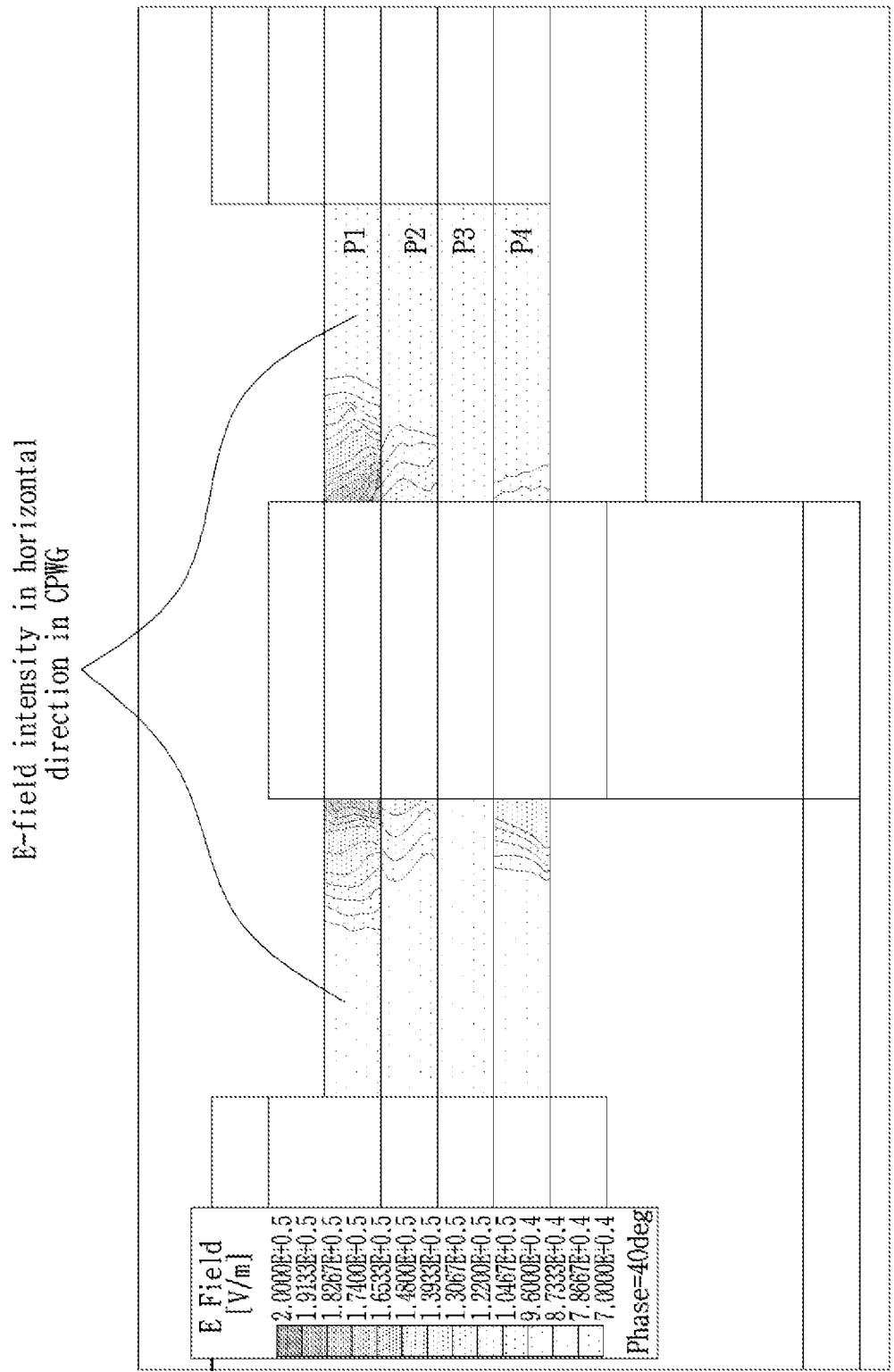
FIG. 10A shows electric field intensity at points on a symmetrical transmission line having a CPWG structure.

In relation to this, FIG. 10A shows electric field intensity at points on a symmetrical transmission line having a CPWG structure. FIG. 10A shows electric field intensity at first to fourth points P1 to P4, in the case where the first section and the second section are all implemented as CPWG as in FIGS. 7A and 7B. In relation to this, all of the first to fourth points P1 to P4 may be a first section corresponding to a CPWG section. P1 and P2 may be positioned at points on the symmetrical transmission line, P3 and P4 may be positioned at points on the asymmetrical transmission line, and an electric field may travel from P1 to P4 or from P4 or P1 depending on the position of an input port.

Figure 10B:
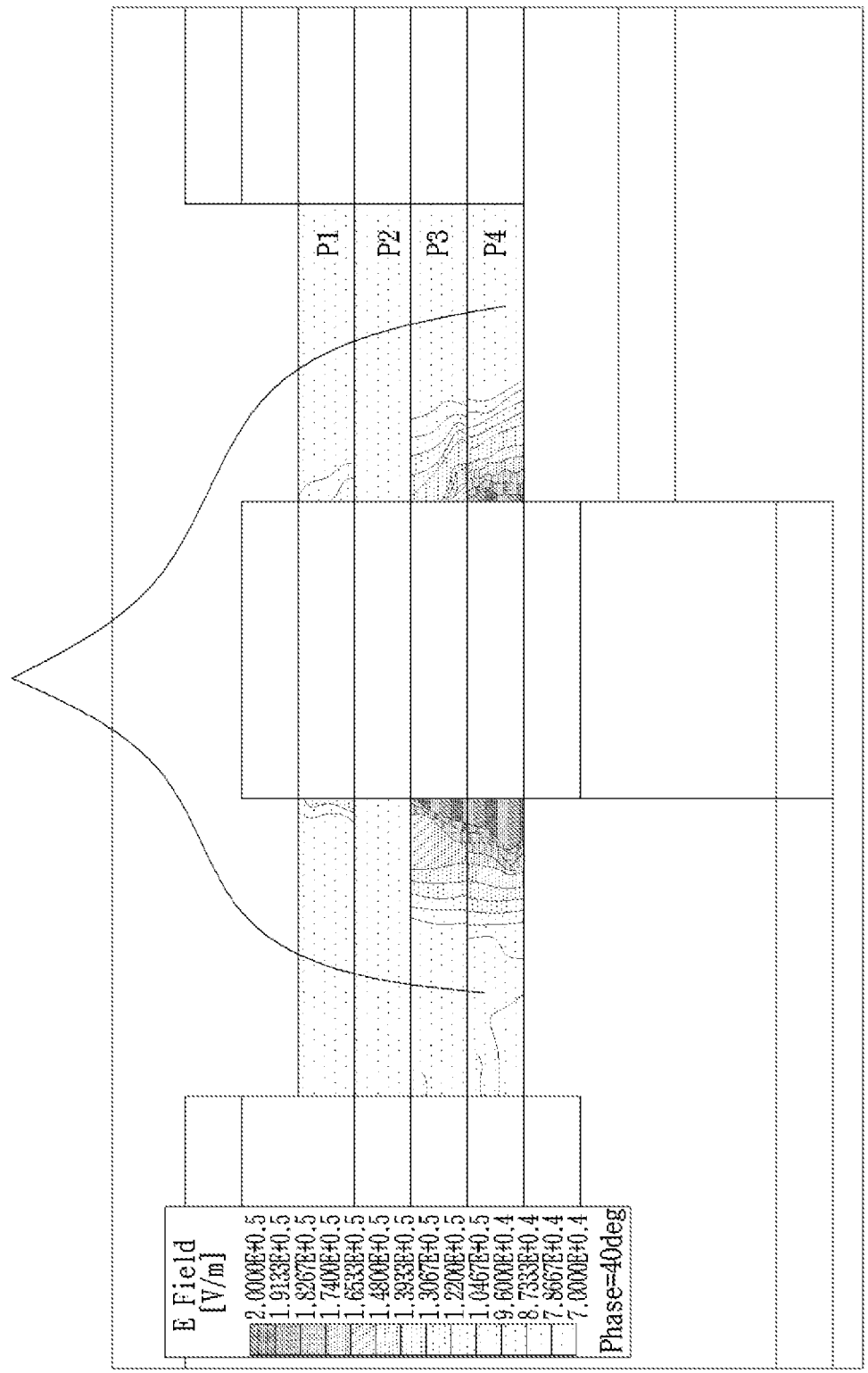
FIG. 10B shows electric field intensity at points on an asymmetrical transmission line which changes with time or electric-field phase in FIG. 10A.

In contrast, FIG. 10B shows electric field intensity at points on an asymmetrical transmission line which changes with time or electric-field phase in FIG. 10A. FIG. 10B shows electric field intensity at first to fourth points P1 to P4 on the asymmetrical transmission line of FIGS. 7A and 7B. In relation to this, the first point P1 and the second point P2 may be a first section corresponding to a CPWG section. The third point P3 and the fourth point P4 may be a second section corresponding to the asymmetrical transmission line structure. The third point P3 may be a transition section between the first section and the second section. For example, the third point P3 may be a boundary point between the first section and the second section.

In relation to this, technical features of the asymmetrical transmission line structure and the CPWG structure disclosed in the present disclosure will be compared below.

1) Referring to FIG. 7B, the first point P1 to fourth point P4 on the signal line 1020 corresponding to a transmission line indicate points sequentially spaced at predetermined intervals.

2) FIG. 10A and FIG. 10B show a comparison of horizontal electric field intensity at positions on a signal line corresponding to a transmission line.

3) Referring to FIG. 7B and FIG. 10A, the electric field intensity in horizontal direction is the highest at the first point P1. If the electric field intensity is the highest at the first point P1, the electric field intensity on the left and right is symmetrical. That is, the electric field intensity at the first point P1 is the same or similar on the left and right with respect to the center of the signal line 1020. In relation to this, the horizontal electric field intensity at the first point P1 is relatively lower than in FIG. 10B. The electric field intensity at the second to fourth points P2 to P4 is lower than the electric field intensity at the first point P1.

4) Referring to FIG. 7B and FIG. 10B, the electric field intensity in horizontal direction is the highest at the fourth point P4. If the electric field intensity is the highest at the fourth point P4, the electric field intensity on the left and right is asymmetrical. The electric field intensity at the fourth point P4 is different on the left and right with respect to the center of the signal line 1020. At the fourth point P4, the electric field intensity of a left side portion where a ground plane is disposed is higher than the electric field intensity of a right side portion.

5) Referring to FIG. 7B, FIG. 10A, and FIG. 10B, it can be seen that there was an increase in the horizontal electric field intensity in the asymmetrical transmission line structure, by comparing the horizontal electric field intensity at the first point P1 with the horizontal electric field intensity at the fourth point P4. Thus, the asymmetrical transmission line structure with a ground formed only in one side portion may provide a transition section from a vertical electric field to a horizontal electric field.

Return loss and insertion loss characteristics of an asymmetrical transmission line structure and a CPWG structure disclosed in the present disclosure will be compared below. In relation to this, FIG. 11A and FIG. 11B case 1 shows return loss and insertion loss characteristics of an asymmetrical transmission line structure and a CPWG structure according to an embodiment. In relation to this, the position of a first port port1 and a second port port2 for measuring return loss and insertion loss in the asymmetrical transmission line structure may be configured as in FIG. 7B. In the asymmetrical transmission line structure, the configuration of the first port port1 and the second port port2 also may have an asymmetrical structure. Accordingly, the return loss S11 at the first port port1 and the return loss S22 at the second portion port2 may be different.

Figure 11A:
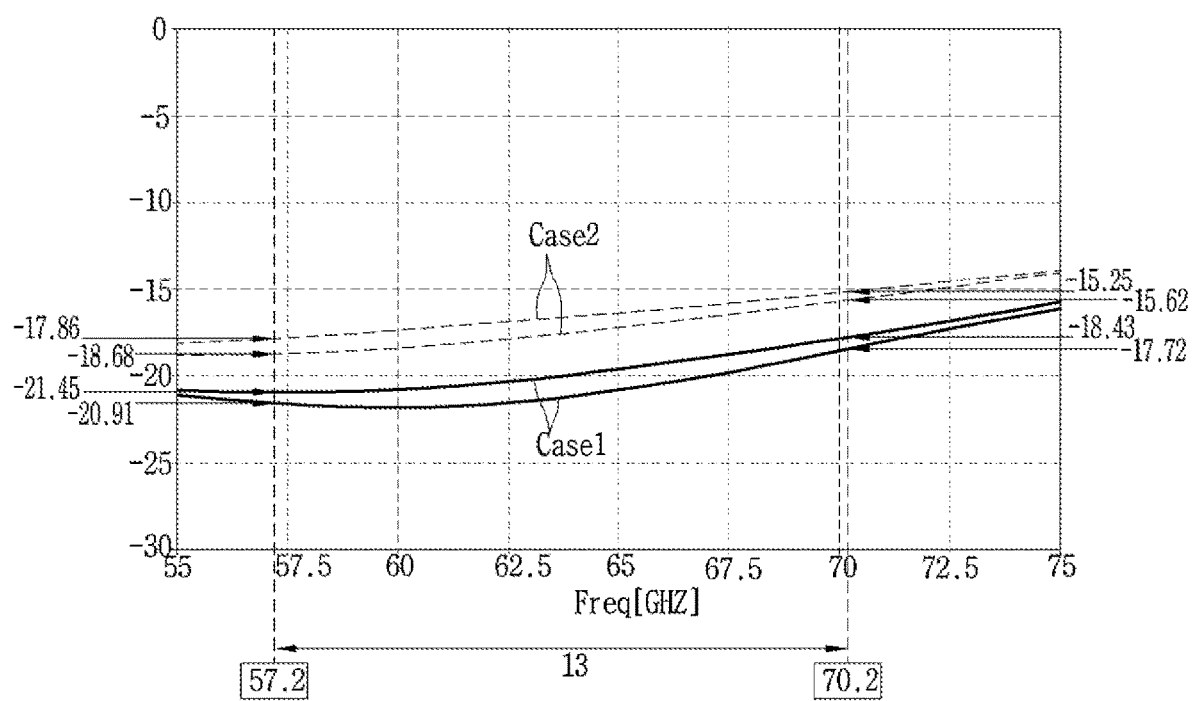
FIG. 11A and FIG. 11B show return loss and insertion loss characteristics of an asymmetrical transmission line structure and a CPWG structure according to an embodiment.
Figure 11B:
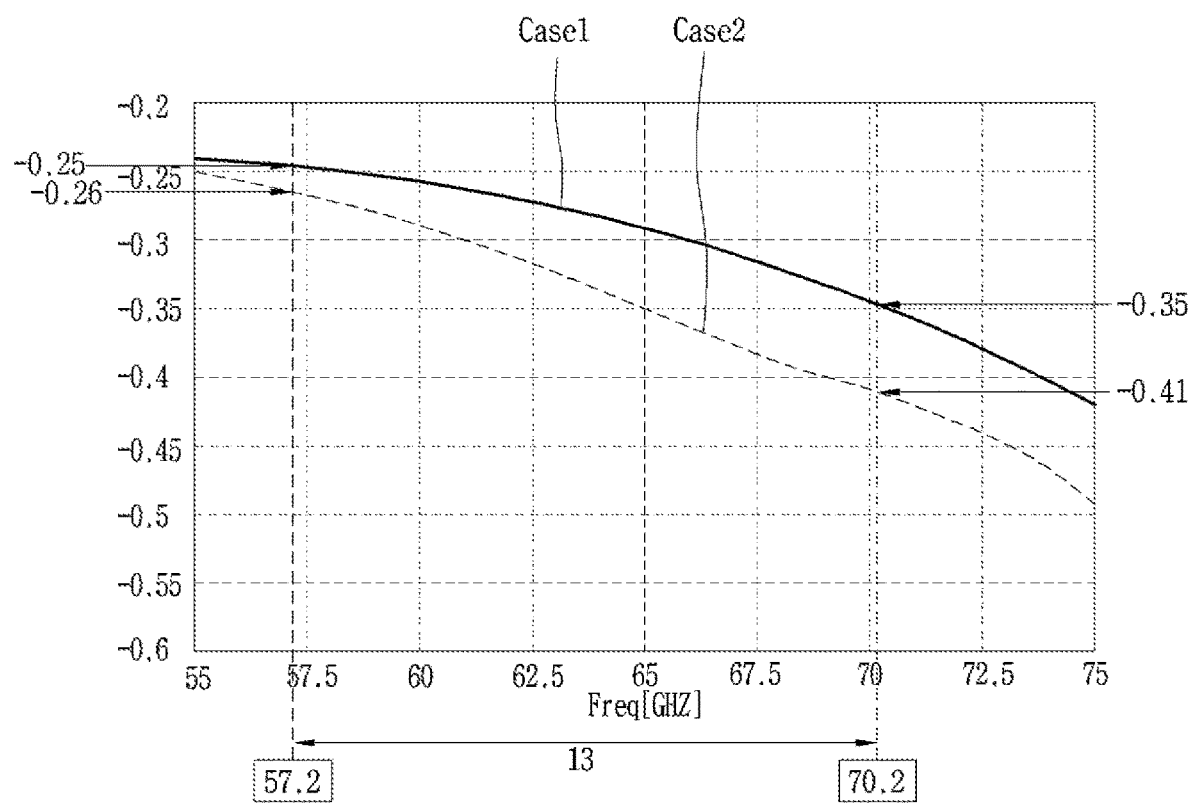

Referring to FIG. 11A and FIG. 11B, case 1 shows the return loss and insertion loss characteristics in the asymmetrical transmission line structure. On the other hand, case 2 shows reflection loss and insertion loss characteristics in the CPWG structure. At 55 to 75 GHz which belongs to a 60 GHz mmWave band, S11 and S22 of the asymmetrical transmission line structure (case 1) changed from −16 dB to −19 dB on average, which was an improvement of about 3 dB. Thus, S21 corresponding to the insertion loss in the asymmetrical transmission line structure (case 1) also showed an improvement of about 0.04 dB/mm on average. In particular, S21 corresponding to the insertion loss at a frequency of about 70 GHz showed an improvement of about 0.06 dB/mm.

Figure 12A:
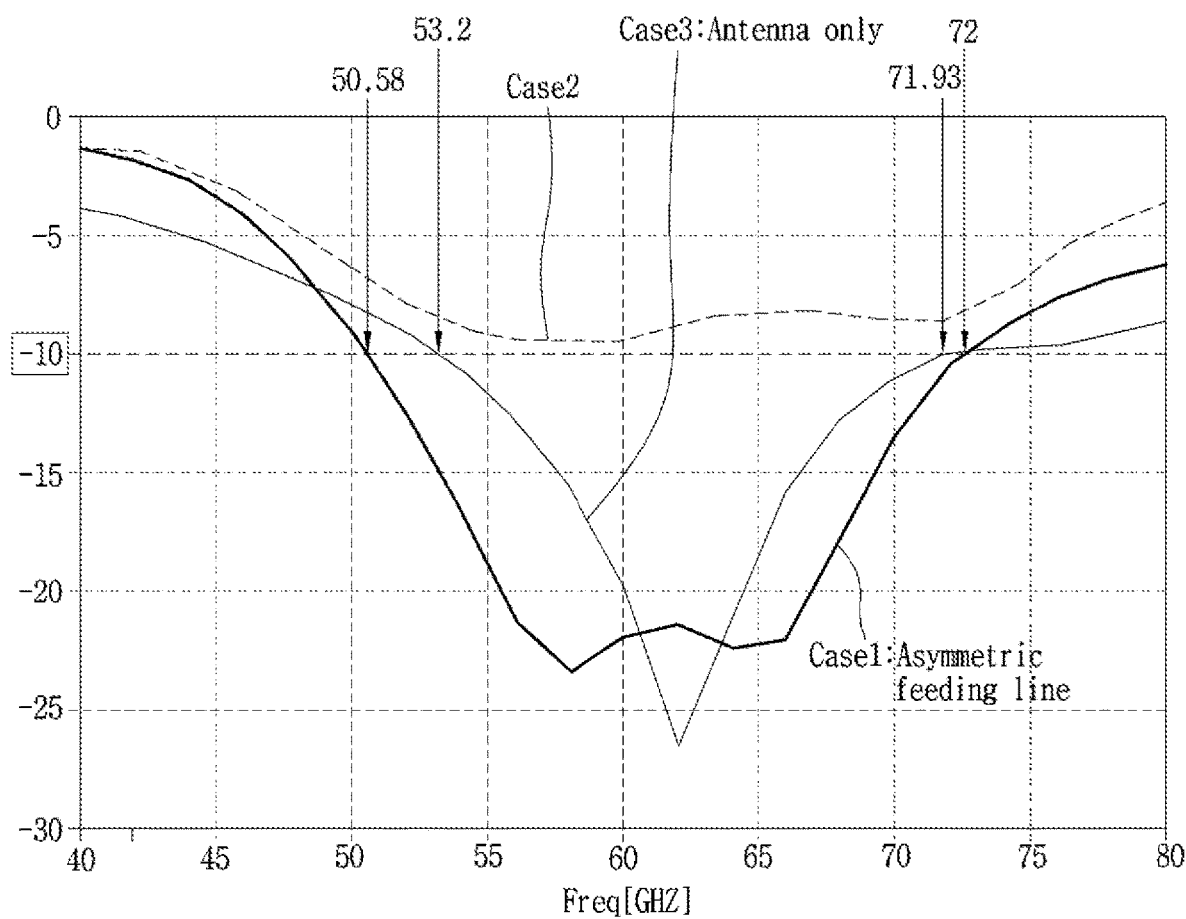
FIG. 12A shows reflection coefficient characteristics of an antenna having an asymmetrical transmission line structure and an antenna having a CPWG structure.
Figure 12B:
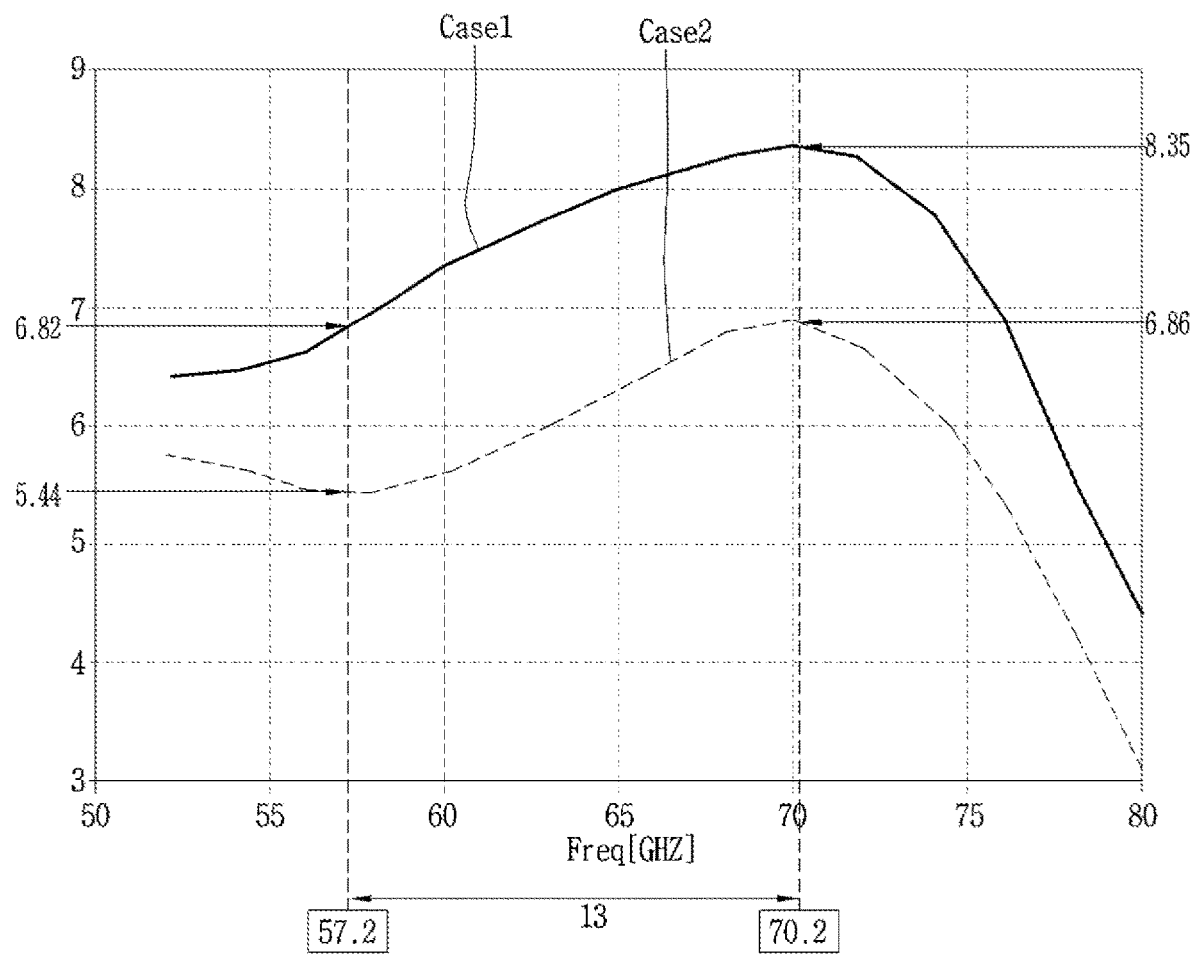
FIG. 12B shows peak gain characteristics of an antenna having an asymmetrical transmission line structure and an antenna having a CPWG structure.
Figure 12C:
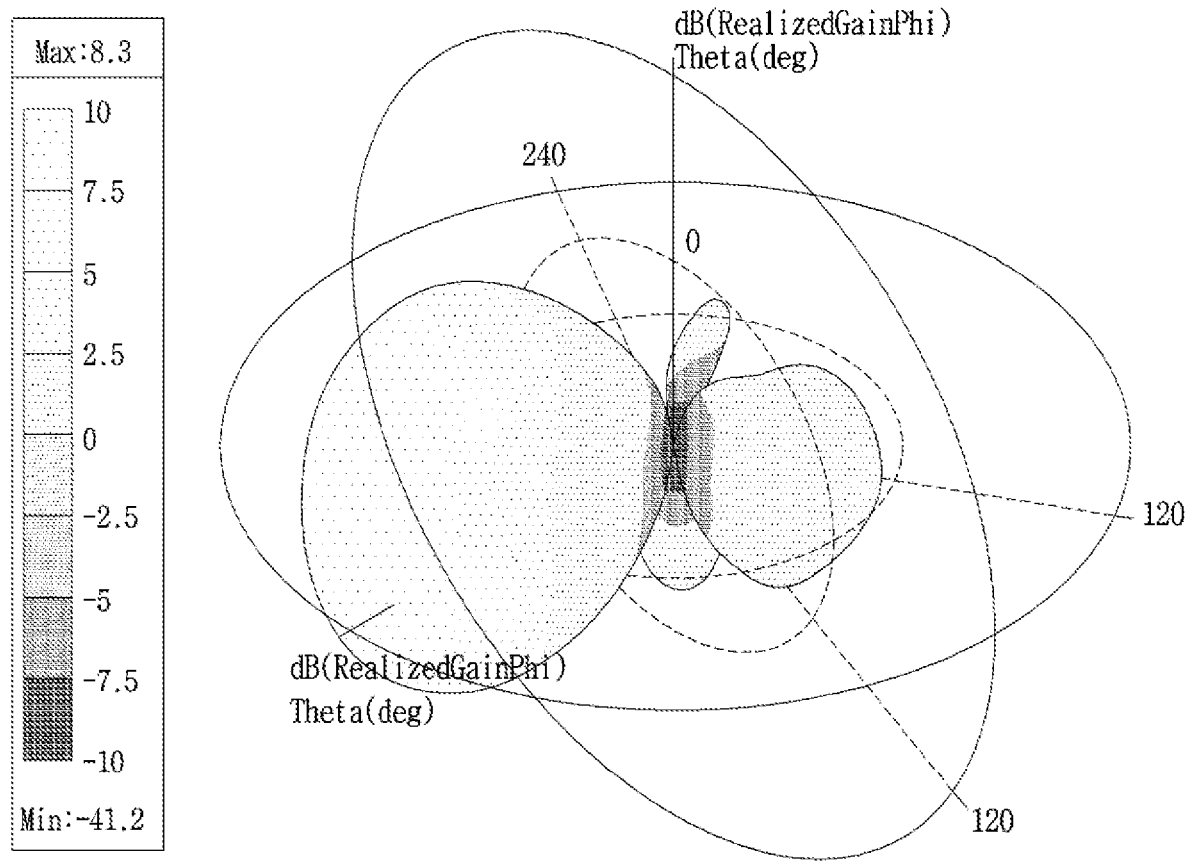
FIG. 12C shows radiation pattern characteristics of an antenna having an asymmetrical transmission line structure.

Reflection coefficient characteristics, peak gain characteristics, and a radiation pattern of an antenna having an asymmetrical transmission line structure disclosed in the present disclosure will be described below. In relation to this, FIG. 12A shows reflection coefficient characteristics of an antenna having an asymmetrical transmission line structure and an antenna having a CPWG structure. FIG. 12B shows peak gain characteristics of an antenna having an asymmetrical transmission line structure and an antenna having a CPWG structure. FIG. 12C shows radiation pattern characteristics of an antenna having an asymmetrical transmission line structure.

Referring to FIG. 12A, a comparison of reflection coefficient characteristics between (1) when feeding an antenna using an asymmetrical feed line, (2) when feeding with CPWG without an asymmetrical feed line, and (3) when there is an antenna alone will be described. In relation to this, a comparison between case 2 and case 3 shows that the reflection coefficient characteristic graph of case 2 is much more distorted than the reflection coefficient characteristic graph of case 3.

In relation to this, −10 dB bandwidths for case 1 and case 3 were similar, that is, (1) 50.6~72.6 GHz and (3) 53.2~71.9 GHz, respectively. Thus, a comparison of case 1 and case 2 shows that case 1 with an asymmetrical feed line provides higher reflection coefficient performance for the antenna.

Referring to FIG. 12B, a comparison of antenna peak gains between (1) when there is an asymmetrical feed line and (2) when there is no asymmetrical feed line will be described. In relation to this, the peak gain in case 1 have a value of about 6.8 to 8.3 dBi within an operating bandwidth. On the other hand, the peak gain in case 2 has a value of about 5.4 to 6.8 dBi within an operating bandwidth. Accordingly, it can be seen that the antenna gain was improved by 1.45 dB on average through a feed line with an asymmetrical transmission line.

Referring to FIG. 12C, when an asymmetrical feed line is used, an antenna having an asymmetrical transmission line structure disclosed in the present disclosure has a horizontal polarization radiation pattern at about 70 GHz. In relation to this, the radiation pattern of the antenna having an asymmetrical transmission structure has end-fire characteristics for radiation in the direction of a side of the substrate. The antenna gain was high, with a horizontal polarization gain of about 8.3 dBi.

Figure 13:
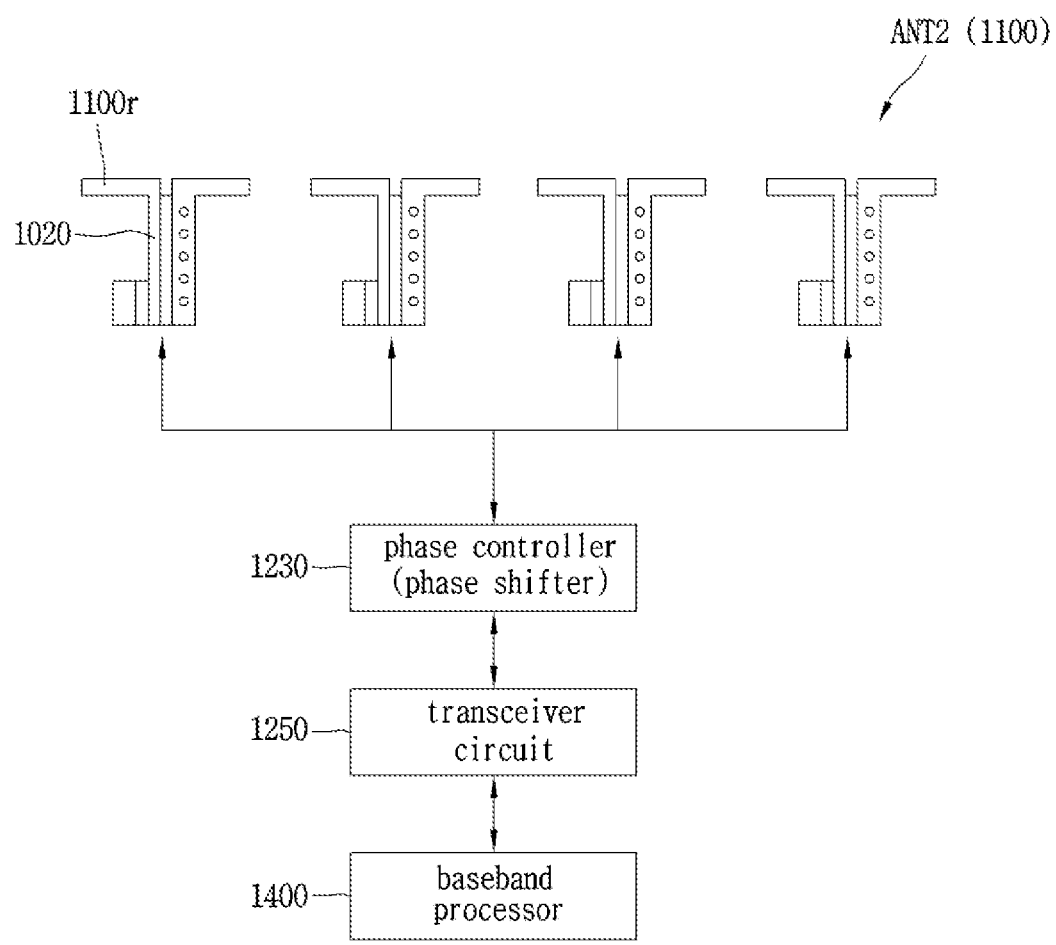
FIG. 13 shows an array antenna including a plurality of antenna elements having an asymmetrical transmission line structure and an electronic device including the same according to an embodiment.

An antenna having an asymmetrical transmission line structure disclosed in the present disclosure may be configured as an array antenna including a plurality of antenna elements. In relation to this, FIG. 13 shows an array antenna including a plurality of antenna elements having an asymmetrical transmission line structure and an electronic device including the same according to an embodiment. Referring to FIG. 13, the multi-layer circuit substrate may correspond to an antenna module (ANT) 1100 including an asymmetrical transmission line including the radiators 1100R and the signal line 1020. The antenna module (ANT) 1100 may be configured as an array antenna including a plurality of antenna elements spaced at predetermined intervals so as to perform beamforming. In relation to this, the number of antenna elements may be, but not limited to, 4, and may vary depending on applications. The number of antenna elements may be 2, 4, 6, or 8.

The antenna module (ANT) 1100 may further include a phase controller 1230 configured to control the phase of a signal applied to each of the plurality of antenna elements. In relation to this, the electronic device may further include a transceiver circuit 1250 and a processor 1400. In relation to this, the multi-layer substrate may correspond to an antenna module (ANT) 1100. For example, the transceiver circuit 1250 and the processor 1400 may be disposed on a circuit substrate separately from the antenna module (ANT) 1100. For another example, part of the transceiver circuit 1250 may be disposed on a multi-layer substrate corresponding to the antenna module (ANT) 1100.

The transceiver circuit 1250 may be operably coupled to the phase controller 1230. The transceiver 1250 may be configured to control a signal applied to the array antenna through the phase controller 1230.

Figure 14:
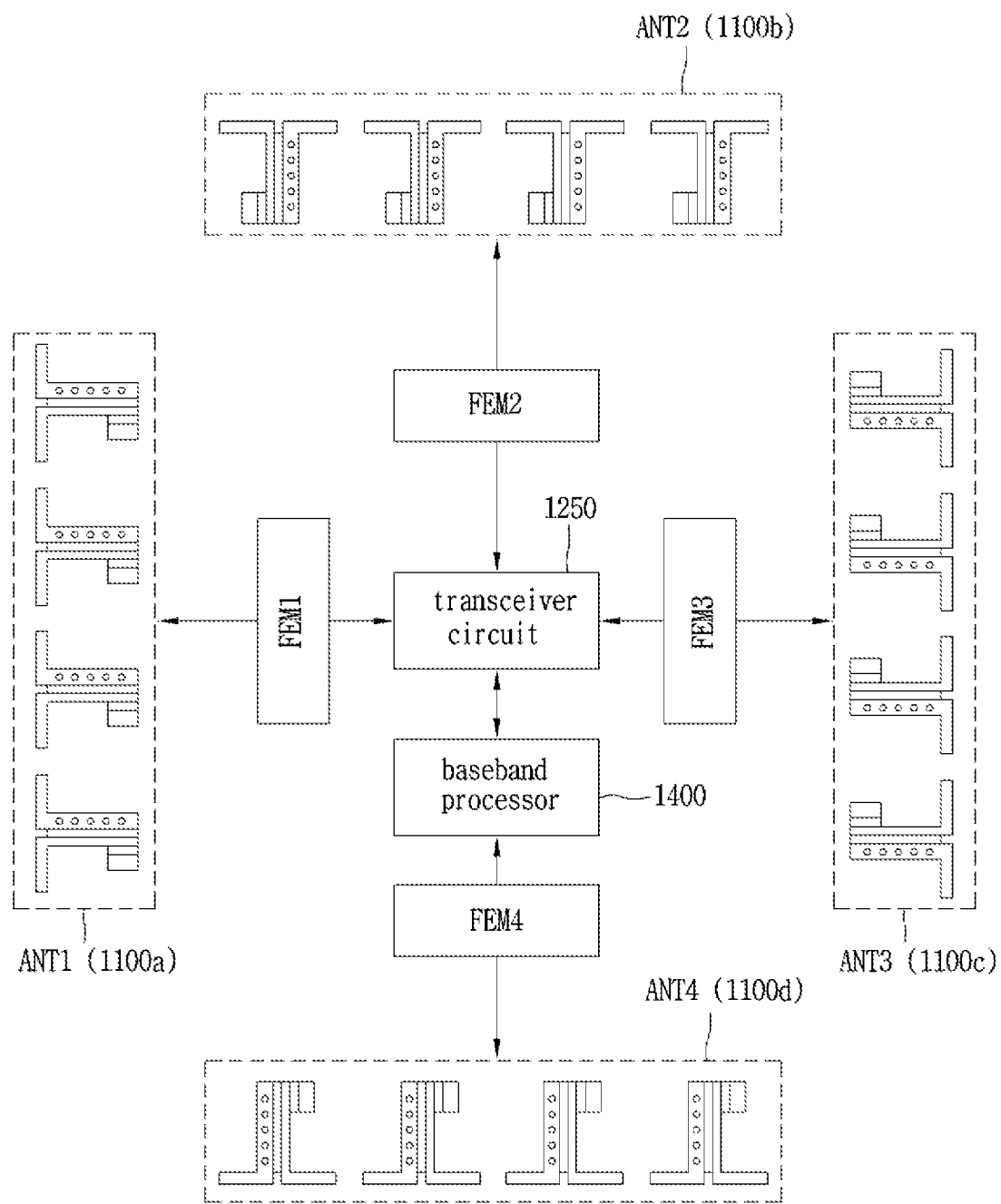
FIG. 14 shows a plurality of array antennas including a plurality of antenna elements having an asymmetrical transmission line structure and an electronic device including the same according to an embodiment.

An antenna having an asymmetrical transmission line structure disclosed in the present disclosure may include a plurality of array antennas disposed at different positions of an electronic device, the array antennas including a plurality of antenna elements. In relation to this, FIG. 14 shows a plurality of array antennas including a plurality of antenna elements having an asymmetrical transmission line structure and an electronic device including the same according to an embodiment. Referring to FIG. 13 and FIG. 14, a multi-layer circuit substrate may correspond to an antenna module (ANT) 1100 including an asymmetrical transmission line including radiators 1100R and a signal line 1020. The antenna module (ANT) 1100 may include a plurality of array antennas ANT1 to ANT4 including a plurality of antenna elements disposed to be spaced at predetermined intervals so as to perform beamforming. For example, the plurality of array antennas ANT1 to ANT4 may be implemented as first to fourth array antennas 1100a (ANT1) to 1100d (ANT4), but not limited thereto and may vary depending on applications.

In relation to this, the antenna module (ANT) 1100 may include a plurality of antenna modules 1100a to 1100d disposed in different regions of the electronic device. In relation to this, the electronic device may further include a transceiver circuit 1250 and a processor 1400. In relation to this, the multi-layer substrate may correspond to an antenna module (ANT) 1100. For example, the transceiver circuit 1250 and the processor 1400 may be disposed on a circuit substrate which is different from the antenna module (ANT) 1100. For another example, part of the transceiver circuit 1250 may be disposed on a multi-layer substrate corresponding to the antenna module (ANT) 1100.

The processor 1400 may be operably coupled to the transceiver circuit 1250, and configured to control the transceiver circuit 1250. The processor 1400 may control the transceiver circuit 1250 to perform MIMO while performing beamforming in different directions through the plurality of antenna modules 1100a to 1100d.

The first to fourth array antennas ANT1 to ANT4 may be operably coupled to first to fourth front end modules FEM1 to FEM4, respectively. In relation to this, the first to fourth front end modules FEM1 to FEM4 each may have a phase controller, a power amplifier, and a receiving amplifier. The first to fourth front end modules FEM1 to FEM4 each may include some of the components of the transceiver circuit 1250 corresponding to RFIC.

The processor 1400 may be operably coupled to the first to fourth front end modules FEM1 to FEM4. The processor 1400 may include some of the components of the transceiver circuit 1250 corresponding to RFIC. The processor 1400 may include a baseband processor 1400 corresponding to a modem. The processor 1400 may be provided in the form of a SoC (System on Chip) so as to include some of the components of the transceiver circuit 1250 and a baseband processor 1400 corresponding a modem. However, the processor 1400 is not limited to the configuration of FIG. 12, but may vary depending on applications.

The processor 1400 may control the first to fourth front end modules FEM1 to FEM4 to radiate a signal through at least one of the first to fourth array antennas ANT1 to ANT4. In relation to this, an optimum antenna may be selected based on the quality of a signal received through the first to fourth array antennas ANT1 to ANT4.

The processor 1400 may control the first to fourth front end modules FEM1 to FEM4 so as to perform MIMO through two or more of the first to fourth array antennas ANT1 to ANT4. In relation to this, an optimum antenna combination may be selected based on the quality and interference of a signal received through the first to fourth antennas ANT1 to ANT4.

The processor 1400 may control the first to fourth front end modules FEM1 to FEM4 to perform carrier aggregation CA through at least one of the first to fourth array antennas ANT1 to ANT4. In relation to this, carrier aggregation CA may be performed through one array antenna, since the first to fourth antennas ANT1 to ANT4 each perform dual resonance in a first band and a second band.

The processor 1400 may determine the signal quality of each antenna in the first band and the second band. The processor 1400 may perform carrier aggregation CA through a certain antenna in the first band and another antenna in the second band, based on the signal quality in the first band and the second band.

An antenna module corresponding to a multi-layer substrate may include various numbers of array antennas. In relation to this, the electronic device may include two or more array antennas. The electronic device may include two array antennas and perform beamforming and MIMO using them. For another example, the electronic device may include four or more array antennas and perform beamforming and MIMO using some of these array antennas.

An antenna module corresponding to a multi-layer substrate may include first and second array antennas 1100*a* (ANT1) and 1100*b* (ANT2). In relation to this, the first and second array antennas 1100*a* (ANT1) and 1100*b* (ANT2) may operate with different polarizations. In relation to this, FIG. 15 shows a plurality of array antennas including a plurality of antenna elements and an electronic device including the same according to another embodiment.

Figure 15:
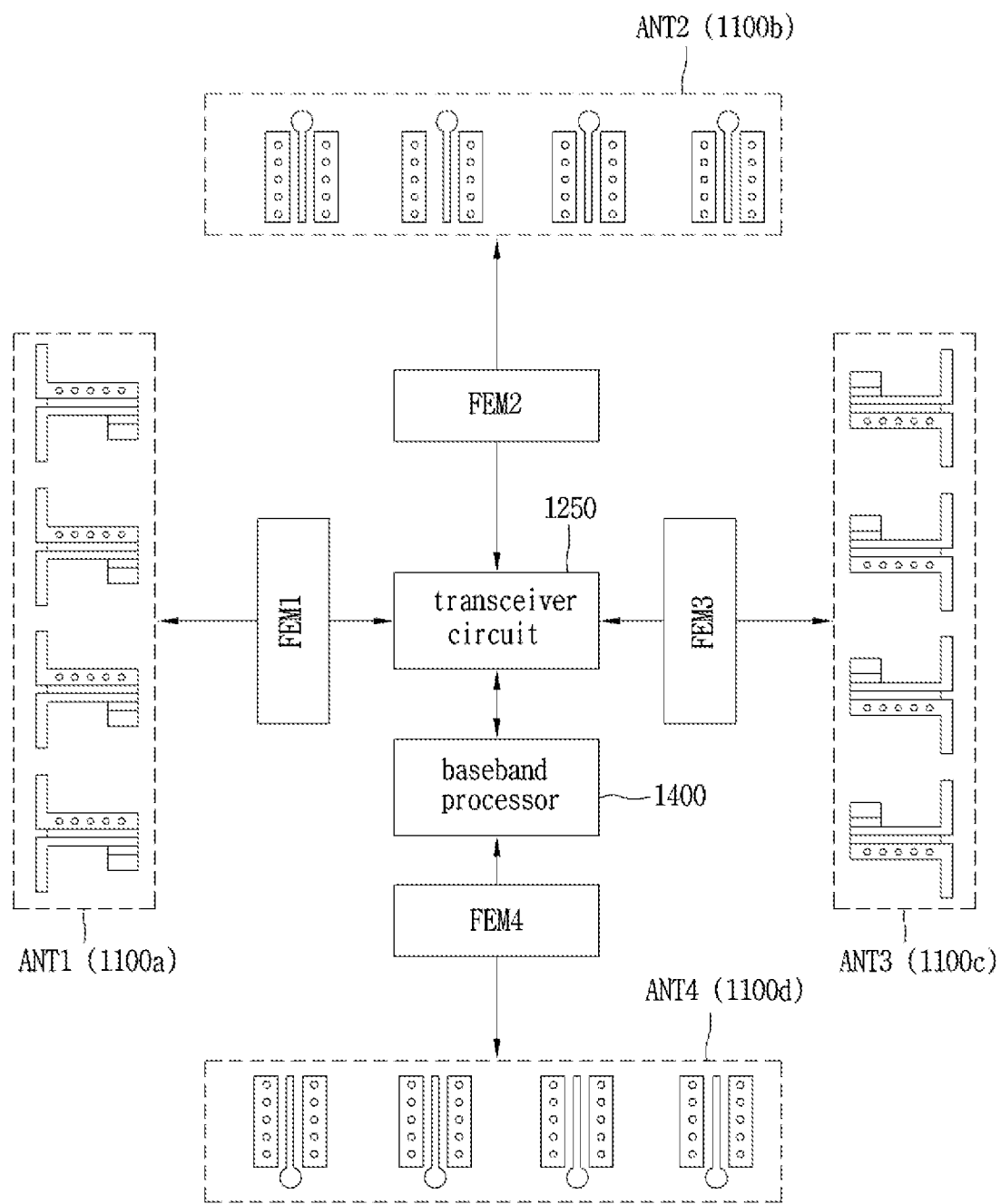
FIG. 15 shows a plurality of array antennas including a plurality of antenna elements and an electronic device including the same according to another embodiment.

Referring to FIG. 15, the electronic device may include an antenna module, a transceiver circuit 1250, and a processor 1400. The antenna module may include a first array antenna 1100*a* (ANT1) and a second array antenna 1100*b* (ANT2). The first array antenna 1100*a* (ANT1) may have radiators spaced at predetermined intervals, and be configured to operate as a horizontal polarization antenna. On the other hand, the second array antenna 1100*b* (ANT2) may have second radiators which are spaced at predetermined intervals and include metal pads disposed on different layers of the multi-layer substrate and vias connecting the metal pads. The second array antenna 1100*b* (ANT2) may be configured to operate as a vertical polarization antenna. In relation to this, the second radiators may be monopole radiators, but not limited thereto and may be certain antennas that operate as vertical polarization antennas.

In relation to this, the first array antenna 1100*a* (ANT1) corresponding to the horizontal polarization antenna may be connected to an asymmetrical transmission line. In relation to this, a detailed configuration of the asymmetrical transmission line may be a structure in which a ground is disposed only in one side portion as in FIGS. 7A to 7B. On the other hand, the second array antenna 1100*b* (ANT2) corresponding to the vertical polarization antenna may be connected to a symmetrical transmission line where the first ground plane is disposed in both of the one side portion and the other side portion. The processor 1400 may be configured to control the transceiver circuit 1250 to perform MIMO through the first array antenna 1100*a* (ANT1) and the second array antenna 1100*b* (ANT2).

An antenna module disclosed in the present disclosure may include a plurality of antenna modules. In relation to this, referring to FIG. 15, the antenna module may include a first antenna module and a second antenna module which are disposed in different portions of the electronic device. The first antenna module may include a first array antenna 1100*a* (ANT1) and a second array antenna 1100*b* (ANT2). For example, the first array antenna 1100*a* (ANT1) and the second array antenna 1100*b* (ANT2) may operate as a horizontal polarization antenna and a vertical polarization antenna, respectively.

The second antenna module may include a third array antenna 1100*c* (ANT3) and a fourth array antenna 1100*d* (ANT4). For example, the third array antenna 1100*c* (ANT3) and a fourth array antenna 1100*d* (ANT4) may operate as a horizontal polarization antenna and a vertical polarization antenna, respectively.

In relation to this, the first array antenna 1000*a* (ANT1) and second array antenna 1100*b* (ANT2) corresponding to the first antenna module may be disposed in a single physical module, for example, on a multi-layer substrate. For example, an antenna element belonging to the second array antenna 1100*b* (ANT2) may be disposed between antenna elements belonging to the first array antenna 1100*a* (ANT1). The third array antenna 1000*c* (ANT3) and fourth array antenna 1100*d* (ANT4) corresponding to the second antenna module may be disposed in a single physical module, for example, on a multi-layer substrate. For example, an antenna element belonging to the fourth array antenna 1100*d* (ANT4) may be disposed between antenna elements belonging to the third array antenna 1100*c* (ANT3).

Figure 16:
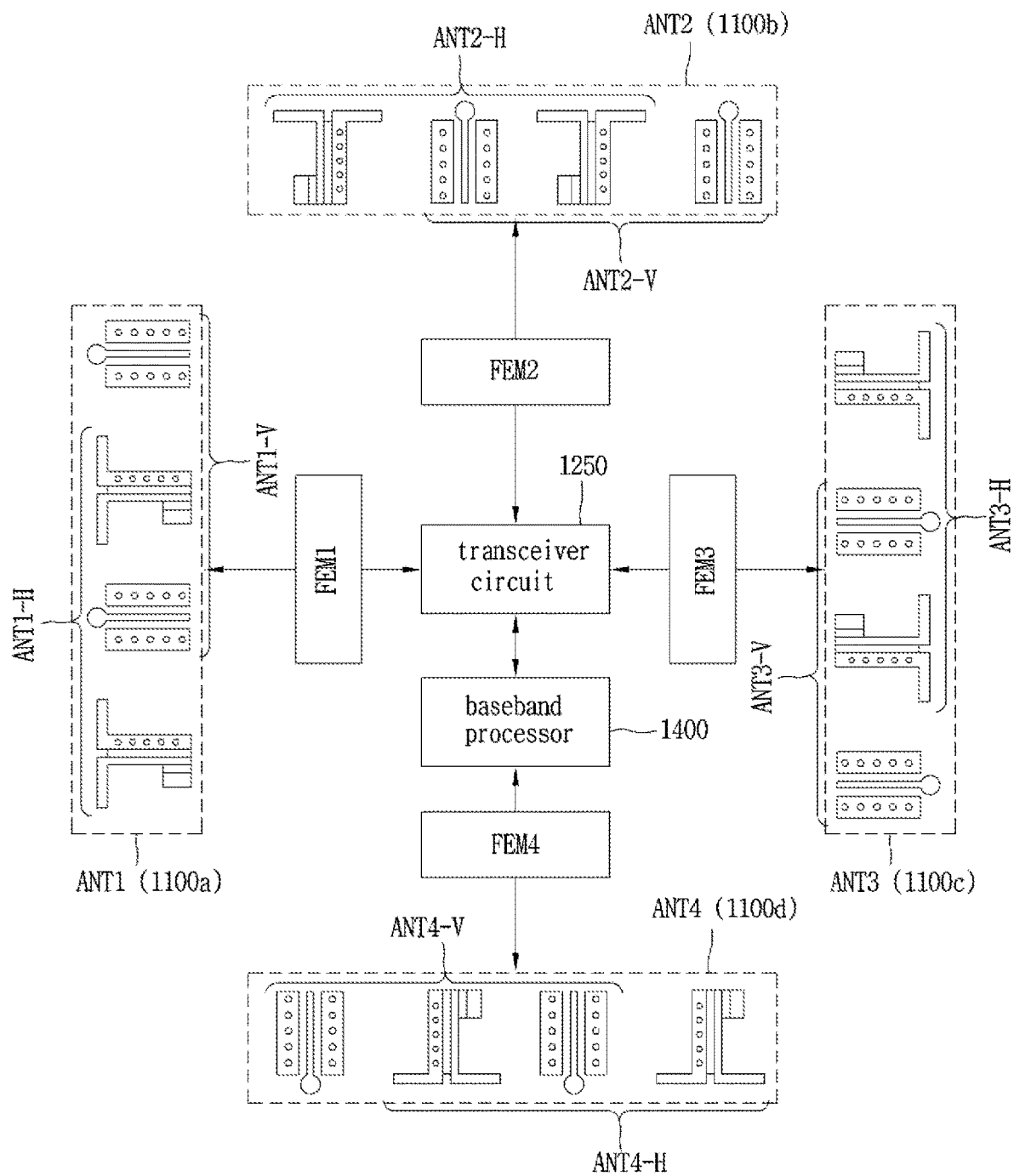
FIG. 16 shows a plurality of antenna modules with antenna elements having different polarizations disposed adjacent to each other and an electronic device for controlling the same according to an embodiment.

In relation to this, antenna elements having different polarizations disclosed in the present disclosure may be disposed adjacent to each other. FIG. 16 shows a plurality of antenna modules with antenna elements having different polarizations disposed adjacent to each other and an electronic device for controlling the same according to an embodiment.

Referring to FIG. 16, the first array antenna 1100*a* (ANT1) may include a first horizontal polarization antenna ANT1-H and a first vertical polarization antenna ANT1-V. The second array antenna 1100*b* (ANT2) may include a second horizontal polarization antenna ANT2-H and a second vertical polarization antenna ANT2-V. Meanwhile, the third array antenna 1100*c* (ANT3) may include a third horizontal polarization antenna ANT3-H and a third vertical polarization antenna ANT3-V. The fourth array antenna 1100*d* (ANT4) may include a fourth horizontal polarization antenna ANT4-H and a fourth vertical polarization antenna ANT4-V.

The number of MIMO streams may be increased twice by providing different antennas having polarizations orthogonal to each other within a single antenna module. The electronic device may perform MIMO up to rank 8 through first to fourth horizontal polarization antennas ANT1-H to ANT4-H and first to fourth vertical polarization antennas ANT1-V to ANT4-V. The electronic device may perform 8Tx UL-MIMO through the first to fourth horizontal polarization antennas ANT1-H to ANT4-H and the first to fourth vertical polarization antennas ANT1-V to ANT4-V. The electronic device may perform 8Rx DL-MIMO through the first to fourth horizontal polarization antennas ANT1-H to ANT4-H and the first to fourth vertical polarization antennas ANT1-V to ANT4-V.

Alternatively, a degradation in signal quality caused by rotation of the electronic device may be prevented through different antennas having polarizations orthogonal to each other within a single antenna module. In relation to this, the first antenna ANT1 may transmit and/or receive a signal through the first horizontal polarization antenna ANT-H and the first vertical polarization antenna ANT1-V. Accordingly, even if the quality of a signal received through one antenna is degraded due to a rotation of the electronic device, a signal may be received through another antenna. Similarly, the fourth antenna ANT4 may transmit and/or receive a signal through the fourth horizontal polarization antenna ANT4-H and the fourth vertical polarization antenna ANT4-V. Accordingly, even if the quality of a signal received through one antenna is degraded due to a rotation of the electronic device, a signal may be received through another antenna.

The processor 1400 may maintain dual connections with different entities and perform a MIMO operation through a horizontal polarization antenna and a vertical polarization antenna. In relation to this, the transceiver circuit 1250 may be controlled such that dual connections with the first entity and the second entity are maintained through the first array antenna 1100a (ANT1) and the fourth array antenna 1100d (ANT4), respectively. In this case, the first array antenna 1100a (ANT1) and the fourth array antenna 1100d (ANT4) may operate as a horizontal polarization antenna and a vertical polarization antenna, respectively. Accordingly, the processor 1400 may perform a dual connection operation or MIMO through antennas disposed at different positions in the electronic device and operating with polarizations orthogonal to each other within an antenna module. In this case, interference with signals transmitted or received through different antennas may be reduced at the time of a dual connection or MIMO operation.

For another example, the transceiver circuit 1250 may be controlled such that dual connections with the first entity and the second entity are maintained through the second array antenna 1100b (ANT2) and the third array antenna 1100c (ANT3), respectively. In this case, the second array antenna 1100b (ANT2) and the fourth array antenna 1100c (ANT3) may operate as a horizontal polarization antenna and a vertical polarization antenna, respectively. Accordingly, the processor 1400 may perform a dual connection operation or MIMO through antennas disposed at different positions in the electronic device and operating with polarizations orthogonal to each other within an antenna module. In this case, interference with signals transmitted or received through different antennas may be reduced at the time of a dual connection or MIMO operation.

Figure 17:
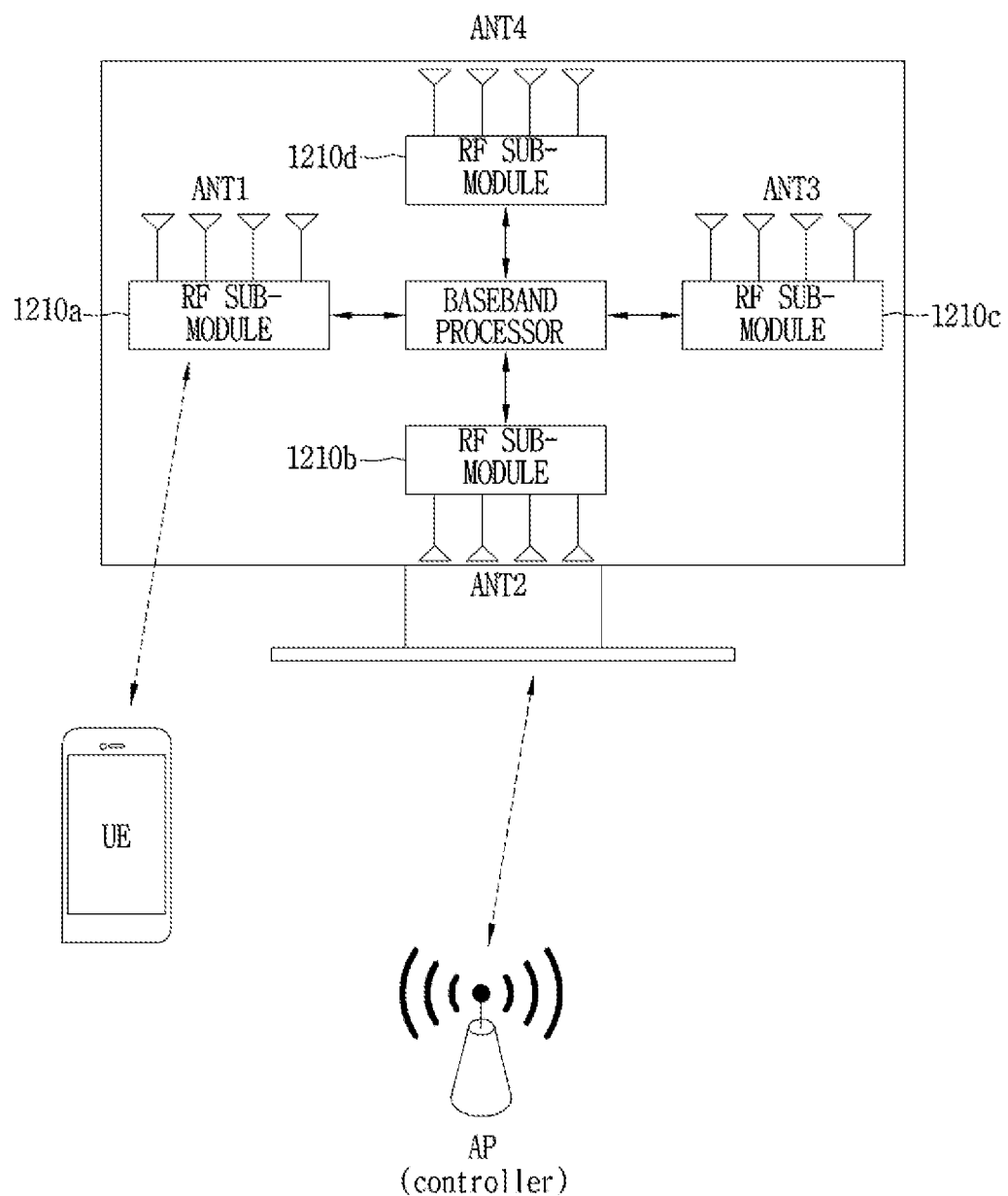
FIG. 17 shows an electronic device with a plurality of antenna modules and a plurality of transceiver circuit modules disposed therein according to another embodiment.

An antenna having an asymmetrical transmission line structure disclosed in the present disclosure may be implemented as a plurality of antenna modules within an electronic device other than a mobile terminal. In relation to this, FIG. 17 shows an electronic device with a plurality of antenna modules and a plurality of transceiver circuit modules disposed therein according to another embodiment. Referring to FIG. 17, the electronic device with a plurality of antenna modules and a plurality of transceiver circuit modules disposed therein may be, but not limited to, a television. Accordingly, in the present disclosure, the electronic device with a plurality of antenna modules and a plurality of transceiver circuit modules disposed therein may include a certain electronic device or display device that supports communication service in millimeter wave bands.

Referring to FIG. 3B to FIG. 16, an electronic device 1000 includes a plurality of antenna modules ANT1 to ANT4 and a plurality of transceiver circuit modules 1210a to 1210d. In relation to this, the plurality of transceiver circuit modules 1210a to 1210d may correspond to the above-described transceiver circuit 1250. Alternatively, the plurality of transceiver circuit modules 1210a to 1210d may be some of the components of the transceiver circuit 1250 or some of the components of front end modules disposed between the antenna modules and the transceiver circuit 1250.

The plurality of antenna modules ANT1 to ANT4 may be configured as an array antenna with a plurality of antenna elements disposed therein. The number of elements of the antenna modules ANT1 to ANT4 is not limited to 2, 3, 4, etc. as illustrated in the drawings. For example, the number of elements of the antenna modules ANT1 to ANT4 may be extended to 2, 4, 8, 16, etc. Also, the number of elements of the antenna modules ANT1 to ANT4 may be the same or differ. The number of elements of the antenna modules ANT1 to ANT4 may be disposed in different portions of a display. As shown in FIG. 16, the number of elements of the antenna modules ANT1 to ANT4 may be disposed on the top, left, bottom, and right of a display, but are not limited to such an arrangement structure. For another example, the number of elements of the antenna modules ANT1 to ANT4 may be disposed on a top left portion, a top right portion, bottom left portion, and bottom right portion of the display.

The antenna modules ANT1 to ANT4 may be configured to transmit and receive a signal in a particular direction in a certain frequency band. For example, the number of elements of the antenna modules ANT1 to ANT4 may operate in any of a 28 GHz band, a 39 GHz band, and a 64 GHz band.

The electronic device may maintain dual connections with different entities and perform a data transmission or reception operation for this through two or more of the antenna modules ANT1 to ANT4. In relation to this, the electronic device corresponding to a display device may transmit or receive data to or from a first entity through the first antenna module ANT1. Also, the electronic device may transmit or receive data to or from a second entity through the second antenna module ANT2. For example, the electronic device may transmit or receive data to or from a mobile terminal UE through the first antenna module ANT1. The electronic device may transmit or receive data to or from a control device such as set-top box or an access point through the second antenna module ANT2.

Data may be transmitted or received to or from another entity through other antenna modules, for example, the third antenna module ANT3 and the fourth antenna module ANT4. For another example, a dual connection or MIMO may be performed through at least one of the previously connected first and second entities through the third antenna module ANT3 and the fourth antenna module ANT4.

Meanwhile, the transceiver circuit modules 1210a to 1210d may operate to process a transmit signal and a receive signal in an RF frequency band. Here, the RF frequency band may be a certain frequency band in a millimeter wave band such as 28 GHz, 39 GHz, and 648 GHz, as described above. Meanwhile, the transceiver circuit modules 1210a to 1210d may be called RF SUB-MODULES 1210a to 1210d. In this case, the number of RF SUB-MODULES 1210a to 1210d is not limited to 4, but may be varied to 2 or more depending on applications.

Moreover, the RF SUB-MODULES 1210a to 1210d may include up-conversion modules and down-conversion modules which convert an RF frequency signal into an IF frequency signal or vice versa. To this end, the up-conversion modules and the down-conversion modules may include a local oscillator LO for performing frequency up-conversion and frequency down-conversion.

Meanwhile, in the RF SUB-MODULES 1210a to 1210d, a signal may be transmitted from one of the plurality of transceiver circuit modules to an adjacent transceiver circuit module. Accordingly, the transmitted signal may be transmitted at least once to all of the plurality of transceiver circuit modules 1210a to 1210d.

To this end, a data transfer path having a loop structure may be added. In relation to this, adjacent RF SUB-MODULEs 1210b and 1210c are capable of bidirectional signal transmission through a transmission path P2 having a loop structure.

Alternatively, a data transfer path having a feedback structure may be added. In relation to this, at least one SUB-MODULE 1210c is capable of unidirectional signal transmission to the other SUB-MODULEs 1210a, 1210b, and 1210c through a data transfer path having a feedback structure.

The plurality of RF SUB-MODULEs may include first to fourth RF-SUB MODULES 1210a to 1201d. In relation to this, a signal from the first RF-SUB-MODULE 1210A may be transmitted to the adjacent second and fourth RF SUB-MODULEs 1210b and 1210d. Also, the second and fourth RF SUB-MODULEs 1210b and 1210d may transmit the signal to the adjacent third RF SUB-MODULE 1210c. In this case, if bidirectional transmission is possible between the second RF SUB-MODULE 1210b and the third RF SUB-MODULE 1210c, as shown in FIG. 4, this may be called a loop structure. On the other hand, if only unidirectional transmission is possible between the second RF SUB-MODULE 1210b and the third RF SUB-MODULE 1210c, this may be called a feedback structure. Meanwhile, in the feedback structure, at least two signals may be transmitted to the third RF SUB-MODULE 1210c.

However, a baseband module is not limited to such a structure, but may be provided only in a particular one of the first to fourth RF sub-modules 1210a to 1240a depending on applications. Alternatively, the baseband module is not provided in the first to fourth RF sub-modules 1210a to 1210d depending on applications, but may be configured as a separate controller, that is, the baseband processor 1400.

For example, a control signal may be transmitted only by a separate controller, that is, the baseband processor 1400. In relation to this, signal transmission may not be done substantially even if there is a data transfer path between the plurality of RF SUB-MODULEs 1210b and 1210d.

In the above, an electronic device including an antenna module having an asymmetrical transmission line structure according to one aspect of the present disclosure has been described. Hereinafter, an antenna module having an asymmetrical transmission line structure according to one aspect of the present disclosure will be described. In relation to this, a description of an electronic device including an antenna module having an asymmetrical transmission line structure may apply to an antenna module.

In relation to this, referring to FIGS. 1 to 17, an antenna module may include a transmission line TL and radiators 1100R. The transmission line TL may include a ground plane 1010 and a signal line 1020. The radiators 1100R may be electrically connected to the signal line 1020, and configured to radiate a signal. The ground plane 1010 may be disposed asymmetrically in one side portion and the other side portion with respect to the center line of the signal line 1020 in a predetermined section adjacent to the radiators 1100R.

The transmission line TL may include first and second ground planes 1011 and 1012 arranged on different layers of a multi-layer substrate and configured to be connected to each other through vias spaced a predetermined distance apart from each other. In relation to this, the signal line 1020 may be disposed on the same plane as the first ground plane 1011 which is the upper one between the first and second ground planes 1011 and 1012.

The first ground plane 1011 may be disposed in one side portion and the other side portion of the signal line 1020 in a first section forming the transmission line TL. On the other hand, the first ground plane 1011 may be disposed only in one side portion of the signal line 1020 in a second section which is a transition section between the transmission line TL and the radiators 1100R. Accordingly, an asymmetrical transmission line may be formed by the first ground plane 1011.

The second ground plane 1012 too may be configured to form an asymmetrical transmission line. The second ground plane 1012 may be disposed in one side portion and the other side portion of the signal line 1020 in the first section. The second ground plane 1012 may be disposed only in one side portion of the signal line in the second section.

The first ground plane 1011 and the second ground plane 1012 may be interconnected through vias. In relation to this, the first ground plane 1011 and the second ground plane 1012 may be interconnected through vias in the first section forming a transmission line TL. In the second section which is a transition section, vias may be formed only in one side portion. In relation to this, vias connecting the first ground plane 1011 and the second ground plane 1012 may be disposed in one side portion in the second section which is a transition section. On the other hand, no ground planes may be disposed in the other portion in the second section. Meanwhile, even when ground planes are partially formed, no vias connecting the first ground plane 1011 and the second ground plane 1012 may be disposed in the second section which is a transition section.

A variety of changes and modifications to the foregoing embodiments related to a feed line and an array antenna which are in millimeter-wave bands and an electronic device for controlling the same will be clearly understood by those skilled in the art within the spirit and scope of the present disclosure. Thus, the variety of changes and modifications to the embodiments should be understood as included within the scope of the present disclosure as defined by the appended claims.

An electronic device described in the present disclosure may send or receive information simultaneously from various entities such as a peripheral electronic device, an external device, or a base station. Referring to FIGS. 1 to 17, the electronic device may perform MIMO through the antenna module 1100, the transceiver circuit 1250, and the baseband processor 1400. By performing MIMO, communication capacity may be improved and/or the reliability of information transmission and reception may be improved. Accordingly, the electronic device may improve communication capacity by sending or receiving different information simultaneously from various entities. Therefore, communication capacity may be improved through MIMO without bandwidth extension in the electronic device.

Alternatively, the electronic device may improve the reliability of peripheral information and reduce latency by sending or receiving the same information simultaneously from various entities. Accordingly, the electronic device is capable of URLLC (ultra reliable low latency communication), and the electronic device may operate as URLLC UE.

To this end, a base station performing scheduling may allocate time slots preferentially for the electronic device operating as URLLC CE. To this end, part of specific time-frequency resources that have been already allocated to other UEs may be punctured.

As described above, a plurality of antennas ANT1 to ANT4 may perform wideband operation in a first frequency band and a second frequency band. The baseband processor 1400 may perform MIMO through part of the plurality of array antennas ANT1 to ANT4 in the first frequency band. Also, the baseband processor 1400 may perform MIMO through part of the plurality of array antennas ANT1 to ANT4 in the second frequency band. In relation to this, MIMO may be performed by using array antennas spaced from each other by enough distance and disposed while rotated at a predetermined angle. Accordingly, the isolation between first and second signals within the same band may be improved.

One or more array antennas among the first to fourth antennas ANT 1 to ANT4 in the electronic device may operate as radiators in the first frequency band. Meanwhile, one or more array antennas among the first to fourth antennas ANT 1 to ANT4 may operate as radiators in the second frequency band.

According to an embodiment, the baseband processor 1400 may perform MIMO through two or more of the first to fourth antennas ANT1 to ANT4 in the first frequency band. Meanwhile, the baseband processor 1400 may perform MIMO through two or more of the first to fourth antennas ANT1 to ANT4 in the second frequency band.

In relation to this, if the signal quality of all of two or more array antennas in the first frequency band is lower than a threshold, the baseband processor 1400 may send a time/frequency resource request for the second frequency band to the base station. Accordingly, once time/frequency resources for the second frequency band are allocated, the baseband processor 1400 may perform MIMO through the two or more of the first to fourth antennas ANT1 to ANT4 using the corresponding resources.

In a case where resources for the second frequency band are allocated, it is still possible to perform MIMO using the same two or more array antennas. Thus, the corresponding front end module FEM may be turned on/off over again as the array antennas are changed, thereby preventing power consumption. Also, it is possible to prevent performance degradation that may result from the settling time of an electronic part, for example, an amplifier, as the corresponding front end module FEM is turned on/off over again due to the change of the array antenna.

Meanwhile, in a case where resources for the second frequency band are allocated, at least one of the two or more array antennas may be changed, and MIMO may be performed through these array antennas. Accordingly, if it is determined that communication is hard to perform through these array antennas since the first and second frequency bands have different radio wave environments, other array antennas may be used.

According to other embodiments, the baseband processor 1400 may control the transceiver circuit 1250 so as to receive a second signal in the second band while receiving a first signal in the first band through one of the first to fourth antennas ANT4. In this case, there is an advantage that carrier aggregation CA may be performed through one antenna.

Accordingly, the baseband processor 1400 may perform carrier aggregation CA through a combination of the first and second frequency bands. Thus, the present disclosure provides an advantage of allowing for broadband reception through carrier aggregation if there is a need to send or receive a large volume of data in the electronic device.

Therefore, the electronic device is capable of eMBB (enhanced mobile broadband) communication, and the electronic device may operate as eMBB UE. To this end, a base station performing broadband frequency resources for the electronic device operating as eMBB UE. To this end, carrier aggregation CA may be performed for available frequency bands, but for frequency resources that have been already allocated to other UEs.

A variety of changes and modifications to the foregoing embodiments related to a feed line and an array antenna which are in millimeter-wave bands and an electronic device for controlling the same will be clearly understood by those skilled in the art within the spirit and scope of the present disclosure. Thus, the variety of changes and modifications to the embodiments should be understood as included within the scope of the present disclosure as defined by the appended claims.

As described above, a feed line and an array antenna which are in millimeter-wave bands and an electronic device for controlling the same according to the present disclosure have been described. A wireless communication system such a feed line and an array antenna which are in millimeter-wave bands, an electronic device for controlling the same, and a base station will be described below. In relation to this, FIG. 18 is an exemplary block diagram of a wireless communication system to which configurations proposed herein are applicable.

Figure 18:
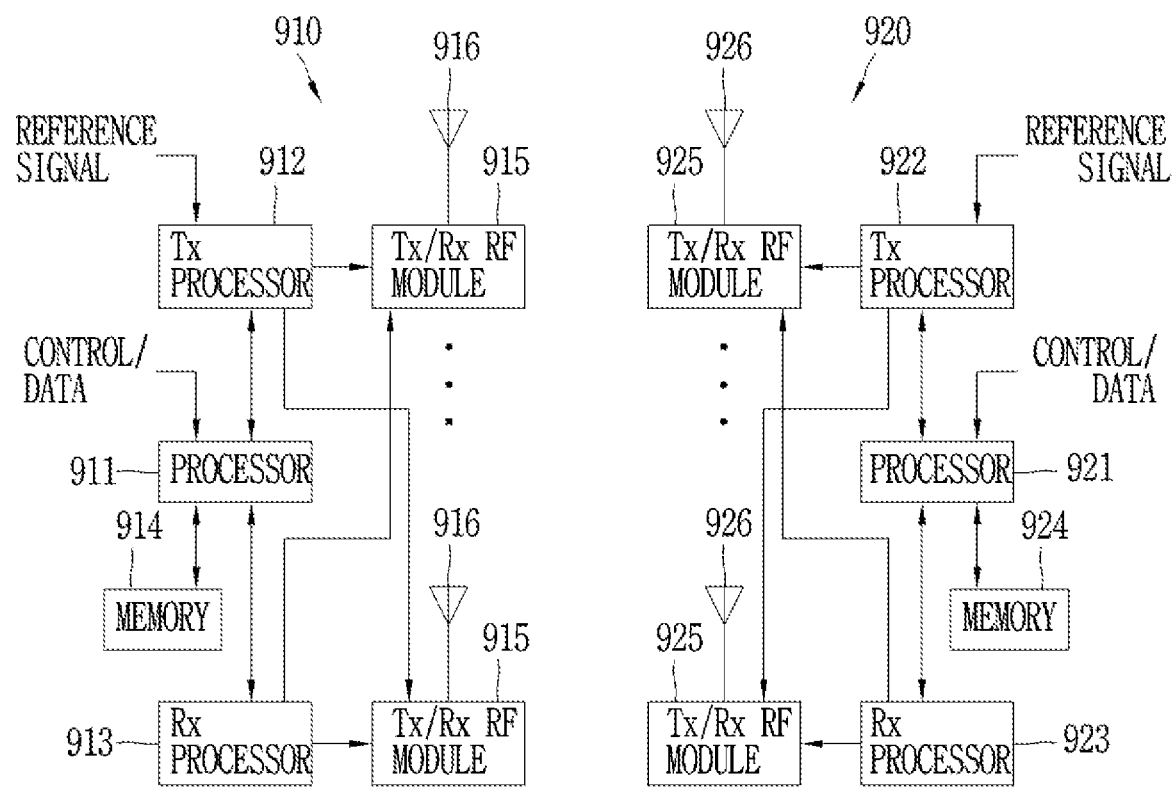
FIG. 18 is an exemplary block diagram of a wireless communication system to which configurations proposed herein are applicable.

Referring to FIG. 18, the wireless communication system may include a first communication device 910 and/or a second communication device 920. The term 'A and/or B' may be interpreted as having the same meaning as 'including at least one of A or B'. The first communication device may denote a base station and the second communication device may denote a terminal (or the first communication device may denote the terminal or the vehicle and the second communication device may denote the base station).

The base station (BS) may be replaced with a term such as a fixed station, a Node B, an evolved-NodeB (eNB), a next generation NodeB (gNB), a base transceiver system (BTS), an access point (AP), or a general NB (gNB), a 5G system, a network, an AI system, a road side unit (RSU), robot or the like. In addition, the terminal may be fixed or have mobility, and may be replaced with a term, such as user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-machine (M2M) device, a device-to-device (D2D) device, a vehicle, a robot, an AI module, or the like.

The first communication device and the second communication device each may include a processor 911, 921, a memory 914, 924, one or more Tx/Rx radio frequency modules 915, 925, a Tx processor 912, 922, an Rx processor 913, 923, and an antenna 916, 926. The processor may implement the aforementioned functions, processes, and/or methods. More specifically, in DL (communication from the first communication device to the second communication device), an upper layer packet from a core network may be provided to the processor 911. The processor may implement the function of an L2 layer. In DL, the processor may provide multiplexing between a logical channel and a transport channel and radio resource allocation to the second communication device 920, and may be responsible for signaling to the second communication device. The Tx processor 912 may implement various signal processing functions for an L1 layer (i.e., a physical layer). The signal processing function may facilitate forward error correction (FEC) in the second communication device, and include coding and interleaving. Encoded and modulated symbols may be divided into parallel streams. Each stream may be mapped to an OFDM subcarrier, multiplexed with a reference signal (RS) in a time and/or frequency domain, and combined together using an Inverse Fast Fourier Transform (IFFT) to create a physical channel carrying a time-domain OFDMA symbol stream. The OFDM stream may be spatially precoded to generate multiple spatial streams. Each spatial stream may be provided to the different antenna 916 via the separate Tx/Rx module (or transceiver) 915. Each Tx/Rx module may modulate an RF carrier into a spatial stream for transmission. The second communication device may receive a signal through the antenna 926 of each Tx/Rx module (or transceiver) 925. Each Tx/Rx module may recover information modulated to the RF carrier, and provide it to the RX processor 923. The RX processor may implement various signal processing functions of the layer 1. The RX processor may perform spatial processing with respect to information to recover an arbitrary spatial stream destined for the second communication device. If multiple spatial streams are destined for the second communication device, they may be combined into a single OFDMA symbol stream by plural RX processors. The RX processor may transform the OFDMA symbol stream from a time domain to a frequency domain by using Fast Fourier Transform (FFT). A frequency domain signal may include an individual OFDMA symbol stream for each subcarrier of the OFDM signal. Symbols on each subcarrier and a reference signal may be recovered and demodulated by determining the most probable signal placement points transmitted by the first communication device. These soft decisions may be based on channel estimate values. The soft decisions may be decoded and deinterleaved to recover data and control signal originally transmitted by the first communication device on the physical channel. The corresponding data and control signal may then be provided to the processor 921.

UL (communication from the second communication device to the first communication device) may be processed in the first communication device 910 in a manner similar to that described with respect to the receiver function in the second communication device 920. Each Tx/Rx module 925 may receive a signal via the antenna 926. Each Tx/Rx module may provide the RF carrier and information to the RX processor 923. The processor 921 may be associated with the memory 924 that stores program code and data. The memory may be referred to as a computer-readable medium.

As described above, an antenna module having a low-loss asymmetrical feeding structure operating in a millimeter-wave band and an electronic device for controlling the same have been described. Technical advantages of the antenna module having a low-loss asymmetrical feeding structure operating in a millimeter-wave band and the electronic device for controlling the same will be described below.

According to an embodiment, it is possible to provide a low-loss asymmetrical feeding structure including an antenna module with an array antenna operating in a millimeter-wave band, a transceiver circuit for controlling the same, and a modem.

According to an embodiment, it is possible to provide a low-loss asymmetrical feeding structure in an antenna having horizontal polarization, in consideration of polarization characteristics of the antenna.

According to an embodiment, it is possible to provide a feeding structure that allows for a reduction in transmission loss caused by the transition of an electric field between horizontal and vertical, in an mmWave transmission line structure.

According to an embodiment, it is possible to provide a feeding structure in which a reflection coefficient of an antenna can be maintained without distortion by an asymmetrical ground transition structure.

According to an embodiment, it is possible to improve antenna gain since electrical loss is reduced by an asymmetrical ground transition structure.

According to an embodiment, it is possible to implement an end-fire antenna as a dual-polarization array antenna and therefore increase communication capacity and improve communication reliability by increasing the number of MIMO streams.

According to an embodiment, it is possible to perform multi-input and multi-output (MIMO) by using a single antenna module through antennas having orthogonal polarization.

Further scope of applicability of the present disclosure will become apparent from the following detailed description. It should be understood, however, that the detailed description and specific examples, such as the preferred embodiment of the invention, are given by way of illustration only, since various changes and modifications within the spirit and scope of the invention will be apparent to those skilled in the art.

In relation to the aforementioned disclosure, design and operations of an array antenna operating in a mmWave band and an electronic device controlling the same can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller of the terminal. Therefore, the detailed description should not be limitedly construed in all of the aspects, and should be understood to be illustrative. Therefore, all changes and modifications that fall within the metes and bounds of the claims, or equivalents of such metes and bounds are therefore intended to be embraced by the appended claims.

What is claimed is:

1. An electronic device having an antenna, the electronic device comprising:
    first and second ground planes arranged on different layers of a multi-layer substrate and configured to be connected to each other through vias spaced a predetermined distance apart from each other;
    a signal line arranged on the same plane as the first ground plane which is the upper one between the first and second ground planes; and
    radiators configured to be electrically connected to the signal line and to radiate a signal,
    wherein the first ground plane is disposed in one side portion and the other side portion of the signal line in a first section forming a transmission line, and is disposed in one side portion of the signal line in a second section which is a transition section between the transmission line and the radiators, thereby forming an asymmetrical transmission line, wherein the second ground plane is disposed in one side portion and the other side portion of the signal line in the first section, and is disposed in the entire one side portion of the second section and part of the other side portion thereof, and vias connecting the first ground plane and the second ground plane are disposed in the one side portion in the second section.

2. The electronic device of claim 1, wherein the second ground plane is disposed in one side portion and the other side portion of the signal line in the first section, and is disposed in one side portion of the signal line in the second section.

3. The electronic device of claim 1,
wherein the first section is configured to form a first electric field in the first section, the first electric field comprising a vertical electric field component between the signal line and the second ground plane that is larger than a horizontal electric field component in the first section, and wherein the second section is configured to form a second electric field in the second section, the second electric field comprising a horizontal electric field component between the signal line and the first ground plane that is larger than a vertical electric field component in the second section, or that is larger than the horizontal electric field component in the first section.

4. The electronic device of claim 1, wherein the radiators comprise a first radiator that is disposed on the same plane as the signal line, and configured as a dipole antenna including a first metal pattern and a second metal pattern,
wherein the first metal pattern is connected to the signal line, and the second metal pattern is connected to the first ground plane constituting the asymmetrical transmission line.

5. The electronic device of claim 4, wherein the radiators include second radiators disposed on a layer overlying the first radiator.

6. The electronic device of claim 4, wherein the radiators further include third radiators disposed on a layer underlying the first radiator, and configured to be connected to an end of the first radiators through vertical vias.

\* \* \* \* \*